United States Patent
Kobayashi et al.

(10) Patent No.: US 7,221,644 B2
(45) Date of Patent: May 22, 2007

(54) DISC-SHAPED RECORDING MEDIUM, DISC DRIVING DEVICE AND DISC PRODUCING METHOD

(75) Inventors: Shoei Kobayashi, Kanagawa (JP); Tamotsu Yamagami, Kanagawa (JP); Shin-ichi Kadowaki, Hyogo (JP); Takashi Ishida, Kyoto (JP); Cornelis Marinus Schep, Eindhoven (NL); Hermanus Johannes Borg, Eindhoven (NL)

(73) Assignees: Sony Corporation, Tokyo (JP); Matsushita Electric Industrial Co., Ltd., Kadoma-shi (JP); Koninklijke Philips Electronics N.V., Eindhoven (NL)

( * ) Notice: Subject to any disclaimer, the term of this patent is extended or adjusted under 35 U.S.C. 154(b) by 75 days.

(21) Appl. No.: 10/515,191

(22) PCT Filed: May 22, 2003

(86) PCT No.: PCT/JP03/06423

§ 371 (c)(1),
(2), (4) Date: Aug. 11, 2005

(87) PCT Pub. No.: WO03/100702

PCT Pub. Date: Dec. 4, 2003

(65) Prior Publication Data

US 2006/0098558 A1    May 11, 2006

(30) Foreign Application Priority Data

May 24, 2002    (JP)    ............................ 2002-151185

(51) Int. Cl.
*G11B 7/24*    (2006.01)

(52) U.S. Cl. ............................... 369/275.5; 369/275.1; 369/283

(58) Field of Classification Search ...................... None
See application file for complete search history.

(56) References Cited

U.S. PATENT DOCUMENTS 5,191,565 A * 3/1993 Inoue et al. ................. 369/284

(Continued)

FOREIGN PATENT DOCUMENTS

EP    0 449 121    10/1991

(Continued)

OTHER PUBLICATIONS

Patent Abstracts of Japan, Publication No. 2001-250241, Publication Date Sep. 14, 2001, vol. 2000, No. 26.

(Continued)

*Primary Examiner*—Muhammad Edun
(74) *Attorney, Agent, or Firm*—Oblon, Spivak, McClelland, Maier & Neustadt, P.C.

(57) ABSTRACT

With the disc-shaped recording medium, or the disc manufacturing method according to the present invention, for both the single-layer disc and the multi-layer disc, a recording layer L0, which is to be the first layer, is at the same distance, along the direction of disc thickness, from the surface of the cover layer CVLs on which falls the laser light. For the multi-layer disc, the second layer L1 and the following layer(s) are formed at the locations which are closer to the cover layer CVLs than the first layer L0. Management information may be recorded by mobbling grooves, each layermay have tert areas, defect information, a replacement area. Thus, it is possible to improve compatibility, reliability and accessibility between a single-layer disc and a multi-layer disc. The spherical aberration for the recording/reproducing light may be controlled with respect to the selected layer.

27 Claims, 46 Drawing Sheets

U.S. PATENT DOCUMENTS

| | | |
|---|---|---|
| 5,831,966 A | 11/1998 | Taira et al. |
| 2001/0003641 A1* | 6/2001 | Kunitomo et al. ..... 430/270.13 |

FOREIGN PATENT DOCUMENTS

| | | |
|---|---|---|
| EP | 0 798 710 | 10/1997 |
| EP | 1 056 089 | 11/2000 |
| EP | 1 128 383 | 8/2001 |
| EP | 1 187 116 | 3/2002 |
| EP | 1 204 106 | 5/2002 |
| GB | 2 347 261 | 8/2000 |
| JP | 3-275382 | 12/1991 |
| JP | 2000-503446 | 3/2000 |
| JP | 2001-28147 | 1/2001 |
| WO | WO 97/15050 | 4/1997 |
| WO | WO 02/19332 | 3/2002 |

OTHER PUBLICATIONS

Patent Abstracts of Japan, Publication No. 2002-092930, Publication Date Mar. 29, 2002, vol. 2002, No. 7.
Patent Abstracts of Japan, Publication No. 09091752, Publication Date Apr. 4, 1997, vol. 1997, No. 8.
Patent Abstracts of Japan, Publication No. 2000-311346, Publication Date Nov. 7, 2000, vol. 2000, No. 14.
Patent Abstracts of Japan, Publication No. 2001-014808, Publication Date Jan. 19, 2001, vol. 2000, No. 16.
Patent Abstracts of Japan, Publication No. 2000-285607, Publication Date Oct. 13, 2000, vol. 2000, No. 13.

* cited by examiner

1 WOBBLE PERIOD

L

Cos(ωt)  Cos(ωt)  -Cos(ωt)  -Cos(1.5ωt)  Cos(ωt)
         Cos(1.5ωt)

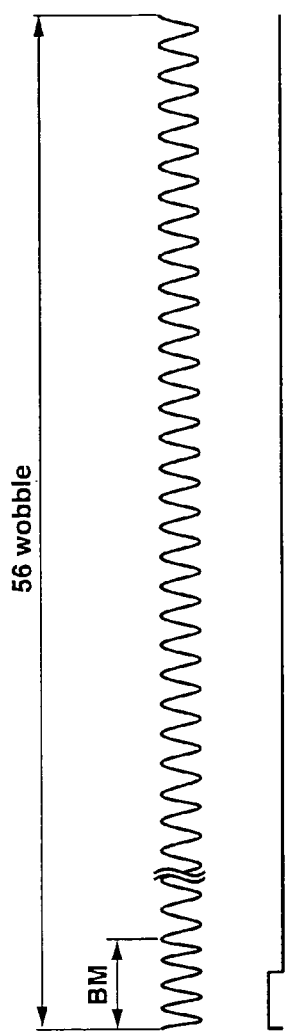

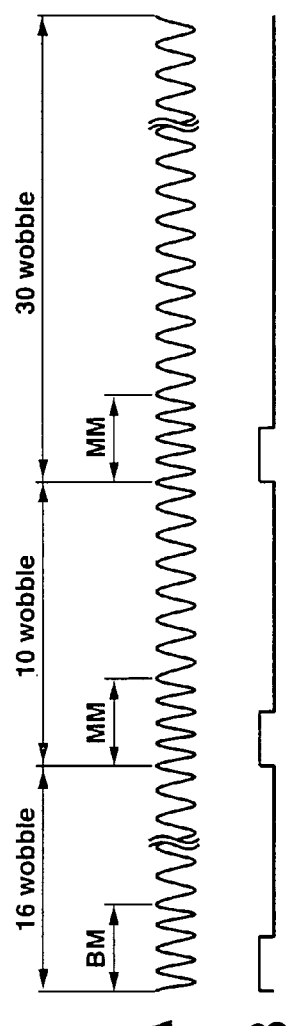

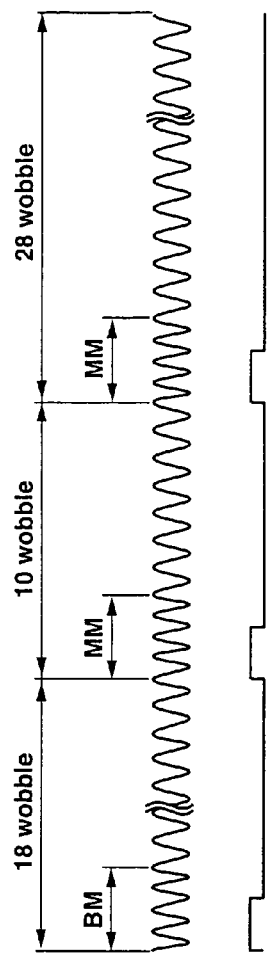

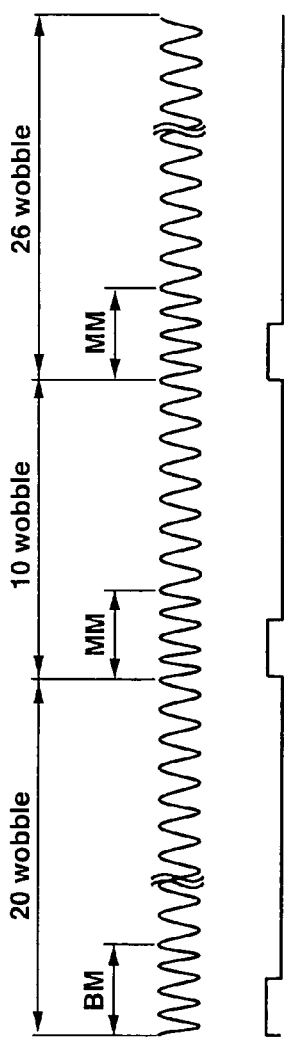

FIG.29

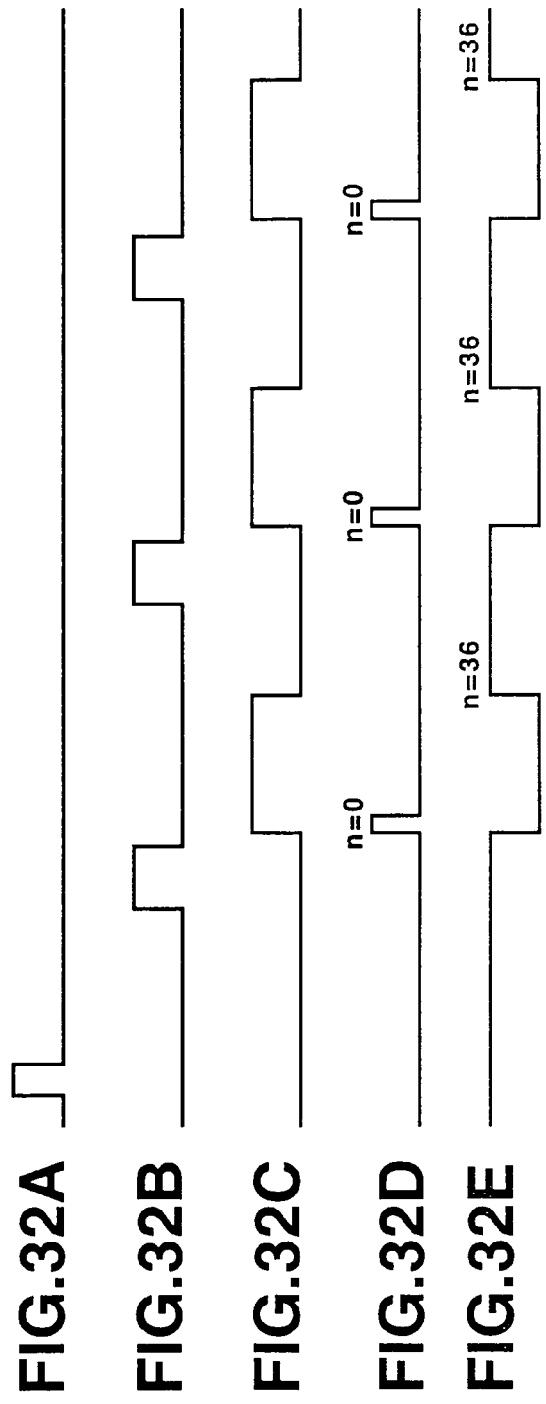

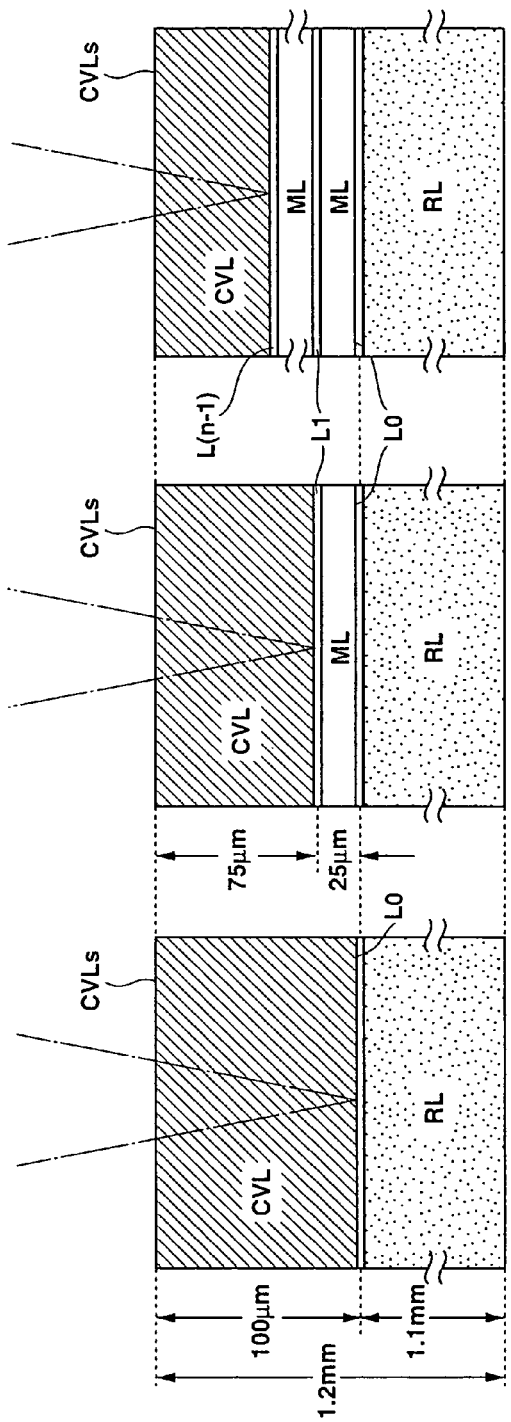

DISC-SHAPED RECORDING MEDIUM, DISC DRIVING DEVICE AND DISC PRODUCING METHOD

TECHNICAL FIELD

This invention relates to a disc-shaped recording medium, such as an optical disc, a disc producing method for producing the disc-shaped recording medium, and a disc driving apparatus for the disc-shaped recording medium.

This application claims priority of Japanese Patent Application No. 2002-151185, filed on May 24, 2002, the entirety of which is incorporated by reference herein.

BACKGROUND ART

As a technique for recording and/or reproducing digital data, there is a data recording technique employing an optical disc, inclusive of a magneto-optical disc, such as, for example, CD (Compact Disc), MD (Mini-Disc), or DVD (Digital Versatile Disc), as a recording medium. The optical disc is a generic term for a recording medium comprised of a disc of a thin metal sheet protected with plastics and which is irradiated with laser light. A signal is read out as changes in the light reflected from the disc.

The optical disc may be classified into a replay-only type, such as CD, CD-ROM or DVD-ROM, and a user-recordable type, such as MD, CD-R, CD-RW, DVD-R, DVD-RW, DVD+RW or DVD-RAM. Data recording on the user recordable type disc is enabled by exploiting a magneto-optical recording system, a phase change recording system or a dye film change recording system. The dye film change recording system, also termed a write-once recording system, allows for data recording only once and does not allow for rewriting, and hence may be used with advantage for data storage. On the other hand, the magneto-optical recording system or the phase change recording system allows for data rewriting and is utilized for a variety of fields of application including recording of various content data such as music, pictures, games or application programs.

Recently, a high density optical disc, termed DVR (Data and Video Recording) has been developed in an attempt to increase the data storage capacity appreciably.

For recording data on a recordable disc, such as a disc of the magneto-optical recording system, dye film change recording system or the phase change recording system, suitable guide means are necessitated for tracking to a data track. To this end, a groove is formed in advance as a pre-groove, with the groove or a land (an area of a trapezoidal cross-section defined between neighboring grooves or neighboring turns of the groove) being used as a data track.

It is also necessary to record the address information at a preset position on the data track such as to permit data to be recorded at a preset location on the data track. There are occasions where this address information is recorded by wobbling or meandering the groove.

Specifically, the sidewall section of the data recording track, formed in advance as a pre-groove, is wobbled in keeping with the address information.

By so doing, the address may be read out from the wobbling information, obtained as the reflected light information during recording and/or reproduction, such that data can be recorded and/or reproduced at a desired location without the necessity of pre-forming bit data etc. on the track for indicating the address.

By adding the address information as the wobbled groove, it is unnecessary to provide discrete address areas on the track to record the address as e.g., bit data, with the result that the recording capacity for real data can be increased in an amount corresponding to the address area which might otherwise have to be provided as described above.

Meanwhile, the absolute time (address) information, expressed by the wobbled groove, is termed the ATIP (Absolute Time in Pre-groove) or ADIP (Address in Pre-groove).

It should be noted that if, in the high density disc, recently developed, such as DVR, recording and/or reproduction of phase change marks is performed with a disc structure having a cover layer (substrate) of 0.1 mm along the direction of disc thickness, using a combination of the laser light with a wavelength of 405 nm, or so-called blue laser light and an objective lens with a NA of 0.85, 23.3 GB (giga-byte) of data can be recorded on a disc of 12 cm in diameter, for a data block of 64 kB (kilobyte) as a recording and/or reproducing unit, with the track pitch of 0.32 μm and a line density of 0.12 μm, with the format efficiency being approximately 82%.

If, with the similar format, the line density is set to 0.112 μm/bit, data with the capacity of 25 GB can be recorded and/or reproduced.

It is noted that there is raised a further drastically increased data capacity, so that it may be contemplated that the recording layer is of a multi-layer structure. For example, if the recording layer is of a double layer structure, the recording capacity may be 46.6 or 50 GB, or twice the above-mentioned capacity.

However, with the recording layer with a multi-layer structure, problems are raised as to desirable disc layout or as to achieving operational reliability.

There is also raised a problem as to achieving compatibility with the single layer optical disc.

It is also necessary to take into consideration the accessibility to the first and the following layers at the time of recording and/or reproduction.

DISCLOSURE OF THE INVENTION

In view of the above-depicted status of the art, it is an object of the present invention to provide a disc-shaped recording medium with plural recording layers, convenient in increasing the recording capacity or in improving the recording and/or reproducing characteristics, a method for producing the disc-shaped recording medium, and a disc driving apparatus.

To this end, the disc-shaped recording medium according to the present invention is a multi-layer recording medium of a single-layer disc, having a single recording layer, and a multi-layer disc having a plurality of recording layers, wherein the recording layer as a first recording layer is formed at such a position in a direction of thickness of the disc that the distance from the surface of a cover layer on which the light enters for recording and/or reproduction to the first recording layer is the same as the distance in case of the single layer disc, and wherein the second recording layer is formed at such position which is closer to the cover layer surface than the first layer.

The second recording layer is formed of a plurality of recording layers.

Of the first to the n-th recording layers, odd-numbered recording layers are recorded and/or reproduced from the inner rim towards the outer rim of the disc, and even-numbered recording layers are recorded and/or reproduced from the outer rim towards the inner rim of the disc.

The addresses of odd-numbered recording layers of the first to the n-th recording layers are sequentially recorded from the inner rim towards the outer rim of the disc, and the addresses of even-numbered recording layers are obtained on complementing the addresses of the odd-numbered recording layers at the positions radially corresponding to the addresses of the even-numbered recording layers, are recorded from the outer rim towards the inner rim of the disc.

A unique ID proper to the disc-shaped recording medium is recorded only in the first recording layer by a recording system of burning off the recording layer.

The management information for recording and/or reproduction is recorded as replay-only information in each of the first to the n-th recording layers by wobbling a groove formed for spirally extending in the disc.

A test area for conducting a recording test is provided in each of the first to n-th recording layers.

An area for recording the defect management information for each of the first to n-th recording layers is provided in each of the first to n-th recording layers.

A replacement area is provided in each of the first to n-th recording layers.

A disc driving apparatus according to the present invention may record and/or reproduce data on a disc-shaped recording medium, which may be a single-layer disc having a single recording layer, or a multi-layer disc having a plurality of recording layers, wherein the recording layer as a first recording layer of the multi-layer disc is formed at such a position in a direction of thickness of the disc that the distance from the surface of a cover layer on which the light enters for recording and/or reproduction to the first recording layer is the same as the distance in case of the single layer disc, and wherein the second recording layer is formed at such position which is closer to the cover layer surface than the first layer. The apparatus includes head means for illuminating the laser light for recording and/or reproducing data for a track of each of the recording layers, correction means for correcting the spherical aberration of the laser light, and correction controlling means for controlling the correction means, in dependence upon the recording layer to be illuminated by the laser light to correct spherical aberration in dependence upon the recording layer.

The second recording layer is formed of a plurality of recording layers.

The correction controlling means causes the correction means to execute spherical aberration correction for the first layer, on loading of the disc-shaped recording medium, without regard to the disc type.

A unique ID proper to the disc-shaped recording medium, recorded in the first layer by a recording system of burning off the layer, is read out on loading the disc-shaped recording medium.

When the multi-layer disc having n recording layers, as the above disc-shaped recording medium, is loaded, the management information for recording and/or reproduction, recorded as the replay-only information by wobbling a spirally formed groove, is read out from one or more of the first to the n-th recording layers of the disc.

When the multi-layer disc having n recording layers, as the above disc-shaped recording medium, is loaded, test recording is carried out in a test area provided in each of the first to n-th recording layers.

For the multi-layer disc having n recording layers, the defect management information for the first to the n-th recording layers is recorded in a defect management area provided in each of the first to n-th recording layers.

When the multi-layer disc having n recording layers is loaded, recording and/or reproduction is sequentially prosecuted from the first to the n-th recording layers.

In recording and/or reproducing odd-numbered recording layers of the disc-shaped recording medium, recording and/or reproduction is executed from the inner rim towards the outer rim of the disc and, in recording and/or reproducing even-numbered recording layers of the disc-shaped recording medium, recording and/or reproduction is executed from the outer rim towards the inner rim of the disc.

A method for producing, of a single-layer disc, having a single recording layer, and a multi-layer disc, having a plurality of recording layers, a disc-shaped recording medium which is the multi-layer recording medium, includes forming the recording layer as a first recording layer at such a position in a direction of thickness of the disc that the distance from the surface of a cover layer on which the light enters for recording and/or reproduction to the first recording layer is the same as the distance in case of the single layer disc, and forming the second recording layer at such position which is closer to the cover layer surface than the first layer.

The second recording layer is formed of a plurality of recording layers.

Of the first to the n-th recording layers, odd-numbered recording layers are recorded and/or reproduced from the inner rim towards the outer rim of the disc, and even-numbered recording layers are recorded and/or reproduced from the outer rim towards the inner rim of the disc.

The addresses of odd-numbered recording layers of the first to the n-th recording layers are sequentially recorded from the inner rim towards the outer rim of the disc, and the addresses of even-numbered recording layers are obtained on complementing the addresses of the odd-numbered recording layers at the positions radially corresponding to the addresses of the even-numbered recording layers, and are recorded from the outer rim towards the inner rim of the disc.

A unique ID proper to the disc-shaped recording medium is recorded only in the first recording layer by a recording system of burning off the recording layer.

The management information for recording and/or reproduction is recorded as replay-only information in each of the first to the n-th recording layers by wobbling a groove formed for spirally extending in the disc.

A test area for conducting a recording test is provided in each of the first to n-th recording layers.

An area for recording the defect management information for each of the first to n-th recording layers is provided in each of the first to the n-th recording layers.

A replacement area is provided in each of the first to the n-th recording layers.

That is, the multi-layer disc, as a disc-shaped recording medium of the present invention, has the first layer position is common with the single layer disc, while the second layers ff., are closer to the cover layer, thus assuring more advantageous characteristics.

Moreover, in the first to the n-th recording layers, the odd-numbered recording layers are recorded and/or reproduced from the inner rim towards the outer rim of the disc, while the even-numbered recording layers are recorded and/or reproduced from the outer rim towards the inner rim of the disc, thus advantageously achieving recording and/or reproducing tracing continuity for the respective layers.

BRIEF DESCRIPTION OF THE DRAWINGS

FIGS. 21A and 21B illustrate a monotone bit in a sync part and data for MSK modulation according to the present invention, respectively.

FIGS. 22A and 22B illustrate the signal waveform of a first sync bit in the sync part and data for MSK modulation according to the present invention, respectively.

FIGS. 23A and 23B illustrate the signal waveform of a second sync bit in the sync part and data for MSK modulation according to the present invention, respectively.

FIGS. 24A and 24B illustrate the signal waveform of a third sync bit in the sync part and data for MSK modulation according to the present invention, respectively.

FIG. 29 illustrates the address format according to the present invention.

FIGS. 32A to 32E illustrate the control timing of an address demodulating circuit according to the present invention.

FIGS. 35A to 35C illustrate layered structures of a single-layer disc, a double-layer disc and an n-layer disc according to the present invention, respectively, and FIG. 35D shows layer addresses accorded to the respective recording layers of the respective discs.

BEST MODE FOR CARRYING OUT THE INVENTION

Figure 1:
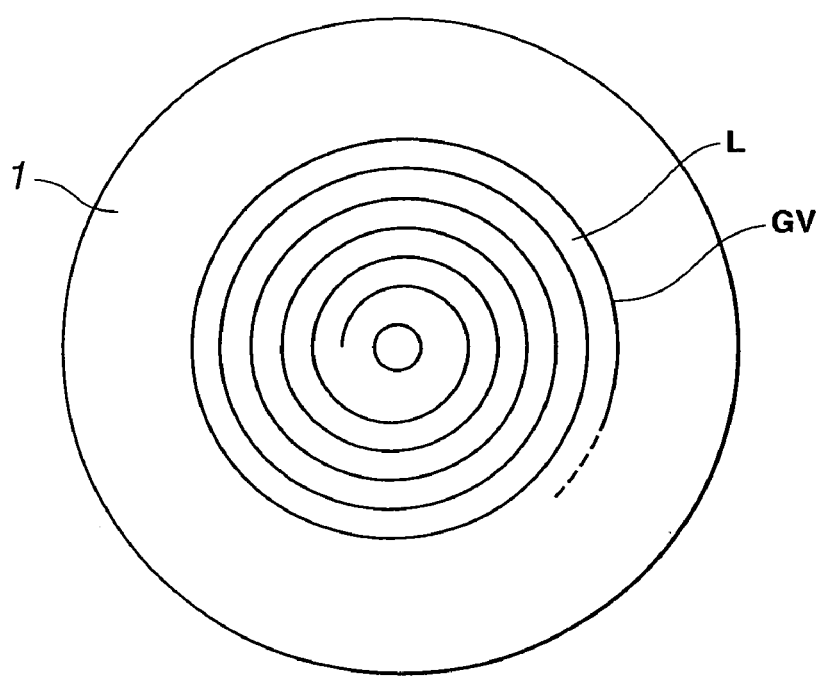
FIG. 1 illustrates a groove of a disc according to the present invention.

In the following, an optical disc embodying the present invention is explained. In addition, a disc driving apparatus for recording and/or reproducing the optical disc (recording and/or reproducing apparatus) for recording and/or reproduction on or from the optical disc, a mastering device for producing the optical disc and a BCA recording apparatus, are explained. The explanation is made in the following sequence:

1. Disc Wobbling System
   1-1 Explanation of the Overall Wobbling System
   1-2 MSK Modulation
   1-3 HMW Modulation
   1-4 Sum
2. Typical Application to DVR
   2-1 Physical Properties of a DVR Disc
   2-2 ECC Format of Data
   2-3 Address Format
   2-3-1 Relationship Between the Data for Recording and/or Reproduction and the Address
   2-3-2 Sync Part
   2-3-3 Data Part
   2-3-4 Content of Address Data
   2-4 Address Demodulation Circuit
3. Single Layer/Double Layer/n-Layer Disc
   3-1 Layer Structure
   3-2 Disc Layout
4. Disc Driving Apparatus
   4-1 Structure
   4-2 Disc Accommodating Processing
5. Disc Producing Method
   5-1 Mastering Device
   5-2 Producing Sequence
   5-3 BCA Recording Device 1. Disc Wobbling System
   1-1 Explanation of the Overall Wobbling System An optical disc 1, embodying the present invention, includes a groove GV, as a recording track, formed thereon, as shown in FIG. 1. This groove GV is formed extending spirally from the inner rim towards the outer rim of the disc. Thus, the cross-section of the optical disc 1, taken along the radial direction, indicates convexed lands L and concave grooves GV, formed in alternation with each other, as shown in FIG. 2.

It is noted that the spiral direction of FIG. 1 shows the state where the optical disc 1 is seen from its label side. It is also noted that, in the case of a disc having plural recording layers, the spiral state differs from one layer to the next.

Figure 2:
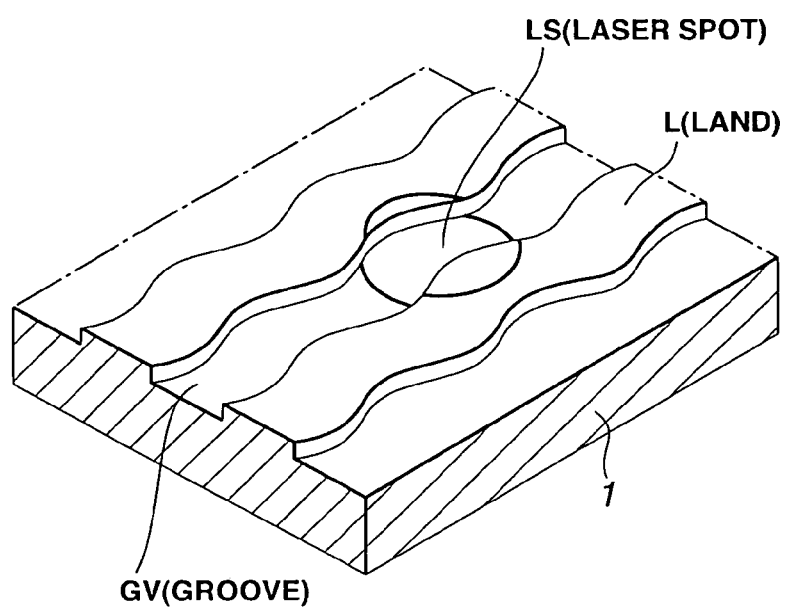
FIG. 2 illustrates the groove wobbling of the disc according to the present invention.

The groove GV of the optical disc 1 is formed meandering with respect to the tangential direction, as shown in FIG. 2. The shape of the meandering of the groove GV is in keeping with the wobble signal. Thus, the optical disc drive is able to reproduce the wobble signal by detecting both edges of the groove GV from the reflected light of a laser spot LS illuminated on the groove GV and by extracting the components of variation of the edge positions relative to the radial direction of the optical disc when the laser spot LS is moved along the recording track.

In the wobble signal, the address information of the recording track at the recording position, that is the physical address and other additional information, has been modulated. Consequently, the optical disc drive is able to demodulate the address information etc from the wobble signal to control the address at the time of data recording and/or reproduction.

Although the embodiments of the present invention are now explained for the optical disc in which data is recorded in the grooves (groove recording), the present invention may be applied to an optical disc in which data is recorded in the lands (land recording) or to an optical disc in which data is recorded in both the grooves and the lands (land/groove recording).

It is noted that the present embodiment of the optical disc 1 modulates the wobble signal with the address information in accordance with two modulation systems. One of the modulation systems is the MSK (Minimum Shift Keying) modulation system, while the other is such a system in which even-numbered harmonics are summed to the sinusoidal carrier signal and the polarity of the harmonics is changed with the sign of the data for modulation to effect modulation. The modulation system which sums even-numbered harmonics to the sinusoidal carrier signal and changes the polarity of the harmonics with the sign of the data for modulation in order to effect modulation is termed HMW (Harmonic Wave) modulation.

Figure 3:
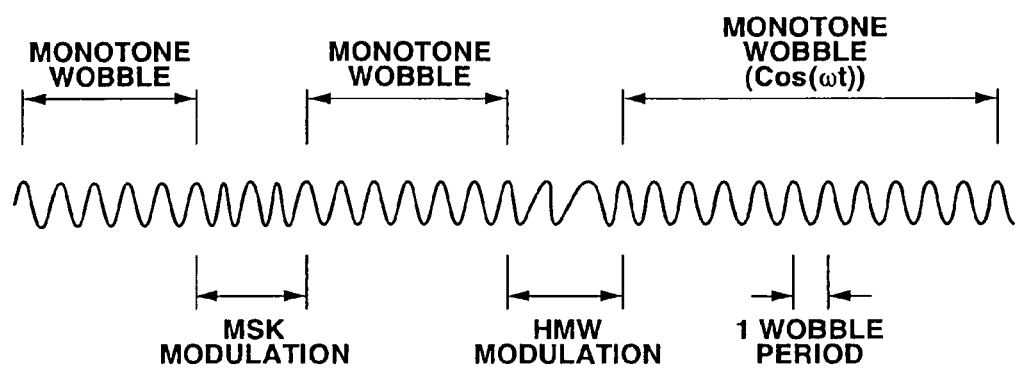
FIG. 3 illustrates MSK modulated and HMW modulated wobble signals according to the present invention.

With the present embodiment of the optical disc 1, such a wobble signal is generated in which a concatenation of a preset number of periods of a sinusoidal reference carrier signal waveform of a preset frequency forms a block and in which the MSK modulated address information is inserted into the block to form an MSK modulated section and the HMW modulated address information is similarly inserted into the block to form an HMW modulated section, as shown in FIG. 3. That is, the address information based on MSK modulation and the address information based on HMW modulation are inserted at different locations in the block. In addition, one of the two sinusoidal carrier signals used in the MSK modulation and the carrier signal for the MSK modulation represent the aforementioned reference carrier signal. The MSK modulated unit and the HMW modulated unit are located in different locations in the block and one or more periods of the reference carrier signal is arranged between the MSK modulated unit and the HMW modulated unit.

In the following, that signal waveform portion in which no data modulation has been made and only the frequency component of the reference carrier signal presents itself is referred to below as a monotone wobble. Moreover, in the following, the sinusoidal signal, used as a reference carrier signal, is $\cos(\omega t)$. One period of the reference carrier signal is termed a wobbling period. The frequency of the reference carrier signal is constant from the inner rim to the outer rim of the optical disc and is determined in dependence upon the linear velocity with which the laser spot is moved along the recording track.

1-2 MSK Modulation

The modulation methods used in the MSK modulation and in the HMW modulation are hereinafter explained. First, the address information modulation system in accordance with the MSK modulation system is explained.

The MSK modulation is the phase-continuous FSK (Frequency Shift Keying) modulation with the modulation index equal to 0.5. The FSK modulation is of such a system in which codes "0" and "1" of data for modulation are associated with the two carrier signals with the frequencies f1 and f2. Stated differently, the FSK modulation is of a system in which, when the data for modulation is "0" or "1", a sinusoidal waveform with the frequency f1 or a sinusoidal waveform with the frequency f2 is output, respectively. Moreover, in the phase-continuous FSK modulation, the two carrier signals are phase-continuous at a sign switching timing of the data for modulation.

In this FSK modulation the modulation index m is defined. This modulation index m is defined by $$m=|f1-f2|T$$

where T is the rate of transmission of the data for modulation, that is 1/(time of the shortest code length). The phase-continuous FSK modulation with m=0.5 is termed the MSK modulation.

Figure 4A:
FIGS. 4A to 4E illustrate MSK modulation according to the present invention.

With the optical disc 1, the shortest code length of the data to be MSK modulated is two wobbling periods, as shown in FIGS. 4A (a reference carrier signal which is cos(ωt)) and 4B. Meanwhile, the shortest code length L of the data for modulation may be optionally determined provided that the code length L is an integer number multiple of the wobbling periods which is not less than 2. It is noted that one of the two frequencies used for MSK modulation is the same as the frequency of the reference carrier signal, with the other being 1.5 times the frequency of the reference carrier signal. That is, the one of the two signal waveforms used in the MSK modulation is cos(ωt) or −cos(ωt), with the other being cos(1.5ωt) or −cos(1.5ωt).

Figure 4B:
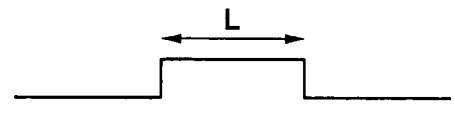
Figure 4C:

When data for modulation is inserted into the wobble signal of the optical disc 1, a data stream of the data for modulation is differentially encoded in terms of a clock corresponding to the wobbling period as a unit, as shown in FIG. 4C. That is, the stream of the data for modulation and delayed data obtained on delaying the reference carrier signal by one period are processed with differential operation. Data obtained on this differential operation is termed pre-code data.

Figure 4D:
Figure 4E:
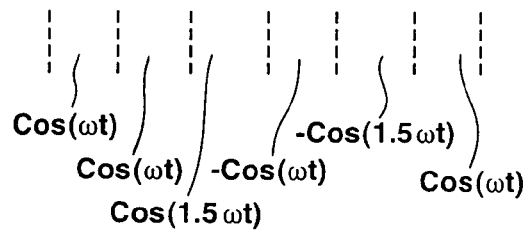

This pre-code data is then MSK-modulated to generate an MSK stream. The signal waveform of this MSK stream, shown in FIG. 4D, is such a one in which the signal waveform is the waveform of the same frequency as that of the reference carrier (cos(ωt)) of the same frequency as the reference carrier or its inverted waveform (−cos(ωt)) when the pre-code data is "0", and in which signal waveform is the waveform of a frequency 1.5 times the frequency of the reference carrier (cos(1.5ωt)) or its inverted waveform (−cos (1.5ωt)) when the pre-code data is "1". Thus, if a data sequence of the data for modulation is of a pattern "010", as shown in FIG. 4B, the MSK stream is of such a waveform comprised of cos(ωt), cos(ωt), cos(1.5ωt), −cos(ωt), −cos (1.5ωt), cos(ωt), from one wobbling period to the next, as shown in FIG. 4E.

In the optical disc 1, the wobble signal is turned into the above-described MSK stream to modulate the wobble signal with the data for modulation.

It is noted that, when the data for modulation is differentially encoded and MSK modulated, as described above, synchronous detection of the data for modulation becomes possible for the following reason:

With the differentially encoded data (pre-code data), the bit asserts itself (becomes "1") at a code change point of the data for modulation. Since the code length of the data for modulation is set so as to be not less than twice the wobbling period, the reference carrier signal (cos(ωt)) or its inverted signal (−cos(ωt)) is necessarily inserted into the latter half of the code length of the data for modulation. When the bit of the pre-code data is "1", a sinusoidal waveform portion of a frequency 1.5 times the frequency of the reference carrier signal is inserted. At a code changeover point, waveform portions are interconnected with phase matching. Consequently, the signal waveform portion, inserted in the latter half of the code length of the data for modulation, is necessarily the reference carrier signal (cos(ωt)) or its inverted signal wavelength (−cos(ωt)) when the data for modulation is "0" or "1", respectively. The synchronous detected output is positive or negative if the output is in phase with or inverted with respect to the carrier signal, respectively, so that modulated data may be demodulated by synchronous detection of the MSK modulated signals with the reference carrier signal.

Meanwhile, in MSK modulation, modulation takes place with phase matching at a code changeover point, so that delay is produced before level inversion of a synchronous detection signal. Thus, in demodulating the MSK modulated signal, an integration window of the synchronous detection output is delayed by one-half wobbling period to realize a correct detection output.

Figure 5:
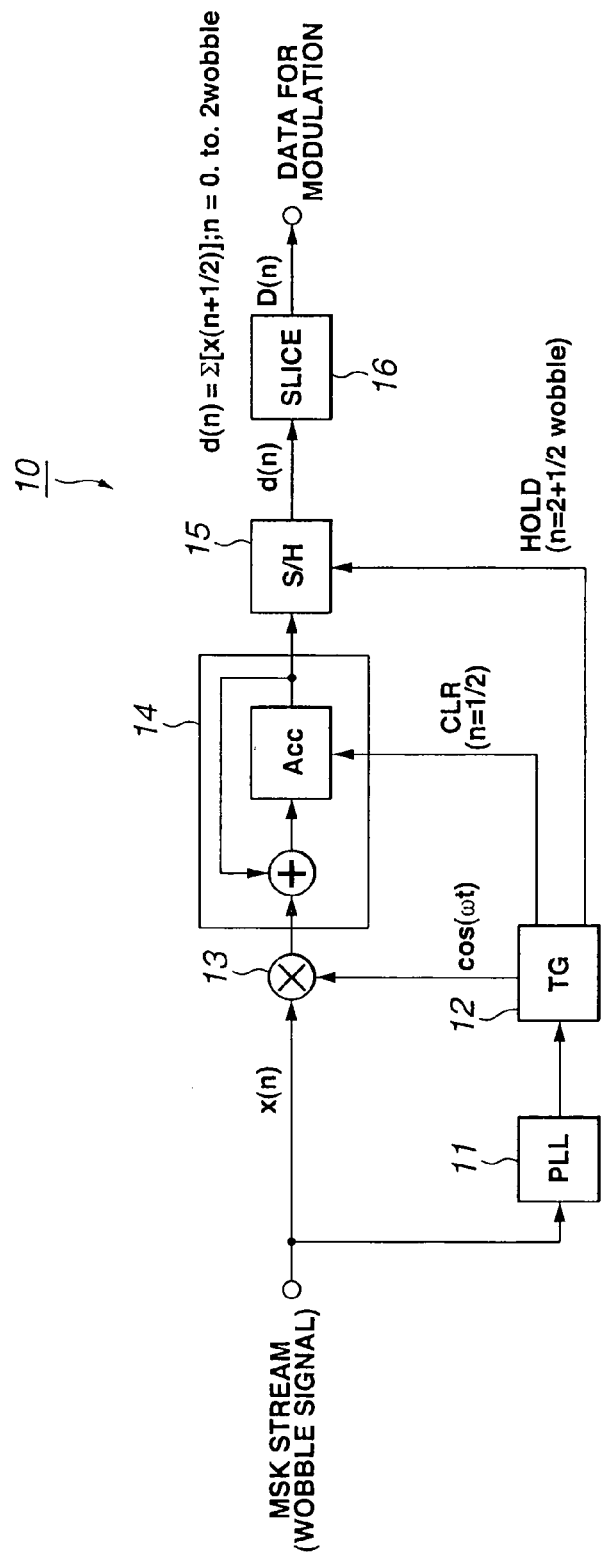
FIG. 5 is a block diagram showing an MSK demodulating circuit for demodulating the MSK modulated wobble signals according to the present invention.

FIG. 5 shows an MSK demodulation circuit for demodulating the data for modulation from the above-described MSK stream.

Referring to FIG. 5, an MSK demodulation circuit 10 includes a PLL circuit 11, a timing generator (TG) 12, a multiplier 13, an integrator 14, a sample/hold (SH) circuit 15 and a slicing circuit 16.

A wobble signal (an MSK modulated stream) is input to the PLL circuit 11. This PLL circuit 11 detects an edge component from the input wobble signal to generate wobble clocks synchronized with the reference carrier signal (cos (ωt)). The so generated wobble clocks are sent to the timing generator 12.

The timing generator 12 generates the reference carrier signal (cos(ωt)) synchronized with the input wobble signal. The timing generator 12 generates a clear signal (CLR) and a hold signal (HOLD) from the wobble clocks. The clear signal (CLR) is such a signal which is generated at a timing delayed by one-half period from the lead-in edge of the data clock of the data for modulation having the two wobbling periods as the minimum code length. The hold signal (HOLD) is such a signal generated at a timing delayed by one-half period from the trailing edge of the data clock of the data for modulation. The reference carrier signal (cos(ωt)), generated by the timing generator 12, is supplied to the multiplier 13. The generated clear signal (CLR) is supplied to the integrator 14. The generated hold signal (HOLD) is supplied to the sample/hold circuit 15.

The multiplier 13 multiplies the input wobble signal with the reference carrier signal (cos(ωt)) to execute synchronous detection processing. The synchronous-detected output signal is supplied to the integrator 14.

The integrator 14 integrates the synchronous-detected signal from the multiplier 13. Meanwhile, the integrator 14 clears the integrated value to zero at a timing of generation of the clear signal (CLR) by the timing generator 12.

The sample/hold circuit 15 samples the integrated output value of the integrator 14, at a timing of generation of the hold signal (HOLD) by the timing generator 12, and holds the sampled value until occurrence of the next hold signal (HOLD).

The slicing circuit 16 binary-encodes the value held by the sample/hold circuit 15, with the point of origin (0) as a threshold value, and outputs the resulting bi-level signal as its sign is inverted.

An output signal of this slicing circuit 16 becomes the demodulated data for modulation.

Figure 6:
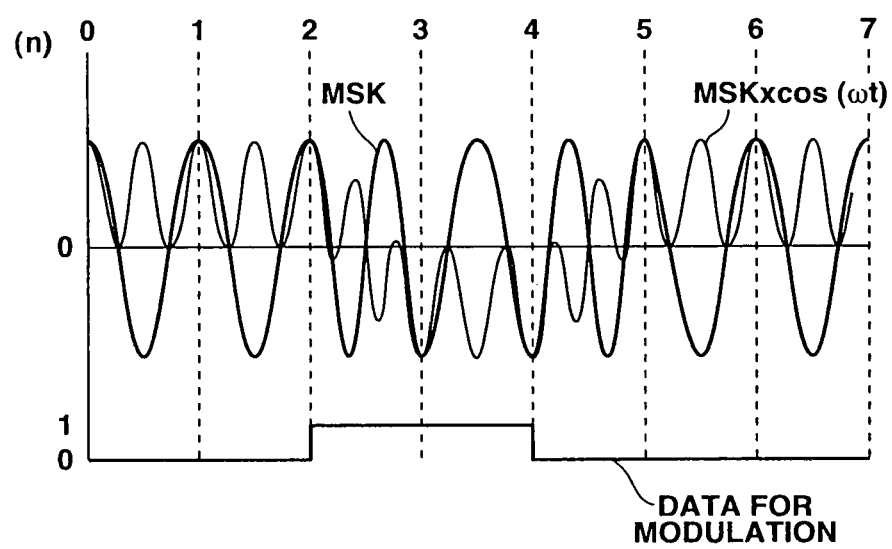
FIG. 6 is a waveform diagram showing input wobble signals and synchronous detected output signals.
Figure 7:
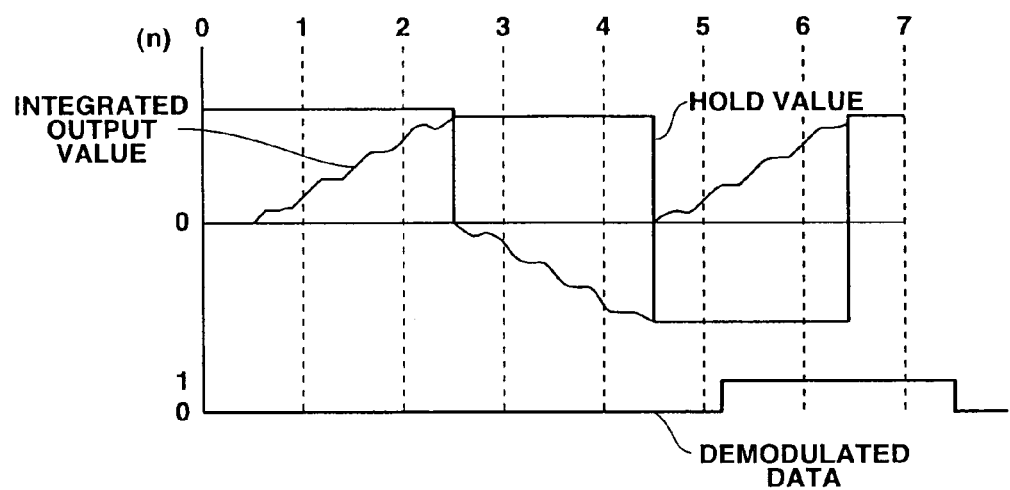
FIG. 7 is a waveform diagram showing an integrated output value of the synchronous output signal of the MSK stream, the held value of the integrated output value and MSK demodulated data for modulation.

FIGS. 6 and 7 show the wobble signal (MSK stream) generated on MSK modulating the data for modulation which is the data sequence "0010", and output signal waveforms from respective circuit components when the wobble signal is input to the MSK demodulation circuit 10. In FIGS. 6 and 7, the abscissa (n) denotes the period numbers of the wobbling period. FIG. 6 shows the input wobble signal (MSK stream) and a synchronous detection output signal of the wobble signal (MSK×cos($\omega$t)). FIG. 7 shows an integrated output value of the synchronous detection output signal, the held value of the integrated output value, and the data for modulation output demodulated from the slicing circuit 16. Meanwhile, the data for modulation output demodulated from the slicing circuit 16 is delayed due to processing delay caused in the integrator 14.

The synchronous detection of the data for modulation becomes possible in case the data for modulation is differentially encoded and MSK modulated as described above.

In the optical disc 1, the MSK modulated address information is included in the wobble signal, as described above. By MSK modulating the address information and by including it in the wobble signal, high frequency components included in the wobble signal are diminished to enable accurate address detection. Moreover, since the MSK modulated address information is inserted into the monotone wobble, the crosstalk which might otherwise be given to the neighboring track(s) may be diminished to improve the S/N ratio. Additionally, with the present optical disc 1, in which the MSK modulated data can be demodulated on synchronous detection, the wobble signal can be demodulated accurately and easily.

1-3 HMW Modulation

The address information modulating system, employing the HMW modulation system, is hereinafter explained.

The HMW modulation modulates digital codes by summing even-numbered harmonics signals to a sinusoidal carrier signal as described above and changing the polarity of the harmonics signals in dependence upon the sign of the data for modulation.

With the optical disc 1, the carrier signal of the HMW modulation is the signal of the same frequency and phase as those of the reference carrier signal (cos($\omega$t)) which is the carrier signal for the MSK modulation. The even harmonics signals to be summed to the carrier signal is the second harmonics of the reference carrier signal (cos($\omega$t)), that is sin(2$\omega$t) or −sin(2$\omega$t), with the amplitude which is −12 dB with reference to the amplitude of the reference carrier signal. The minimum code length of the data for modulation is twice the wobbling period (period of the reference carrier signal).

When the code of the data for modulation is "1" or "0", sin(2$\omega$(t) or −sin(2$\omega$t) is summed for modulation to the carrier signal, respectively.

Figure 8A:
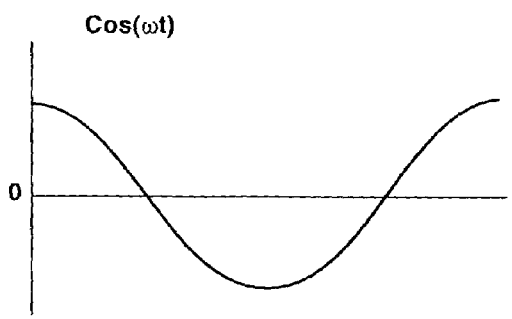
FIG. 8A to C illustrates HMW modulation according to the present invention.
Figure 8B:
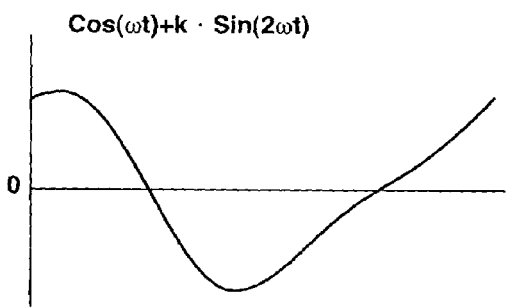
Figure 8C:
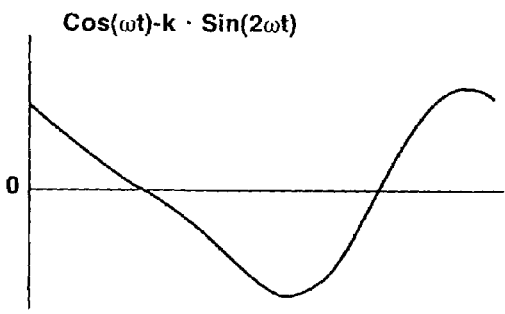

FIG. 8 shows a signal waveform obtained on modulating the wobble signal in accordance with the above-described system. Specifically, FIG. 8(A) shows a signal waveform of the reference carrier signal (cos($\omega$t)). FIG. 8(B) shows a signal waveform obtained on summing sin(2$\omega$t) to the reference carrier signal (cos($\omega$t)), that is a signal waveform when the data for modulation is "1". FIG. 8(C) shows a signal waveform obtained on summing −sin(2$\omega$t) to the reference carrier signal (cos($\omega$t)), that is a signal waveform when the data for modulation is "0".

Although the harmonics signals to be summed to the carrier signal are the second harmonics in the above optical disc 1, any suitable even-numbered harmonics, other than the second harmonics, may be summed as described above.

Moreover, although only the second harmonics are summed in the optical disc 1 as described above, plural even-numbered harmonics signals, such as the second and fourth harmonics, may also be summed simultaneously, as described above.

If positive and negative even-numbered harmonics signals are summed to the reference carrier signal as described above, the data for modulation may be demodulated by synchronous detection by the harmonics signals and by integrating the synchronous detection output for the code length time duration of the data for modulation.

Figure 9:
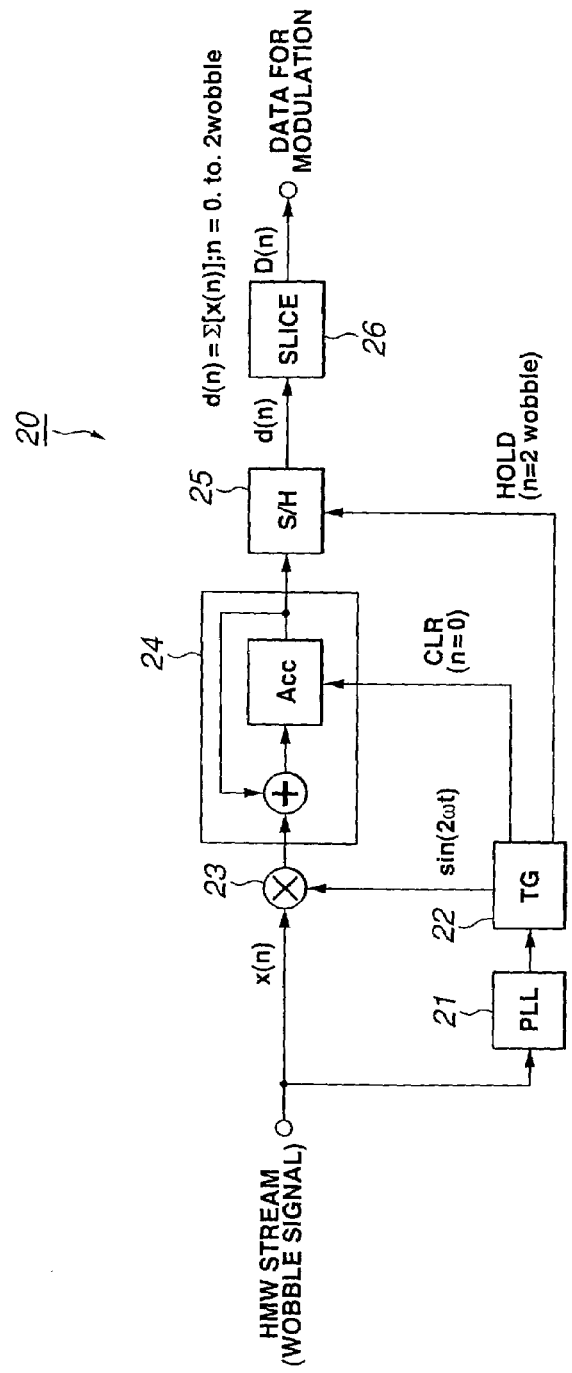
FIG. 9 is a block diagram showing an HMW demodulation circuit for demodulating the HMW modulated wobble signals.

FIG. 9 shows an HMW demodulating circuit for demodulating the data for modulation from the HMW modulated wobble signal.

Referring to FIG. 9, an HMW demodulating circuit 20 includes a PLL circuit 21, a timing generator (TG) 22, a multiplier 23, an integrator 24, a sample/hold (SH) circuit 25 and a slicing circuit 26, as shown in FIG. 9.

The PLL circuit 21 is supplied with a wobble signal (HMW modulated stream). The PLL circuit 21 detects an edge component from the input wobble signal to generate wobble clocks synchronized with the reference carrier signal (cos($\omega$t)). The so generated wobble clocks are sent to the timing generator 22.

The timing generator 22 generates second harmonics signal (sin(2$\omega$t)) synchronized with the input wobble signal. The timing generator 22 generates a clear signal (CLR) and a hold signal (HOLD) from the wobble clocks. The clear signal (CLR) is generated at a timing of a lead-in edge of the data clock of the data for modulation in which the minimum code length corresponds to two wobbling periods. The hold signal (HOLD) is a signal generated at the timing of a trailing edge of the data clock of the data for modulation. The second harmonics signal (sin(2$\omega$t)), generated by the timing generator 22, is supplied to the multiplier 23. The generated clear signal (CLR) is supplied to the integrator 24, while the generated hold signal (HOLD) is supplied to the sample/hold circuit 25.

The multiplier 23 multiplies the input wobble signal with the second harmonics signal (sin(2$\omega$t)) to carry out synchronous detection processing. The synchronous detected output signal is supplied to the integrator 24.

The integrator 24 integrates the synchronous detected signal from the multiplier 23. Meanwhile, the integrator 24 clears the integrated value to zero at the timing of generation of the clear signal (CLR) by the timing generator 22.

The sample/hold circuit 25 samples an integrated output value of the integrator 24 at a timing of generation of the hold signal (HOLD) by the timing generator 22 to hold the sampled value until such time the next hold (HOLD) signal is produced.

The slicing circuit 26 binary-encodes a value held by the sample/hold circuit 25, with the point of origin (0) as a threshold value, and outputs the code for the value.

It is an output signal of the slicing circuit 26 that is to be the demodulated data for modulation.

Figure 10:
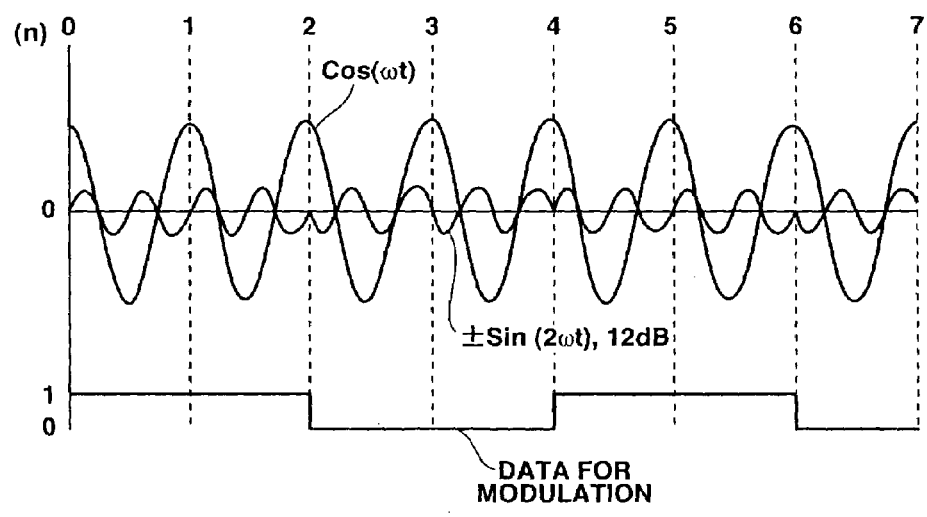
FIG. 10 is a waveform diagram of the reference carrier signal, second harmonics signals, data for modulation and the second harmonics signals generated in dependence upon the data for modulation.
Figure 11:
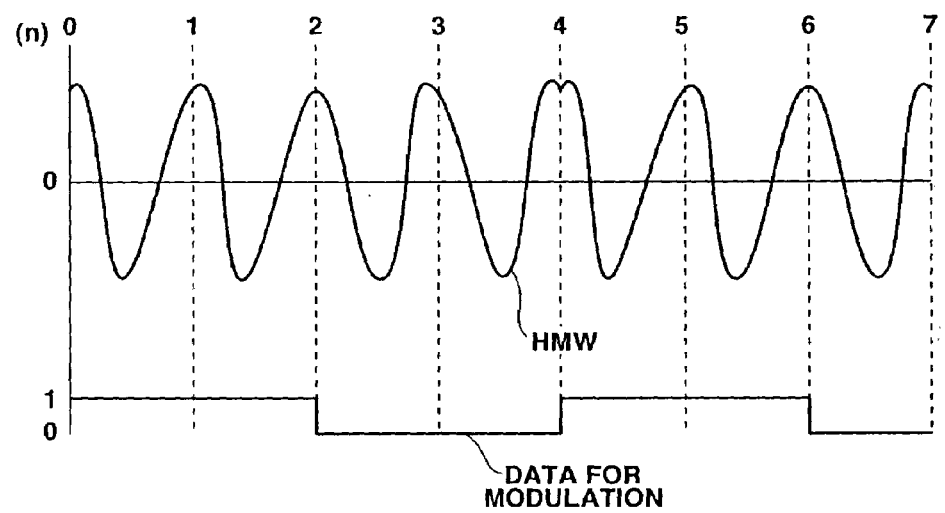
FIG. 11 is a waveform diagram of an HMW stream generated according to the present invention.

FIGS. 10 to 12 show a signal waveform used in HMW modulating the data for modulation in the form of a data sequence "1010", the wobble signal produced on HMW modulation, and output signal waveforms from respective circuit components when the wobble signal is input to the MSK demodulation circuit 20. In FIGS. 10 to 12, the abscissa (n) denotes the period numbers of the wobbling period. FIG. 10 shows the reference carrier signal (cos($\omega$t)), data for modulation in the form of a data string "1010" and a second harmonics signal waveform generated in association with the data for modulation (±sin(2$\omega$t), −12 dB). FIG.

Figure 12A:
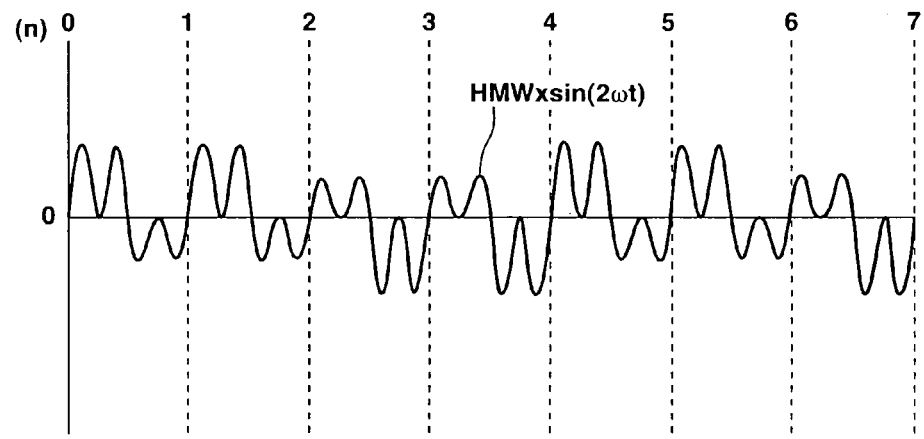
FIG. 12A is a waveform diagram of a synchronous detected output signal of the HMW stream, according to the present invention.
Figure 12B:
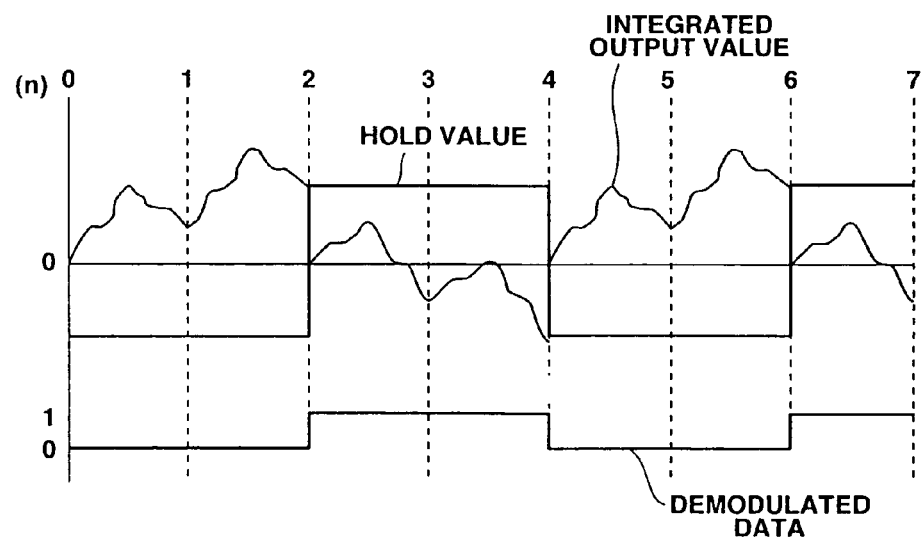
FIG. 12B is a waveform diagram of an integrated output value of the synchronous detected output signal, held values of the integrated output value and the HMW demodulated data for modulation, according to the present invention.

11 shows the generated wobble signal (HMW stream). FIG. 12A shows a synchronous detection output signal of the wobble signal (HMW×sin(2ωt)). FIG. 12B shows an integrated output value of the synchronous detection, the held value of the integrated output value, and the data for modulation output demodulated from the slicing circuit 26. Meanwhile, the data for modulation output demodulated from the slicing circuit 26 has been delayed due to order one delay caused in the integrator 14.

The data for modulation can be synchronous-detected, in case the data for modulation is differentially encoded and HMW-modulated, as described above.

With the optical disc 1, the HMW modulated address data is included in the wobble signal, as described above. By HMW modulating the address information and including the resulting HMW modulated address data in the wobble signal, it is possible to limit the frequency components and to reduce high frequency components. The result is that the demodulated output of the wobble signal can be improved in S/N to provide for accurate address detection. The modulation circuit can be formed by a carrier signal generating circuit, a circuit for generating its high frequency components and a circuit for summing output signals of these circuits. Since the high frequency components of the wobble signal may be reduced, cutting of an optical disc during its molding may be facilitated.

Since the HMW modulated address information is inserted into a monotone wobble, the crosstalk which might otherwise be given to the neighboring track(s) may be diminished to improve the S/N ratio. Additionally, with the present optical disc 1, in which the HMW modulated data can be demodulated on synchronous detection, the wobble signal can be demodulated accurately and easily.

1-4 Sum

In the present embodiment of the optical disc 1, described above, the MSK demodulating system and the HMW modulating system are used as a system for modulating the wobble signal with the address information. In the present optical disc 1, one of the frequencies used in the MSK demodulating system is the sinusoidal signal ($\cos(\omega t)$) of same frequency as that of the carrier frequency used in the HMW modulating system. Additionally, monotone wobbles, comprised only of the carrier signals ($\cos(\omega t)$), not modulated by data, are provided in the wobble signal between neighboring modulated signals.

With the present embodiment of the optical disc 1, the signals of the frequencies used in the MSK modulation and the high frequency signals used in the HMW modulation do not interfere with each other so that the respective signals are not affected by the modulation components of the counterpart system during respective modulation processes. Consequently, the respective address information, recorded in the two modulation systems, may be reliably detected to provide for improved accuracy in controlling e.g., the track position at the time of recording and/or reproduction of the optical disc.

If the address information recorded with the MSK modulation and that recorded with the HMW modulation are of the same data content, the address information can be detected more reliably.

Moreover, with the present embodiment of the optical disc 1, in which the one of the frequencies used in the MSK demodulating system is the sinusoidal signal ($\cos(\omega t)$) of same frequency as that of the carrier frequency used in the HMW modulating system, and in which the MSK demodulation and the HMW modulation are performed at different sites in the wobble signal, it is sufficient to sum the harmonics signals to the MSK modulated wobble signal at the wobble position for HMW modulation, at the time of modulation, thus enabling the two modulations to be carried out extremely simply. By executing the MSK demodulation and the HMW modulation at different locations in the wobble signal, and by providing at least one monotone wobble between these different locations, it is possible to manufacture the disc more accurately and to demodulate the address more reliably.

2. Typical Application to DVR 2-1 Physical Properties of a DVR Disc

A typical application of the aforementioned address format to a high density optical disc, termed a DVR (Data and Video Recording), is hereinafter explained.

Typical physical parameters of the DVR disc, to which the present address format is applied, are now explained. It should be noted that these physical parameters are merely illustrative such that the ensuing explanation may be applied to an optical disc of other different physical characteristics.

An optical disc, which is to be the DVR disc of the present embodiment, is such an optical disc which carries out data recording in accordance with the phase change system. As for the disc size, the diameter is 120 mm and the disc thickness is 1.2 mm. That is, as for these points, the present optical disc is similar to a disc of the CD (Compact Disc) format or to a disc of the DVD (Digital Versatile Disc), insofar as the appearance of the disc is concerned.

The laser wavelength for recording and/or reproduction is 405 nm, such that the so-called blue laser light is used. The NA of the optical system is 0.85.

The track pitch of tracks, on which phase change marks are recorded, is 0.32 μm, with the line density being 0.12 μm. The format efficiency is approximately 82%, with the 0 tablock at 64 kB as one recording and/or reproduction unit. The user data capacity of 23.3 GB is achieved with a disc with a diameter of 12 cm.

The data recording is of a groove recording system, as described above.

Figure 13:
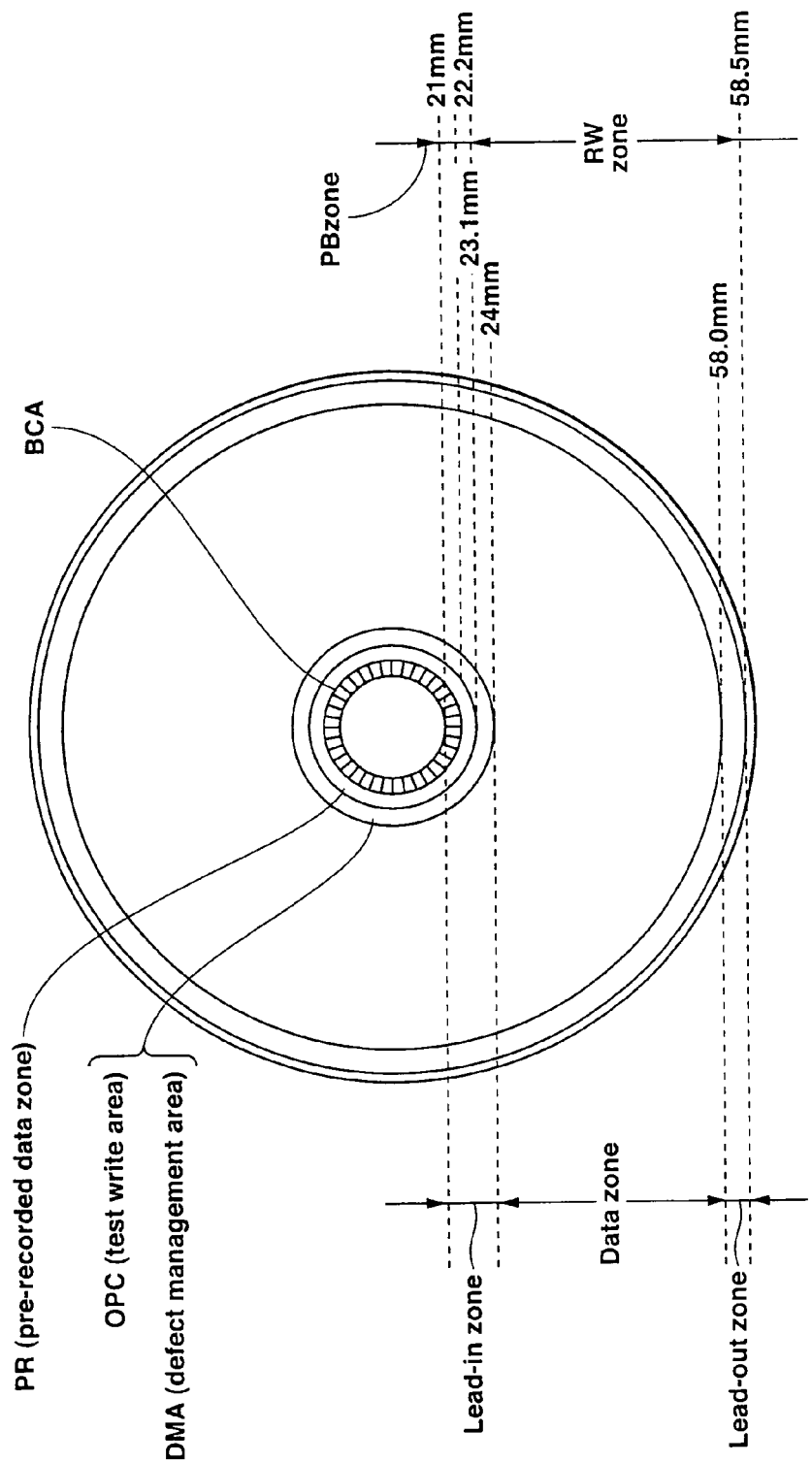
FIG. 13 illustrates the disc layout according to the present invention.

FIG. 13 shows the layout (area structure) of the overall disc.

As for the area on the disc, a lead-in zone, a data zone and a lead-out zone are provided, looking from the inner rim side.

As for the area pertinent to recording and/or reproduction, the inner rim area corresponding to the lead-in zone is a PB zone (playback or read-only area), while the area from the outer rim side of the lead-in zone to the lead-out zone is the RW zone (read/write or recording and/or reproduction area).

The lead-in zone is disposed more inwardly than the radius of 24 mm. An area between the radius of 21 mm and the radius of 22.2 mm is a BCA (Burst Cutting Area). In this BCA, there is recorded a unique ID proper to the disc-shaped recording medium and which is obtained on burning off the recording layer. Bar-code-like recording data are formed by forming concentrically arrayed recording marks.

An area between the radius of 22.2 mm and the radius of 23.1 mm represents a pre-recorded zone (PR).

In the pre-recorded zone, there are prerecorded the disc information, such as recording and/or reproduction power conditions, and the information used for copy protection (pre-recorded information), by wobbling a spirally extending groove on the disc.

These represent non-rewritable replay-only information. That is, the BCA and the pre-recorded data zone represent the aforementioned PB zone (replay-only zone).

In the pre-recorded data zone, the copy protection information, for example, is contained as the pre-recorded information. Using this copy protection information, the following, for example, may be made:

In the present optical disc system, there is provided a medium key or a drive key, indicating that a registered drive device producer or a registered disc producer is able to conduct business and has been registered for conducting the business.

In case of hacking, the associated drive key or medium key is recorded as the copy protection information. Based on this information, the medium or the drive having the medium key or the drive key may be disabled for recording or reproduction. In the lead-in area, there are provided a test write area OPC and a defect management area DMA in an area between the radius of 23.1 mm and the radius of 24 mm.

The test write area OPC is used for test writing in setting the recording and/or reproduction conditions, such as laser power used in recording and/or reproduction, phase change marks and so forth.

The defect management area DMA is an area in which the information supervising the defect information on the disc is recorded and/or reproduced.

The area between the radius of 24.0 mm and the radius of 58.0 mm represents a data zone. The data zone is an area used for recording and/or reproducing user data based on phase change marks.

The area between the radius of 58.0 mm and the radius of 58.5 mm represents a lead-out zone. The lead-out zone may be provided with a defect management area, as in the lead-in zone, or may be used as a buffer area which may be overrun in seeking.

It is noted that the lead-out in the meaning of the terminal area for recording and/or reproduction may be on an inner rim side in case of a multi-layered disc.

The disc area from the radius of 23.1 mm, that is from the test write area, up to the lead-out zone, represents an RW zone (recording and/or reproducing area) in which the phase change marks are recorded and/or reproduced.

Figure 14A:
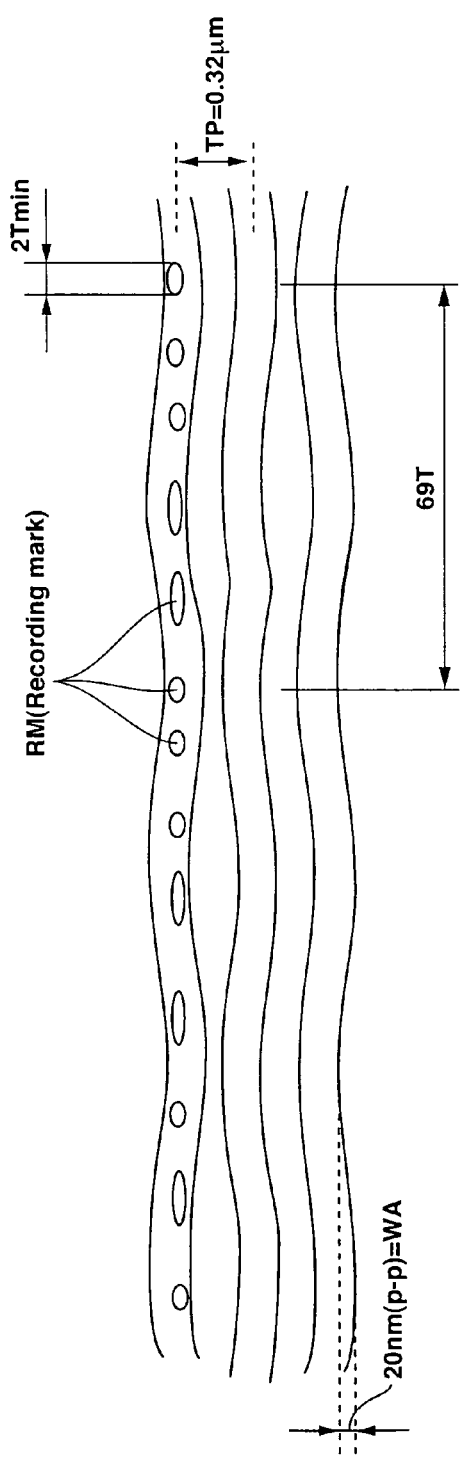
FIGS. 14A and 14B illustrate wobbling of the RW and PB zones according to the present invention, respectively.
Figure 14B:
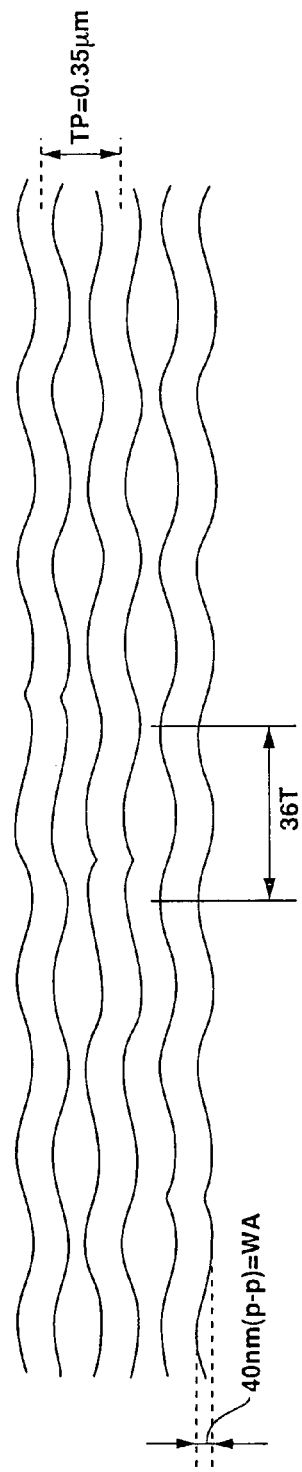

FIG. 14 shows the state of the tracks for the RW zone and the PB zone. Specifically, FIG. 14A shows groove wobbling in an RW zone, while FIG. 14B shows the state of groove wobbling in a pre-recorded zone in the PB zone.

In the RW zone, the address information (ADIP) is previously formed by wobbling a groove formed extending spirally on a disc for tracking.

For the groove, carrying the address information, the information is recorded and/or reproduced, based on the phase change marks.

Referring to FIG. 14A, the groove in the RW zone, that is the groove track, carrying the ADIP address information, has a track pitch TP=0.32 μm.

On this track are recorded recording marks (RM) by the phase change marks. The phase change marks are recorded to a line density of 0.12 μm/bit or 0.08 μm/ch bit, in accordance with an RLL (1, 7) PP modulation system (RLL: Run Length Limited, PP: Parity preserve/Prohibit rmtr (repeated minimum transition run length)).

If a 1 ch bit is 1 T, the mark length is from 2 T to 8 T, with the shortest mark length being 2 T.

As for the address information, the wobbling period is 69 T, with the wobbling amplitude WA being approximately 20 nm (p-p).

The address information and the phase change marks are designed so that the frequency ranges thereof will not overlap to eliminate possible influence on detection.

The post-recording CNR (carrier noise ratio) value of the wobbling of the address information is 30 dB for a band width of 30 kHz, while the address error rate, inclusive of the perturbation (disc skew, defocusing or interference) is $1\times10^{-3}$ or less.

It is noted that the track by the groove in the PB zone in FIG. 14B is wider in track pitch than the track by the groove in the RW zone in FIG. 14A, with the wobbling amplitude being larger.

That is, the track pitch TP=0.35 μm, the wobbling period is 36 T and the wobbling amplitude WA is approximately 40 nm (p-p). The wobbling period being 36 T indicates that the recording line density of the pre-recorded information is higher than the recording line density of the ADIP information. On the other hand, since the shortest duration of the phase change marks is 2 T, the recording line density of the pre-recorded information is higher than that of the phase change marks.

In the track of this PB zone, no phase change marks are recorded.

While the wobbling waveform is recorded as a sinusoidal wave in the RW zone, it may be recorded as a sinusoidal wave or a rectangular wave in the PB zone.

If the phase change marks are of a signal quality of the order of 50 dB, in terms of the CNR, for the bandwidth of 30 kHz, the symbol error rate after error correction of $1\times10^{-16}$ or less may be achieved in a known manner by appending the ECC (error correction code) to the data, so that the phase change marks may be used for data recording and/or reproduction.

The CNR of the wobble for the ADIP address information is 35 dB, in a non-recorded state of the phase change marks, for the band width of 30 kHz.

As for the address information, this signal quality suffices, provided that interpolation protection is made on the basis of the so-called continuity check or discrimination. However, as for the pre-recorded information, recorded in the PB zone, the signal quality of 50 dB, in terms of the CNR, or higher, equivalent to that of the phase change marks, is desirable. For this reason, there is formed in the PB zone a groove physically different from the groove in the RW zone, as shown in FIG. 14B.

First, by enlarging the track pitch, the crosstalk from the neighboring track may be suppressed. By doubling the wobbling amplitude, the CNR can be improved by +6 dB.

Moreover, by employing a rectangular wave as the wobbling waveform, the CNR may be improved by +2 dB.

Thus, the CNR may be 43 dB in total.

The recording bandwidth for the phase change marks and that for the wobble in the pre-recorded data zone are 18 T (one half of 36 T) and 2 T, respectively, so that the CNR may be improved in this respect by 9.5 dB.

Consequently, the CNR as the pre-recorded information is equivalent to 52.5 dB. If the crosstalk from the neighboring track is estimated to be −2 dB, the CNR is on the order of 50.5 dB. This signal quality is substantially equivalent to that of the phase change marks, and hence the wobbling signals may safely be used for recording and/or reproduction of the pre-recorded information.

Figure 15:
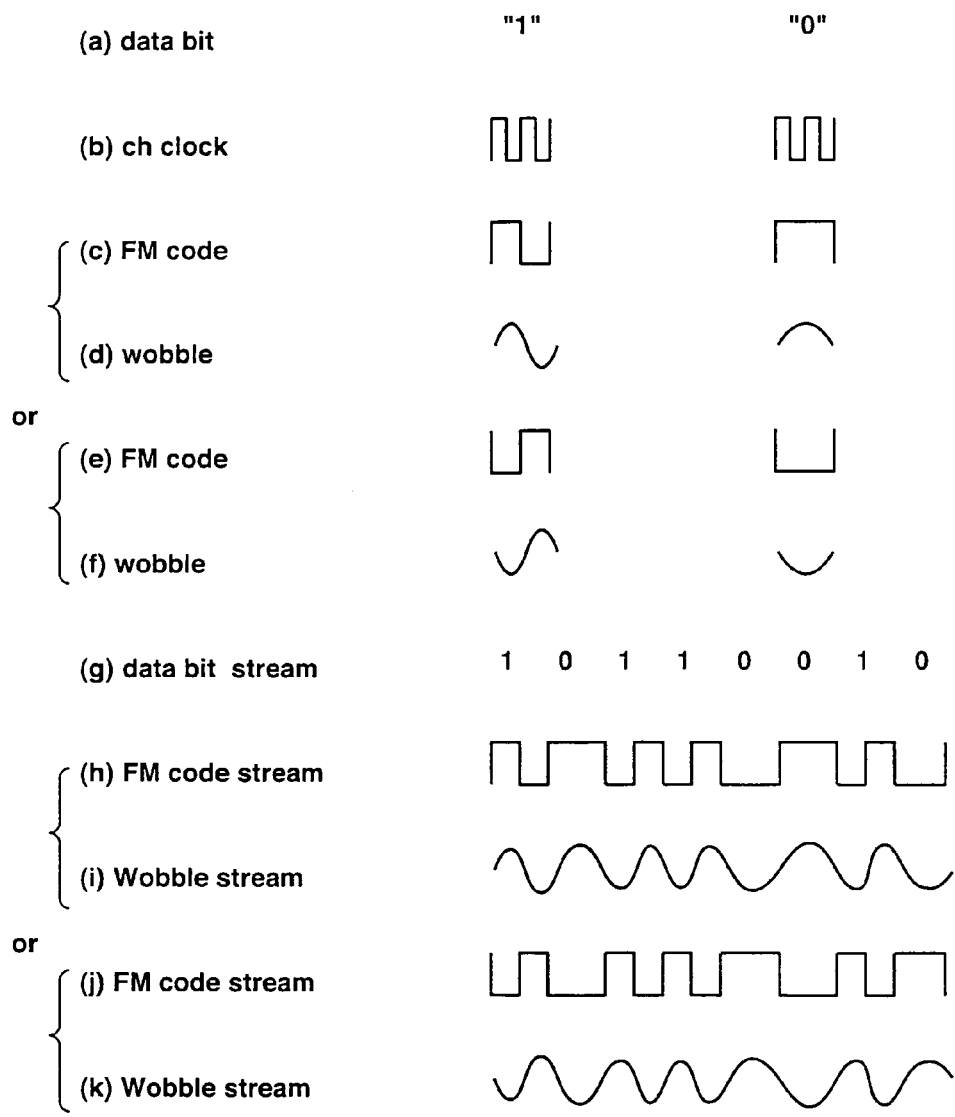
FIG. 15 illustrates a modulation system for the prerecorded information according to the present invention.

FIG. 15 shows the method for modulating the pre-recorded information for forming a wobbling groove in the pre-recorded data zone.

For modulation, FM codes are used.

FIGS. 15(a), 15(b), 15(c) and 15(d) show databits, channel clocks, FM codes and the wobbling waveform, in vertical array.

One data bit is 2 ch (2 channel clocks). When the bit information is [1], the frequency of the FM code is one-half of the channel clock frequency.

When the bit information is [0], the FM code is represented by the frequency which is one-half of that of the bit information [1].

As for the wobble waveform, the FM code may directly be recorded by a rectangular wave. Alternatively, it may also be recorded by a sinusoidal wave.

The FM code and the wobble waveform may be recorded as patterns shown in FIGS. 15(e) and 15(f), that is as patterns of opposite polarity to that of FIGS. 15(c) and 15(d).

In the above-described FM code modulation pattern, the FM code waveform and the wobble waveform (sinusoidal waveform) when the data bit stream is [10110010] as shown in FIG. 15(g) are as shown in FIGS. 15(h) and 15(i), respectively.

If the patterns shown in FIGS. 15(e) and 15(f) are used, the FM code waveform and the wobble waveform (sinusoidal waveform) are as shown in FIGS. 15(j) and 15(k), respectively.

2-2 ECC Format of Data

Referring to FIGS. 16 to 18, the ECC format for the phase change marks and the pre-recorded information is explained.

First, FIG. 16 shows the ECC format for main data (user data) recorded and/or reproduced with the phase change marks.

There are two error correction codes (ECCs), namely the LDC (Long Distance Code) for main data 64 kB (=2048 bytes for one sector×32 sectors) and BIS (Burst Indicator Subcode).

Figure 16A:
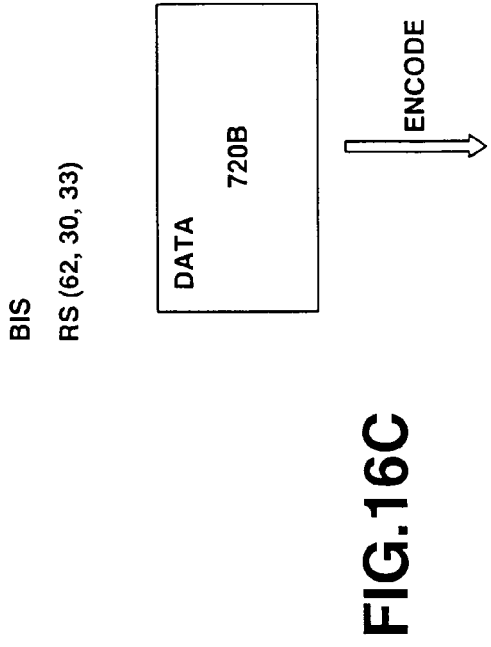
FIGS. 16A and 16D illustrate an ECC structure of phase change marks according to the present invention.
Figure 16B:
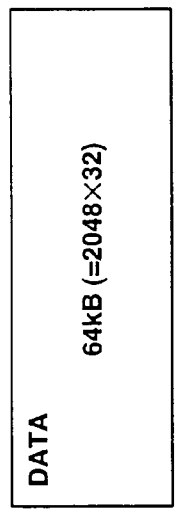

The main data of 64 kB, shown in FIG. 16A, are encoded as shown in FIG. 16B. Specifically, 4 B of EDC (Error Detection Code) is appended to one sector of 2048 B and LDC is encoded for 32 sectors. The LDC is an RS (Reed-Solomon) code, with RS (248,216,33), code length of 248 and with a distance of 33. There are provided 304 code words.

Figure 16C:
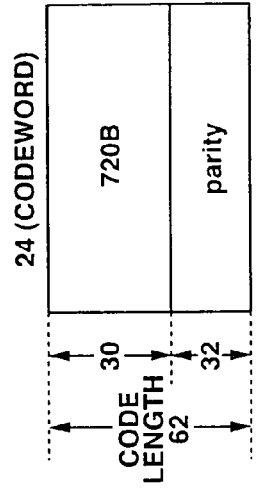
Figure 16D:
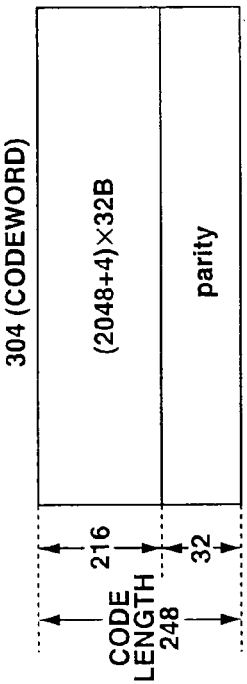
Figure 18A:
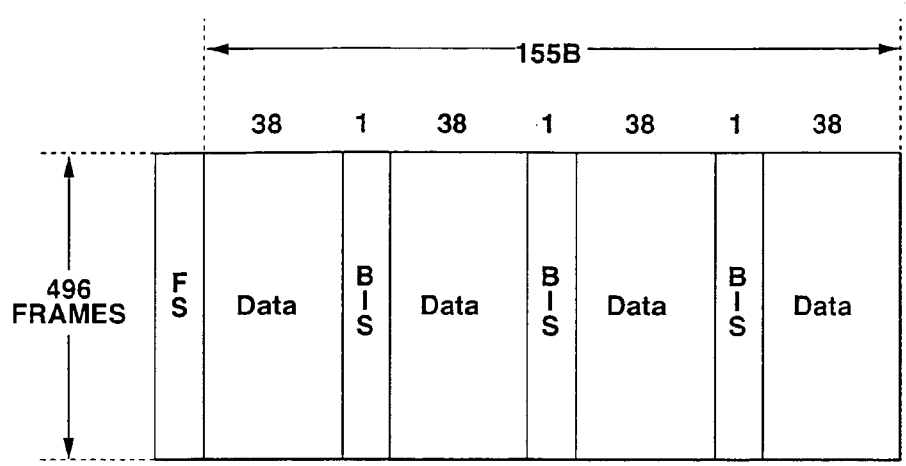
FIG. 18A illustrates the frame structure of the phase change marks according to the present invention.

As for the BIS, 720 B of data, shown in FIG. 16C, are ECC encoded, as shown in FIG. 16D. The BIS is the RS (Reed-Solomon code), with RS (62,30,33), codelength of 62, data of 30 and a distance of 33. There are provided 24 codewords. FIG. 18A shows a frame structure for main data in the RW zone.

The data of the aforementioned LDC and BIS make up a frame structure as shown. That is, data (38 B), BIS (1 B), data (38 B), BIS (1 B), data (38 B), BIS (1 B) and data (38 B) are provided for one frame to make up a structure of 155 B. That is, each frame is formed by 38 B×4=152 B data and BIS inserted at a rate of 1 B at an interval of 38 B.

A frame sync FS (frame synchronization signal) is arranged at the lead-in end of 1 frame of 155 B. There are 496 frames in one block.

As for the LDC data, even-numbered codewords of 0, 2, . . . are located at even-numbered frames of 0, 2, . . . , while odd-numbered codewords of 1, 3, . . . are located at odd-numbered frames of 1, 3, . . . .

The BIS uses a code having a correcting capability higher than that of the LDC code, and corrects substantially all errors. That is, the BIS uses a code with a distance of 33 for the codelength of 62.

Thus, the symbol of the BIS, in which an error has been detected, may be used as follows:

In ECC decoding, the BIS is decoded first. If, in the frame structure of FIG. 18A, a BIS and the frame synchronization FS neighboring thereto are both in error, data 38 B sandwiched therebetween are deemed to be in error. To this data of 38 B, an error pointer is appended. In the LDC, this error pointer is used to make pointer erasure correction.

This leads to a correction capability superior to that in case of using only the LDC.

There is contained the address information in the BIS. This address is used in case there is no address information by the wobbled groove in a ROM type disc.

FIG. 17 shows an ECC format for the pre-recorded information.

In this case, the ECC includes an LDC (Long Distance Code) for the main data of 4 kB (two sectors each made up by 2048 B) and BIS (Burst Indicator Subcode).

Figure 17A:
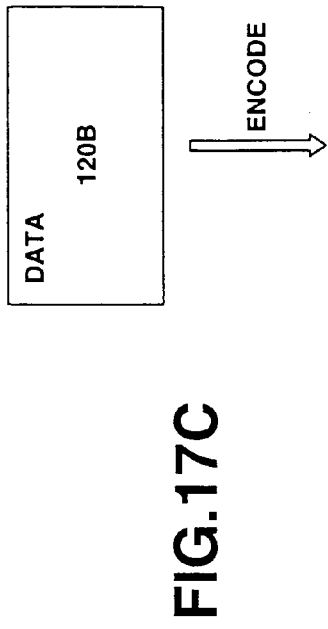
FIGS. 17A to 17D illustrate an ECC structure of the prerecorded information according to the present invention.
Figure 17B:
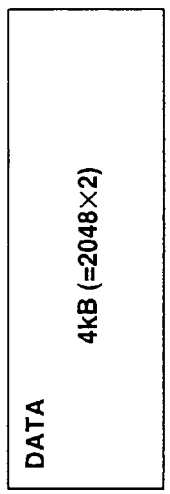

The data of 4 kB, as the pre-recorded information, shown in FIG. 17A, is ECC encoded, as shown in FIG. 17B. That is, 4 B of EDC (Error Detection Code) is appended to 2048 B of main data and the LDC of two sectors are encoded. The LDC is an RS (Reed-Solomon) code with RS (248,216,33), a codelength of 248, 216 data and a distance of 33. There are provided 19 codewords.

Figure 17C:
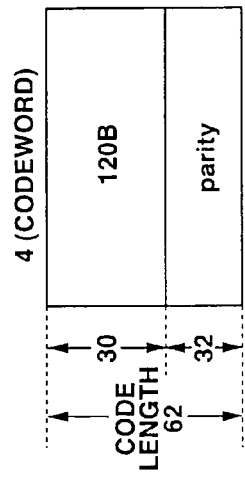
Figure 17D:
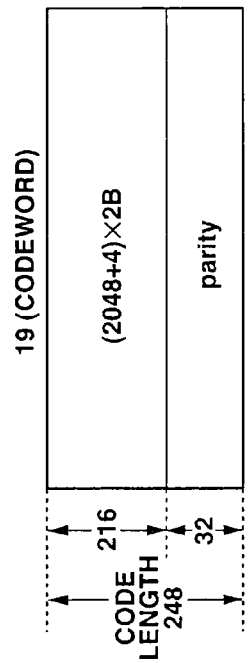

As for the BIS, 120 B of data shown in FIG. 17C is encoded, as shown in FIG. 17D. That is, BIS is an RS (Reed-Solomon) code with RS (62,30,33), a codelength of 62, 30 data and a distance of 33. There are provided four codewords.

Figure 18B:
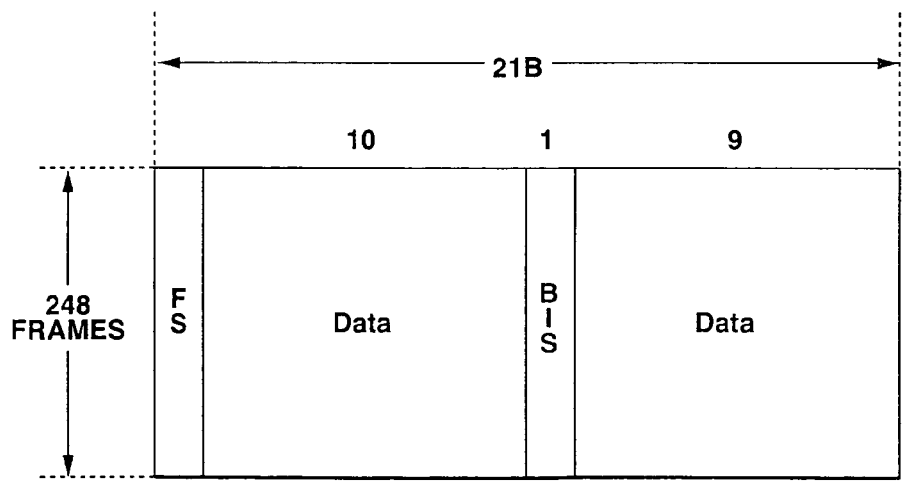
FIG. 18B illustrates the frame structure of the pre-recorded information according to the present invention.

FIG. 18B shows a frame structure for the pre-recorded information in the PB zone.

The data of the LDC and the BIS make up a frame structure shown. That is, the frame sync FS (1 B), data (10 B), BIS (1 B), and data (9 B) are arranged for one frame to provide a structure of 21 B. That is, one frame is made up by 19 B of data and 1 B of BIS.

The frame sync FS (frame synchronization signal) is arranged at the lead-in end of one frame. There are provided 248 frames in one block.

The BIS uses codes having a correcting capability higher than the LDC code and corrects substantially all errors. Thus, the symbol of the BIS, in which an error has been detected, may be used as follows:

In ECC decoding, the BIS is decoded first. If a BIS and the frame synchronization FS neighboring thereto are both in error, data 10 B or 9 B, sandwiched therebetween, is deemed to be in error. To this data of 10 B or 9 B, an error pointer is appended. In the LDC, this error pointer is used to make pointer erasure correction.

This leads to a correction capability superior to that in case of using only the LDC.

There is contained the address information in the BIS. In the pre-recorded data zone, the pre-recorded information is recorded by the wobbled groove, so that there is no address information by the wobbled groove, and hence the address in this BIS is used for accessing.

As may be seen from FIGS. 16 and 17, data by the phase change marks and the pre-recorded information use the same code and the same structure, insofar as the ECC format is concerned.

This means that the processing of ECC decoding of the pre-recorded information can be carried out in the circuitry responsible for ECC decoding in reproducing data by the phase change marks, so that the hardware structure as the disc driving apparatus may be improved in efficiency.

2-3 Address Format 2-3-1 Relationship Between the Data for Recording and/or Reproduction and the Address A recording and/or reproducing unit in the present embodiment of the DVR disc is a recording and/or reproducing cluster of a sum total of 498 frames made up by an ECC block of 156 symbols×496 frames, and a link area of one frame for PLL appended to each side of the cluster, as shown in FIG. 18. This recording and/or reproducing cluster is termed a RUB (Recording Unit Block).

With the address format of the present embodiment of the optical disc 1, one RUB (498 frames) is supervised by three address units (ADIP_1, ADIP_2 and ADIP_3), recorded as wobble. That is, one RUB is recorded for these three address units.

Figure 19A:
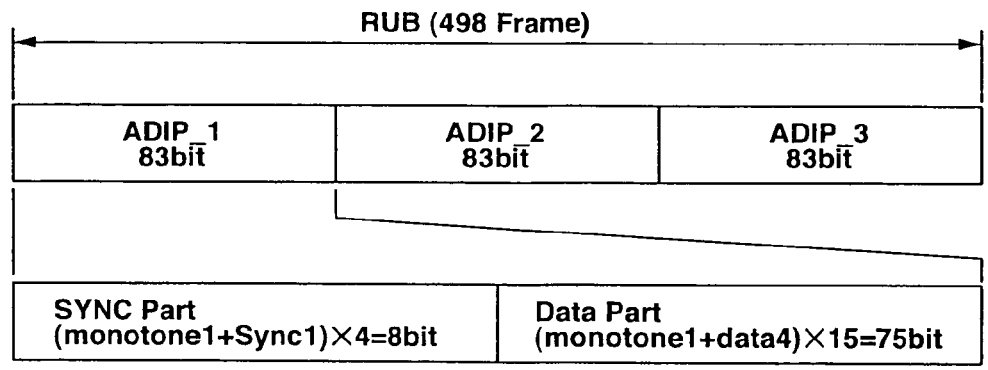
FIG. 19A illustrates the relation between the RUB and the address unit of the disc according to the present invention.
Figure 19B:
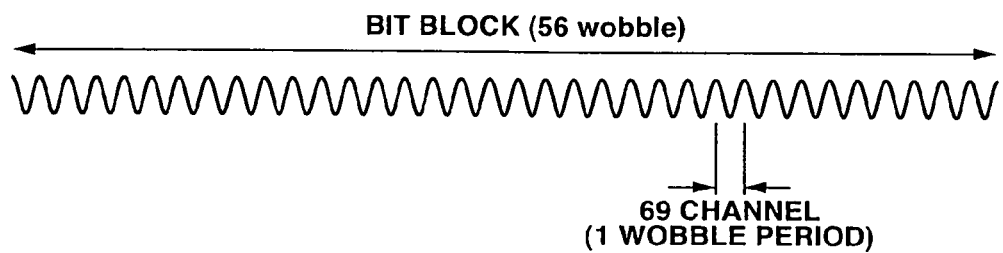
FIG. 19B illustrates a bit block forming an address unit.

In this address format, one address unit is formed by a sync part of 8 bits and a data part of 75 bits, totaling at 83 bits. In the present address format, the reference carrier signal of the wobble signal, recorded in the pre-groove, is (cos(ωt)), and a bit of the wobble signal is formed by 56 periods of this reference carrier signal, as shown in FIG. 19B. Consequently, the length of one period of the reference carrier signal (one wobble period) is 69 times one channel length of phase change. The 56 periods of the reference carrier signal, forming one bit, are termed the bit block.

2-3-2 Sync Part

Figure 20:
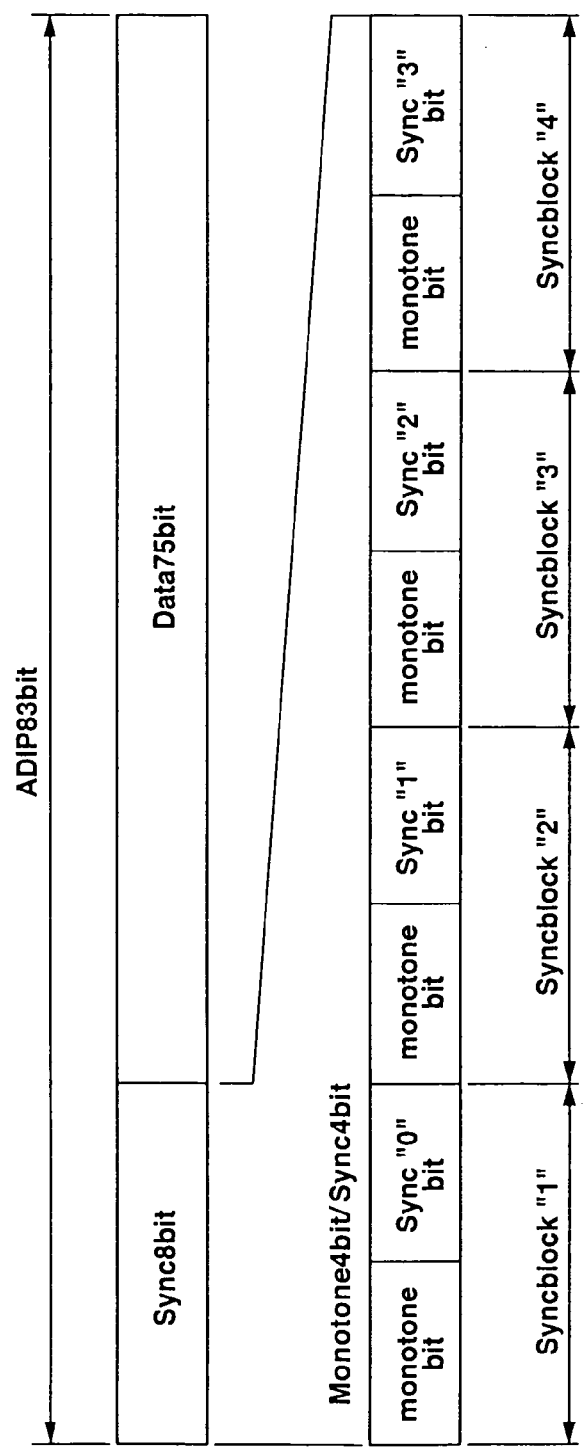
FIG. 20 illustrates a sync part of an address unit according to the present invention.

FIG. 20 shows a bit structure of a sync part in an address unit. The sync part, used for discriminating the lead-in end of the address unit, is made up by first to fourth sync blocks (sync block "1", sync block "2", sync block "3" and sync block "4"). Each sync block is formed by two bit blocks, namely a monotone bit and a sync bit.

Referring to FIG. 21A, showing the signal waveform of a monotone bit, the first to third wobbles of the bit block, made up by 56 wobbles, represent a bit synchronization mark BM, with the fourth to 56th wobbles, next following the bit synchronization mark BM, being monotone wobbles (signal waveform of the reference carrier signal (cos(ωt)).

The bit synchronization mark BM is a signal waveform generated on MSK modulation of data for modulation of a preset code pattern for discriminating the lead-in end of the bit block. That is, this bit synchronization mark BM is a signal waveform obtained on differentially encoding the data for modulation of a preset code pattern and allocating the frequency in dependence upon the code of the differentially encoded data. Meanwhile, the minimum codelength L of the data for modulation corresponds to two wobble periods. In the present embodiment, a signal waveform obtained on MSK modulating the data for modulation having one bit (two wobble periods) set to "1" is recorded as the bit synchronization mark BM. That is, the bit synchronization mark BM is a continuous signal waveform "cos(1.5ωt), −cos(ωt), −cos(1.5ωt)" in terms of a wobble period as a unit.

Consequently, the monotone bit may be generated by generating data for modulation "10000 . . . 00", having a codelength of two wobble periods, and by MSK modulating the generated data for modulation, as shown in FIG. 21B.

It is noted that the bit synchronization mark BM is inserted not only as the monotone bit in the sync part, but also at the lead-in end of each of all bit blocks as now explained. Thus, during recording and/or reproduction, this bit synchronization mark BM may be detected to synchronize the bit block in the wobble signal, that is the 56 wobbling periods. Additionally, the bit synchronization mark BM may be used as a reference for specifying the positions of insertion in the bit block of each of a variety of modulated signals as now explained.

In the signal waveform of the sync bit of the first sync block (sync "0" bit), made up by 56 wobbles, the first to third wobbles of the bit block represent the bit synchronization mark BM, while the 17th to 19th and 27th to 29th wobbles represent MSK modulation marks MM, with the remaining wobbles being all monotone wobbles in signal waveform, as shown in FIG. 22A.

In the signal waveform of the sync bit of the second sync block (sync "1" bit), made up by 56 wobbles, the first to third wobbles of the bit block represent the bit synchronization mark BM, while the 19th to 21st and 29th to 31st wobbles represent MSK modulation marks MM, with the remaining wobbles being all monotone wobbles in signal waveform, as shown in FIG. 23A.

In the signal waveform of the sync bit of the third sync block (sync "2" bit), made up by 56 wobbles, the first to third wobbles of the bit block represent the bit synchronization mark BM, while the 21st to 23rd and 31st to 33rd wobbles represent MSK modulation marks MM, with the remaining wobbles being all monotone wobbles in signal waveform, as shown in FIG. 24A.

Figures 25A, 25B:
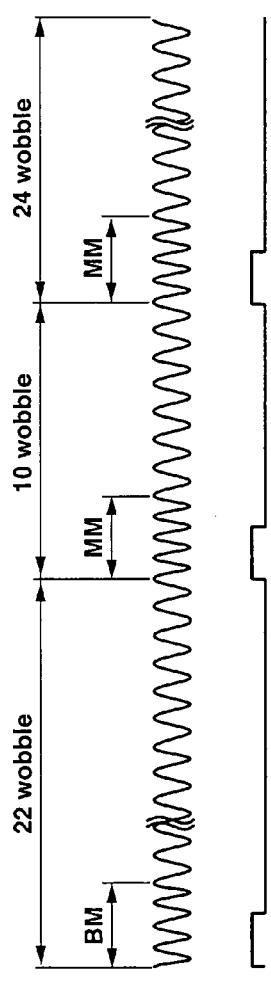
FIGS. 25A and 25B illustrate the signal waveform of a fourth sync bit in the sync part and data for MSK modulation according to the present invention, respectively.

In the signal waveform of the sync bit of the fourth sync block (sync "3" bit), made up by 56 wobbles, the first to third wobbles of the bit block represent the bit synchronization mark BM, while the 23rd to 25th and 33rd to 35th wobbles represent MSK modulation marks MM, with the remaining wobbles being all monotone wobbles in signal waveform, as shown in FIG. 25A.

Similarly to the bit synchronization mark BM, the MSK synchronization mark is a signal waveform generated on MSK modulating the data for modulation of a preset code pattern. That is, the MSK synchronization mark is a signal waveform obtained on differentially encoding the data for modulation of a preset code pattern and allocating the frequency in dependence upon the sign of the differentially encoded data. Meanwhile, the minimum codelength L of the data for modulation corresponds to two wobble periods. In the present embodiment, a signal waveform obtained on MSK modulating the data for modulation having one bit (two wobble periods) set to "1" is recorded as the MSK synchronization mark. That is, the MSK synchronization mark is a continuous signal waveform "cos(1.5ωt), −cos(ωt), −cos(1.5ωt)" in terms of a wobble period as a unit.

Thus, the sync bit (sync "0" bit) of the first sync block may be generated by generating a data stream, having the codelength of two wobble periods, as shown in FIG. 22B, and by MSK modulating the so generated bitstream. In similar manner, the sync bit (sync "1" bit) of the second sync block, the sync bit (sync "2" bit) of the third sync block and the sync bit (sync "3" bit) of the fourth sync block may be generated by generating datastreams shown in FIGS. 23B, 24B and 25B and on MSK modulating the generated datastreams, respectively.

Meanwhile, a given sync bit has an insertion pattern to a bit block of two MSK modulation marks MM which is unique with respect to other insertion patterns of the MSK modulation marks MM to the bit block. Thus, by MSK demodulating the wobble signal, verifying the insertion pattern of the MSK modulation marks MM into the bit block and by discriminating at least one of the four sync blocks, during recording and/or reproduction, the address unit can be synchronized to demodulate and decode a data part, which will now be explained in detail.

2-3-3 Data Part

Figure 26:
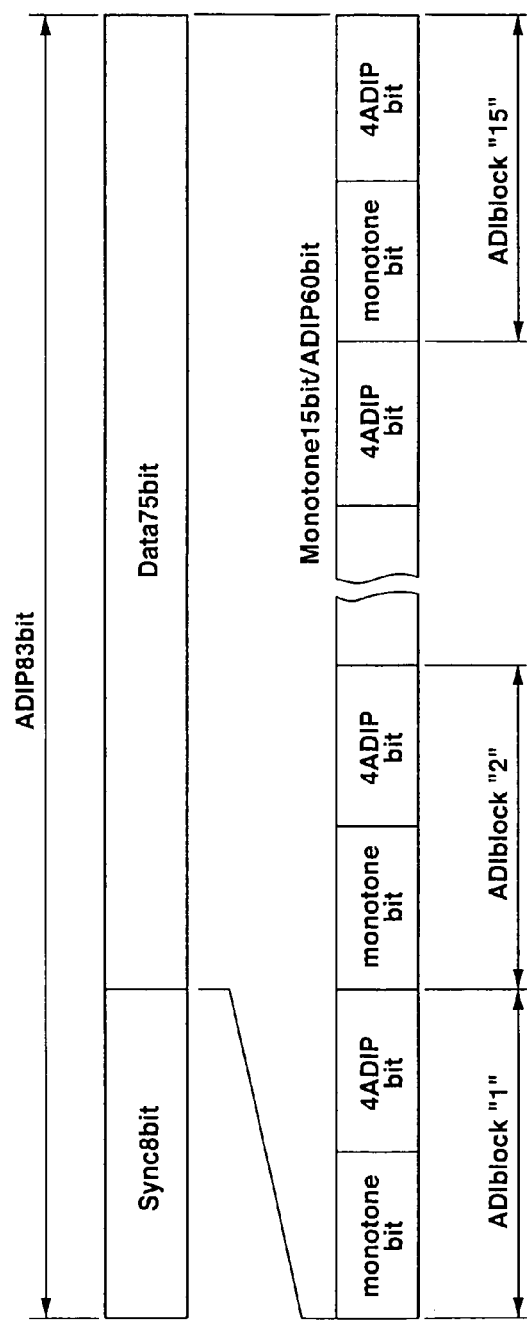
FIG. 26 illustrates a bit structure of a data part in an address unit according to the present invention.

FIG. 26 shows the structure of a data part in an address unit. The data part is a portion of the address unit where real data of the address information is stored. The data part is made up by 15, namely the first to 15th ADIP blocks (ADIP block "1" to ADIP block "15"). Each ADIP block is made up by one monotone bit and four ADIP bits.

The signal waveform of the monotone bit is similar to that shown in FIG. 21.

The ADIP bit represents one bit of real data, with the signal waveform being changed with the code content.

Figure 27:
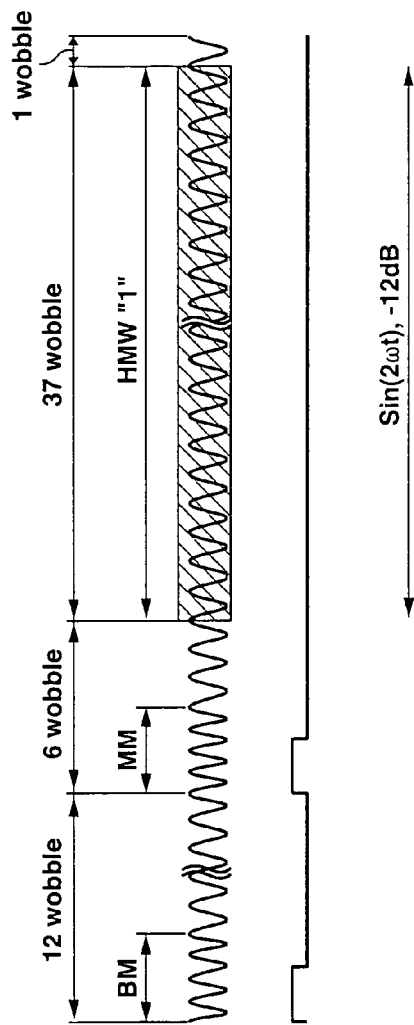
FIGS. 27A, 27B and 27C illustrate the signal waveform of the ADIP bit representing a bit "1" of the data part, data for MSK modulation, and the HMW signal to be summed according to the present invention, respectively.

If the code content represented by the ADIP bit is "1", the first to third wobbles, the 13rd to 15th wobbles and the 19th to 55th wobbles of the bit block, composed of 56 wobbles, become the bit synchronization mark BM, MSK modulation mark MM and a modulating part of the HMW "1" corresponding to sin(2ωt) summed to the reference carrier signal (cos(ωt)), with the waveform of the remaining wobbles being all monotone wobbles, as shown in FIG. 27A. That is, the ADIP bit, representing the code content "1", may be produced on generating data for modulation "100000100 . . . 00", with the codelength corresponding to two wobble periods, as shown in FIG. 27B, MSK modulating the data for modulation, and on summing sin(2ωt) with an amplitude of −12 dB to the 19th to 55th wobbles of the MSK modulated signal waveform, as shown in FIG. 27C.

Figure 28:
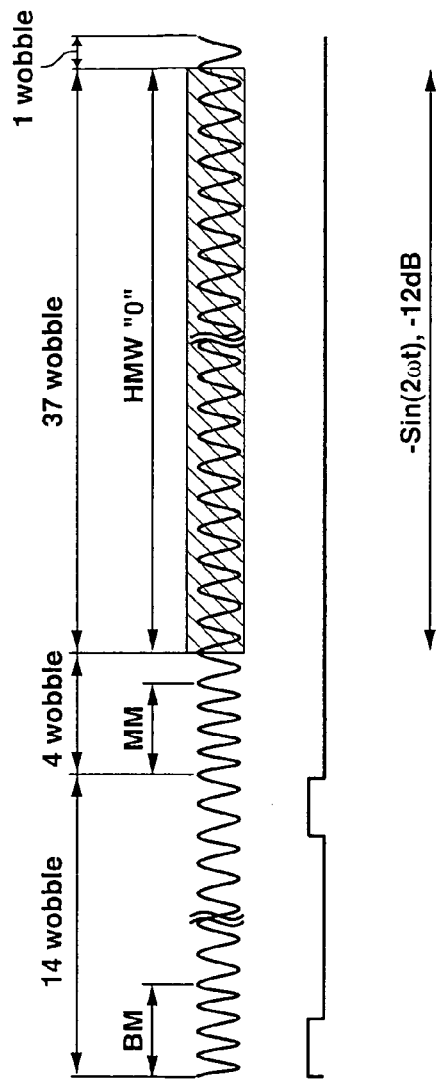
FIGS. 28A, 28B and 28C illustrate the signal waveform of the ADIP bit representing a bit "0" of the data part, data for MSK modulation, and the HMW signal to be summed according to the present invention, respectively.

If the code content represented by the ADIP bit is "0", the first to third wobbles, the 15th to 17th wobbles and the 19th to 55th wobbles of the bit block, composed of 56 wobbles, become the bit synchronization mark BM, MSK modulation mark MM and a modulating part of the HMW "0" corresponding to −sin(2ωt) summed to the reference carrier signal (cos(ωt)), with the waveform of the remaining wobbles being all monotone wobbles, as shown in FIG. 28A. That is, the ADIP bit, representing the code content "0", may be produced on generating data for modulation "1000000100 . . . 00", with the codelength corresponding to two wobble periods, as shown in FIG. 28B, MSK modulating the data for modulation, and on summing −sin(2ωt) with an amplitude of −12 dB to the 19th to 55th wobbles of the MSK modulated signal waveform, as shown in FIG. 28C.

The ADIP bit has its bit content differentiated in dependence upon the position of insertion of the MSK modulation mark MM, as described above. That is, the ADIP bit denotes a bit "1" or a bit "0", in dependence upon whether the MSK modulation mark MM is inserted in the 13th to 15th wobbles or in the 15th to 17th wobbles, respectively. Moreover, with the ADIP bit, the same bit content as that denoted by the position of insertion of the MSK modulation mark MM is expressed by HMW modulation. Consequently, with the ADIP bit, the same bit content is denoted by the two different modulation systems, and hence the data can be decoded reliably.

Figure 29:
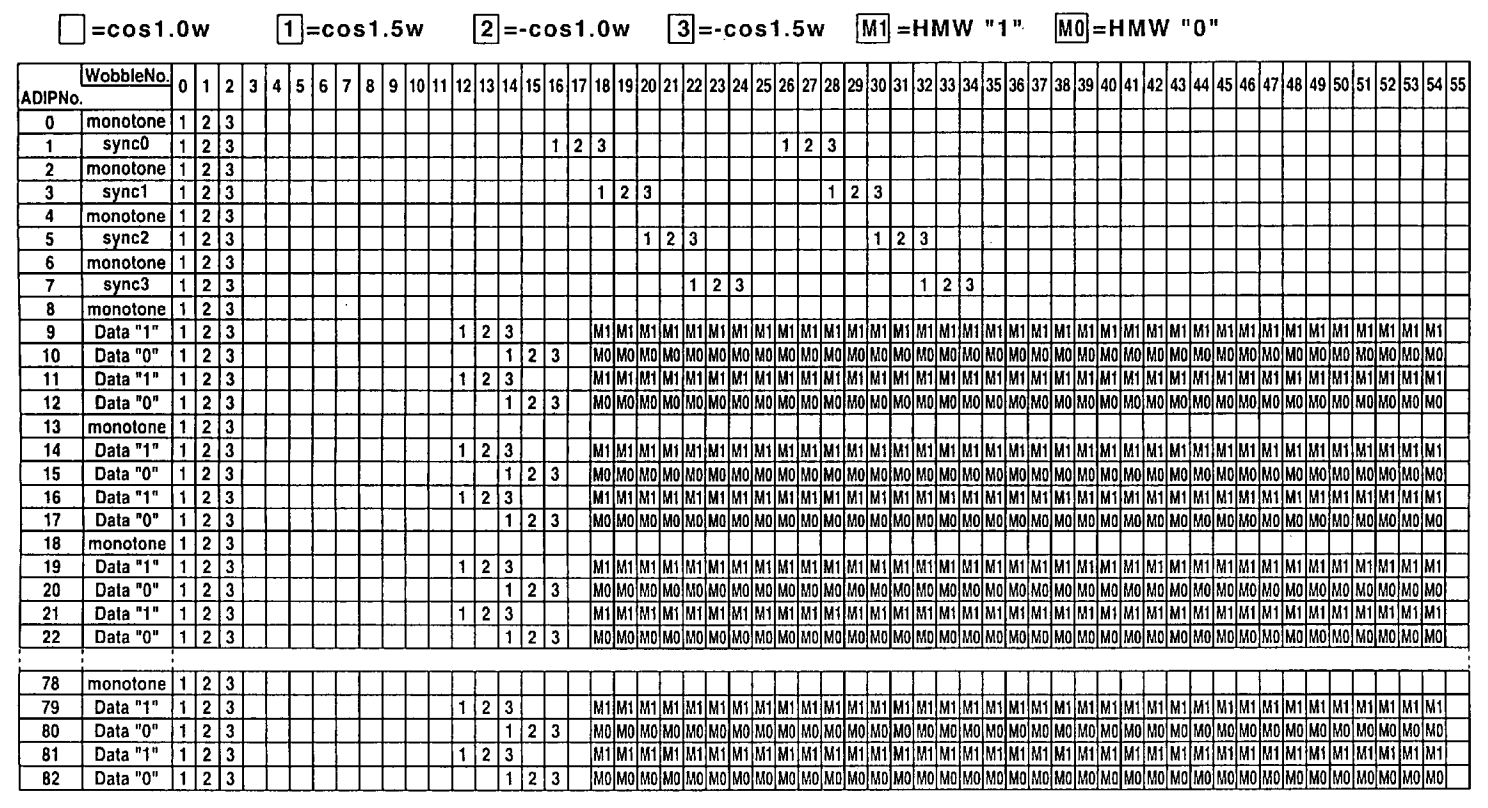

FIG. 29 shows the format of the address unit, represented by combining the sync part and the data part, as described above.

In the address format of the present embodiment of the optical disc 1, the bit synchronization mark BM, MSK modulation mark MM and the HMW modulation part are arranged discretely in one address unit, as shown in FIG. 29. Between respective modulated signal portions, there are inserted at least one wobble period of the monotone wobbles. The result is that there is no interference between the respective modulated signals, thus achieving reliable demodulation of respective signals.

2-3-4 Content of Address Data

Figure 30:
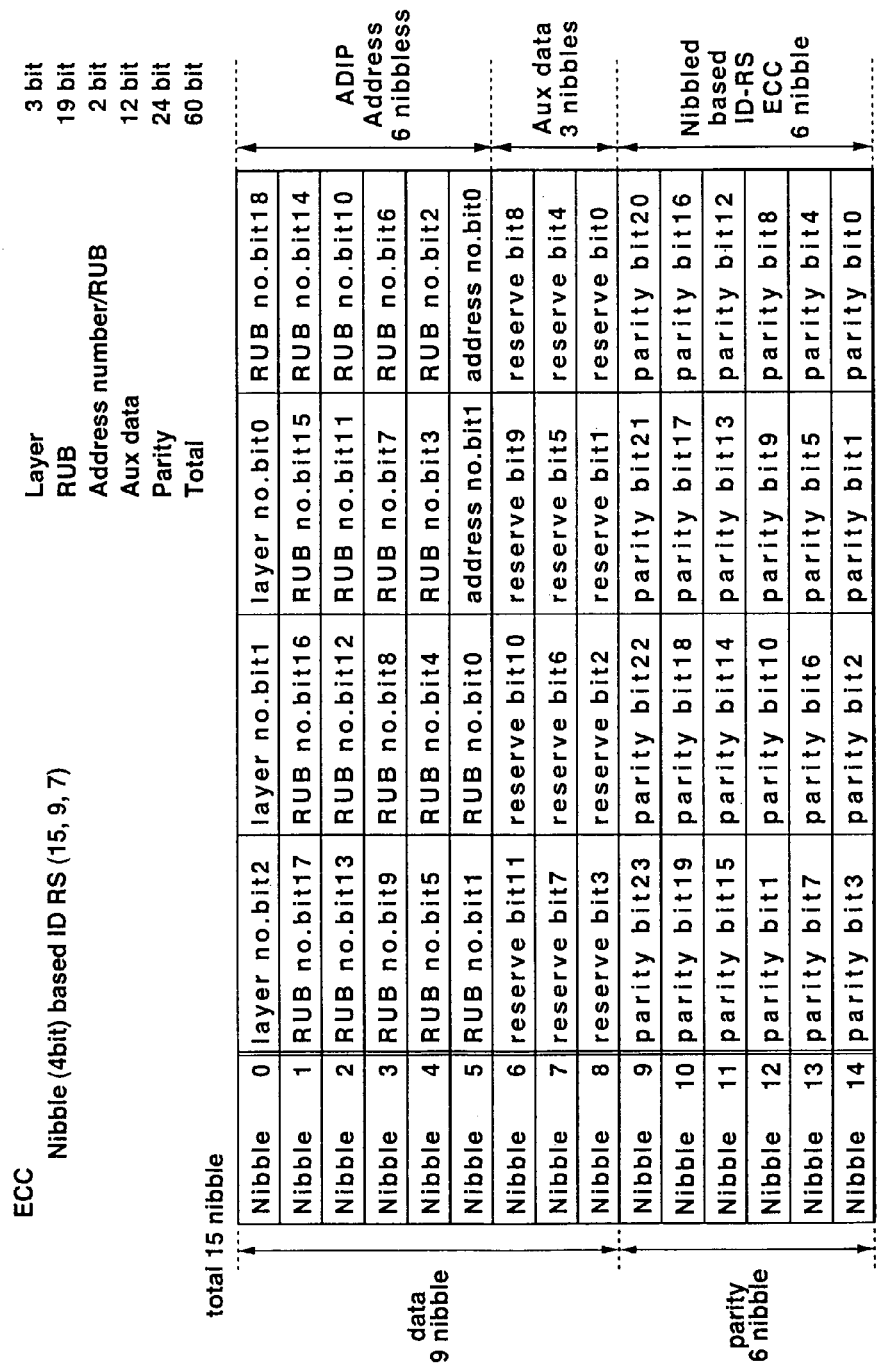
FIG. 30 illustrates the content of the address information by the ADIP bit according to the present invention.

FIG. 30 shows an address format as the ADIP information recorded as described above.

The ADIP address information has 36 bits, to which are appended 24 parity bits.

The 36-bit ADIP address information is made up by 3 bits for multi-layer recording (layer no. bit 0 to layer no. bit 2), 19 bits for RUB (Recording Unit Block) (RUB no. bit 0 to RUB no. bit 18) and 2 bits for three address blocks for one RUB (address no. bit 0 and address no. bit 1).

Additionally, 12 bits are provided as AUX data such as disc ID, recording the recording conditions, such as laser power for recording and/or reproduction.

The ECC unit, as address data, is made up by a sum total of 60 bits and is formed by 15 nibbles, namely Nibble 0 to Nibble 14, where one nibble is made up by four bits.

The error correction system is a nibble-based Reed-Solomon code (15, 9, 7), with the four bits as one symbol. That is, the codelength is 15 nibbles, the data is 9 nibbles and parity of 6 nibbles.

2-4 Address Demodulation Circuit

The address demodulating circuit for demodulating the address information from the DVR disc of the above address format is hereinafter explained.

Figure 31:
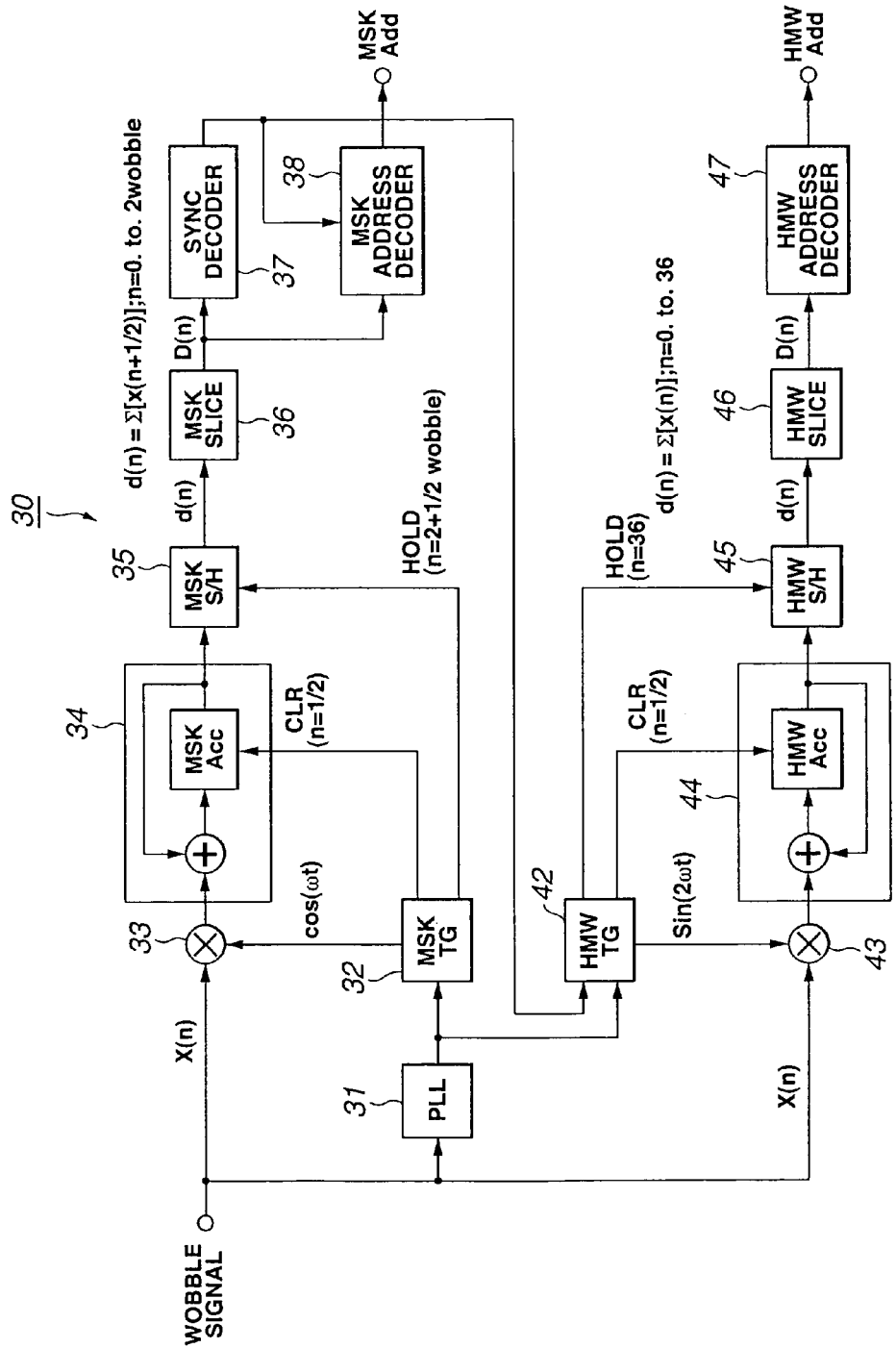
FIG. 31 is a block diagram showing an address demodulating circuit according to the present invention.

FIG. 31 shows a block diagram of an address demodulating circuit.

The address demodulating circuit includes a PLL circuit 31, a timing generator for MSK 32, a multiplier for MSK 33, an integrator for MSK 34, a sample/hold circuit for MSK 35, a slicing circuit for MSK 36, a sync decoder 37, an address decoder for MSK 38, a timing generator for HMW 42, a multiplier for HMW 43, an integrator for HMW 44, a sample/hold circuit for HMW 45, a slicing circuit for HMW 46, and an address decoder for HMW 47, as shown in FIG. 31.

The PLL circuit 31 is supplied with wobble signals reproduced from the DVR disc. The PLL circuit 31 detects an edge component from the input wobble signal to generate wobble clocks synchronized with the reference carrier signal (cos(ωt)). The generated wobble clocks are supplied to the timing generator for MSK 32 and to the timing generator for HMW 42.

The timing generator for MSK 32 generates the reference carrier signal (cos(ωt)) synchronized with the input wobble signal. The timing generator for MSK 32 also generates the clear signal (CLR) and the hold signal (HOLD) from the wobble clocks. The clear signal (CLR) is generated at a timing delayed by one half wobble period from the lead-in edge of the data clock of the data for modulation having two wobble periods as the minimum codelength. The hold signal (HOLD) is generated at a timing delayed by one half wobble period from the trailing edge of the data clock of the data for modulation. The reference carrier signal (cos(ωt)), generated by the timing generator for MSK 32, is supplied to the multiplier for MSK 33. The generated clear signal (CLR) is supplied to the integrator for MSK 34. The generated hold signal (HOLD) is supplied to the sample/hold circuit for MSK 35.

The multiplier for MSK 33 multiplies the input wobble signal with the reference carrier signal (cos(ωt)) to perform synchronous detection processing. The synchronous detected output signal is sent to the integrator for MSK 34.

The integrator for MSK 34 integrates the signal synchronous-detected by the multiplier for MSK 33. This integrator for MSK 34 clears the integrated value to zero at the timing of generation of the clear signal (CLR) by the timing generator for MSK 32.

The sample/hold circuit for MSK 35 samples the integrated output value of the integrator for MSK 34, at the timing of generation of the hold signal (HOLD) by the timing generator for MSK 32, and holds the sampled value until the next hold signal (HOLD) is produced.

The slicing circuit for MSK 36 binary-encodes the value held by the sample/hold circuit for MSK 35, with the point of origin (0) as a threshold value, and inverts the sign of the binary signal to output the resulting signal.

The output signal from this slicing circuit for MSK 36 becomes the MSK demodulated datastream.

The sync decoder 37 detects the sync bit in the sync part from the bit pattern of the demodulated data output from the slicing circuit for MSK 36. The sync decoder 37 synchronizes the address unit from the detected bit. Based on the synchronization timing of the address unit, the sync decoder 37 generates an MSK detection window, indicating the wobble position of MSK modulated data in the ADIP bit of the data part, and an HMW detection window, indicating the wobble position of HMW modulated data in the ADIP bit of the data part. FIGS. 32A, 32B and 32C show the synchronization position timing of the address unit detected from the sync bit, the timing of the MSK detection window and the timing of the HMW detection window, respectively.

The sync decoder 37 supplies the MSK detection window and the HMW detection window to the address decoder for MSK 38 and to the timing generator for HMW 42, respectively.

The address decoder for MSK 38 is supplied with a demodulated stream, output from the slicing circuit for MSK 36, and detects the position of insertion of the MSK modulation mark MM in the ADIP bit of the demodulated datastream, based on the MSK detection window, to verify the content of the code represented by the ADIP bit. If the insertion pattern of the MSK modulation mark MM in the ADIP bit is of a pattern shown in FIG. 27, the address decoder for MSK 38 verifies the code content to be "1", whereas, if the insertion pattern of the MSK modulation mark MM in the ADIP bit is of a pattern shown in FIG. 28, the address decoder for MSK 38 verifies the code content to be "0". The the address decoder for MSK outputs a bit sequence obtained from the verified result as the MSK address information.

From the wobble clocks, the timing generator for HMW 42 generates second harmonics signal ($\sin(2\omega t)$) synchronized with the input wobble signal. From the HMW detection window, the timing generator for HMW 42 generates the clear signal (CLR) and the hold signal (HOLD). The clear signal (CLR) is generated at the timing of the lead-in edge of the HMW detection window. The hold signal (HOLD) is generated at the timing of the trailing edge of the HMW detection window. The second harmonics signal ($\sin(2\omega t)$), generated by the timing generator for HMW 42, is supplied to the multiplier for HMW 43. The generated clear signal (CLR) is supplied to the multiplier for HMW 43, while the generated hold signal (HOLD) is supplied to the sample/hold circuit for HMW 45.

The multiplier for HMW 43 multiplies the input wobble signal with the second harmonics signal ($\sin(2\omega t)$) for executing synchronous detection processing. The synchronous detected output signal is supplied to the integrator for HMW 44.

The integrator for HMW 44 integrates the signal synchronous detected by the multiplier for HMW 43. Meanwhile, this integrator for HMW 44 clears the integrated value to zero at the timing of generation of the clear signal (CLR) by the timing generator for HMW 42.

The sample/hold circuit for HMW 45 samples the integrated output value of the integrator for HMW 44, at the timing of generation of the hold signal (HOLD) by the timing generator for HMW 42, and holds the sampled value until generation of the next hold signal (HOLD). That is, there are 37 wobbles of the HMW modulated data in one bit block, so that, if the clear signal (HOLD) is generated at n=0, where n denotes the number of wobbles, as shown in FIG. 32D, the sample/hold circuit for HMW 45 samples the integrated value at n=36, as shown in FIG. 32E.

The slicing circuit for HMW 46 binary-encodes the value held by the sample/hold circuit for HMW 45, with the point of origin (0) as a threshold, and outputs the code for the value.

The output signal from this slicing circuit for HMW 46 becomes a demodulated datastream.

From the demodulated datastream, the address decoder for HMW 47 verifies the content of the code, represented by the respective ADIP bits, and outputs the bit sequence, obtained from the verified result, as the HMW address information.

Figure 33A:
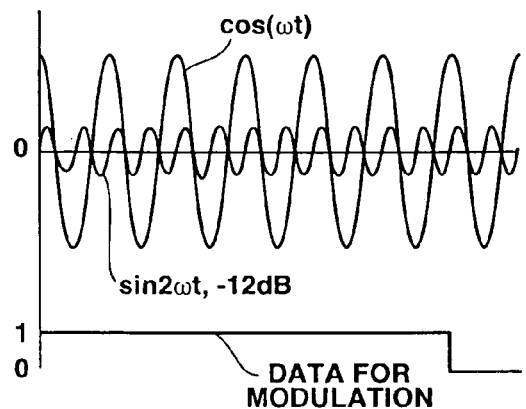
FIGS. 33A to 33C are wavelength diagrams showing the signal wavelength obtained on HMW demodulation by the address demodulating circuit according to the present invention.
Figure 33B:
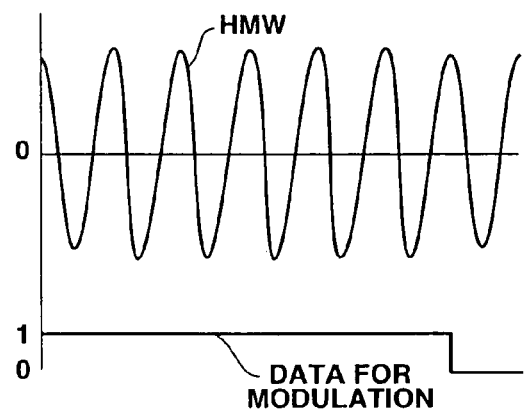
Figure 33C:
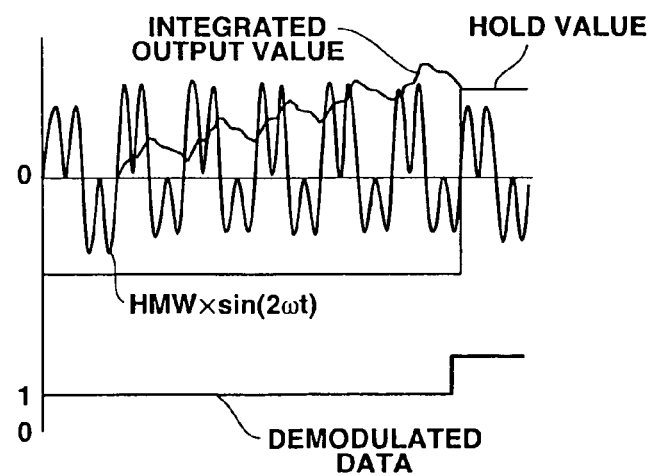

FIG. 33 denotes each signal waveform when the ADIP bit with the code content "1" is HMW modulated by the address demodulating circuit 30. In FIG. 33, the abscissa (n) denotes the period numbers of the wobbling period. FIG. 33A shows the reference carrier signal ($\cos(\omega t)$), data for modulation with the code content of "1" and the second harmonics signal waveform ($\sin(2\omega t)$, $-12$ dB) generated responsive to the data for modulation. FIG. 33B shows the generated wobble signal. FIG. 33C shows the synchronous detected output signal for this wobble signal (HMW$\times\sin(2\omega t)$), an integrated output value of the synchronous detection output signal, a held value of the integrated output and the data for modulation output demodulated from the slicing circuit 46.

Figure 34A:
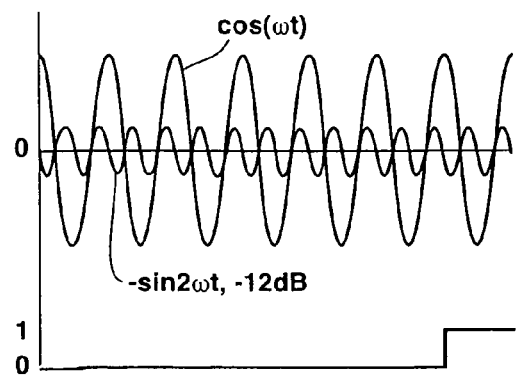
FIGS. 34A to 34C are wavelength diagrams showing the signal wavelength obtained on HMW demodulation by the address demodulating circuit according to the present invention.
Figure 34B:
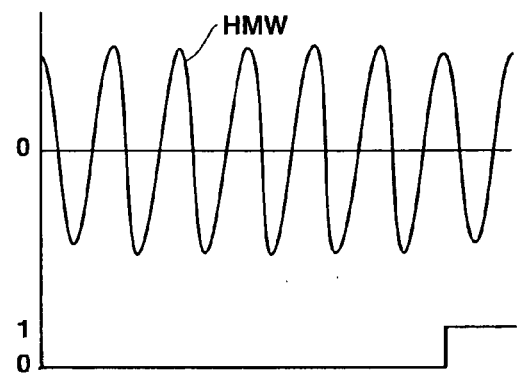
Figure 34C:
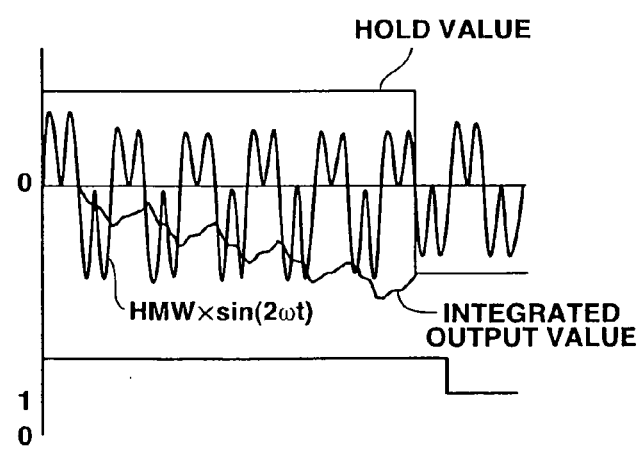

FIG. 34 shows each signal waveform on HMW demodulation by the address demodulating circuit 30 of the ADIP bit with the code content of "0". In FIG. 34, the abscissa (n) denotes the period numbers of the wobbling period. FIG. 34A shows the reference carrier signal ($\cos(\omega t)$), data for modulation with the code content of "1" and the second harmonics signal waveform ($-\sin(2\omega t)$, $-12$ dB) generated responsive to the data for modulation. FIG. 34B shows the generated wobble signal. FIG. 34C shows a synchronous detection output signal (HMW$\times\sin(2\omega t)$) of this wobble signal, an integrated output value of the synchronous detection output signal, a held value of this integrated output and the data for modulation output demodulated from the slicing circuit 46.

In this manner, the address demodulating circuit 30 is able to detect the synchronous information of the address unit, recorded with MSK modulation, and to execute MSK demodulation and HMW demodulation, based on the detection timing.

3. Single Layer/Double Layer/n-Layer Disc 3-1 Layer Structure

The DVR optical disc 1 of the above-described embodiment may be classified into a single-layer disc, with a single recording layer, and double- or three-layer discs, these being collectively termed a multi-layer disc or an n-layer disc, where n denotes the number of layers.

Of course, the recording capacity can be drastically increased by providing a large number of recording layers. In the present embodiment, such a multi-layer disc which, as a preferred structure of such multi-layer disc, may assure compatibility, accessibility and reliability of the respective disc sorts associated with the respective numbers of the layers, is to be achieved.

FIGS. 35A to 35C schematically show the layered structure of the single-layer, double-layer and n-layer discs. FIG. 35D shows layer addresses accorded to the respective recording layers of the respective discs.

The disc thickness is 1.2 mm, with the thickness of the substrate RL of polycarbonate being approximately 1.1 mm.

A light beam from a disc driving apparatus for recording and/or reproducing data on the optical disc 1 is shown with a chain-dotted line. The light beam is the blue laser light with the waveform of 405 nm, and is collected from a CVL side of the cover layer (substrate), as shown, by an objective lens with a NA of 0.85.

In the case of the single layer disc of FIG. 35A, a recording layer L0 of the phase change recording layer is formed on a substrate RL with a thickness of for example 1.1 mm, and the cover CVL 100 μm in thickness is formed thereon.

During recording and/or reproduction, the light beam is condensed on a recording layer L0 from the side of the cover layer CVL.

The layer address of the recording layer L0 is [0].

In the case of the double-layer disc of FIG. 35B, the recording layer L0 as a phase change recording layer is formed on a substrate RL 1.1 mm thick and a recording layer L1 as a second phase change recording layer is formed thereon, with an intermediate layer ML of 25 μm in-between. The cover layer CVL 75 μm in thickness is formed thereon.

During recording and/or reproduction, the light beam is condensed from the side of the cover layer CVL to the recording layers L0 ad L1.

The layer address of the first recording layer L0 is [0], while the layer address of the second recording layer L1 is [1]. Recording and/or reproduction is carried out in the order of the layer address [0] and the layer address [1].

As in the case of the single-layer disc, the first recording layer L0 is formed at a position of 100 μm from the surface CVLs of the cover layer CVL.

In the case of the n-layer disc of FIG. 35C, the recording layer L0 of the phase change recording film is formed on the substrate RL 1.1 mm in thickness, and the recording layer L1 of the second phase change recording film is formed thereon, with interposition of an intermediate layer ML 25 μm in thickness. The third recording layer ff., are also formed as recording layers of the phase change recording film, with interposition of respective intermediate layers ML. That is, the n-th layer is formed as a recording layer of the phase change recording film, with interposition of the intermediate layer ML.

The thickness of the cover layer CVL is 100−(n−1)×25 μm.

During recording and/or reproduction, the light beam is condensed on the recording layers L0, L1, . . . , Ln from the side of the cover layer CVL.

The layer address of the first recording layer is [0], that of the second recording layer L1 is [1] and so forth, with the layer address of the n-th recording layer being [n−1]. Recording and/or reproduction for the respective recording layers is in the sequence of the layer addresses [0], [1], . . . [n−1].

As in the case of the single layer and double layer discs, the first recording layer L0 is formed at a position of 100 μm from the surface CVLs of the cover layer CVL.

Thus, in the single-layer, double-layer and in the n-layer disc, the recording layer L0 of the first phase change recording film is formed at a distance of 100 μm from the surface CVLs of the cover layer CVL. In the multi-layer disc, the recording layers L1, L2, . . . , L(n−1) of the second to n-th phase change recording films are arranged closer towards the cover layer surface CVLs than the first recording layer L0.

Consequently, in the single-layer, double-layer and in the n-layer disc, the first recording layer L0 may be formed in similar fashion on a polycarbonate substrate RL so that the manufacturing process for the single-layer may partly be used in common with that for the double-layer and the n-layer disc, while the first recording layers L0 of the single-layer, double-layer and in the n-layer disc may be of similar recording and/or reproducing characteristics.

Moreover, in the multi-layered disc, the second recording layers ff., that is the recording layers (L1, . . . L(n−1)) may be arranged closer towards the cover layer surface CVLs, so that the distance from the second to n-th recording layers to the cover layer surface becomes progressively shorter, that is the cover layer thickness becomes progressively thinner in this sequence. This increases the tilt angle allowance between the disc and the light beam.

Consequently, the recording and/or reproducing characteristics of the second to n-th recording layers can be relaxed as compared to those of the first recording layer L0, thus improving the productivity and reducing the cost of the disc 1 as the multi-layered disc.

In recording and/or reproducing the first to the n-th recording layers of the multi-layered disc, a light beam is condensed on the respective recording layers and, because of the different distances from the cover layer surface CVLs to the respective recording layers, the spherical aberration is corrected from one recording layer to the next.

In the single-layer, double-layer and in the n-layer disc, the first recording layer L0 is unexceptionally formed at a distance of 100 μm from the cover layer surface CVLs. Thus, by correcting the spherical aberration to the first recording layer L0 in the optical head, before or during loading the disc on the disc driving apparatus, the light beam may be optimally converged on the first recording layer L0 having the layer address [0], without dependency on which of the single-layer disc, double-layer disc and the n-layer disc has been loaded, so that the recording and/or reproduction may be commenced at the layer address [0].

These operations will be explained subsequently in detail in connection with the processing by the disc driving apparatus.

Although the recording films of the respective recording layers, described above, are phase change films, the above-described layer structure and the meritorious effect derived therefrom may similarly be applied to other sorts of the recording and/or reproducing data on discs.

3-2 Disc Layout

The disc layout for the single-layer disc, double-layer disc and the n-layer disc is hereinafter explained.

Figure 36:
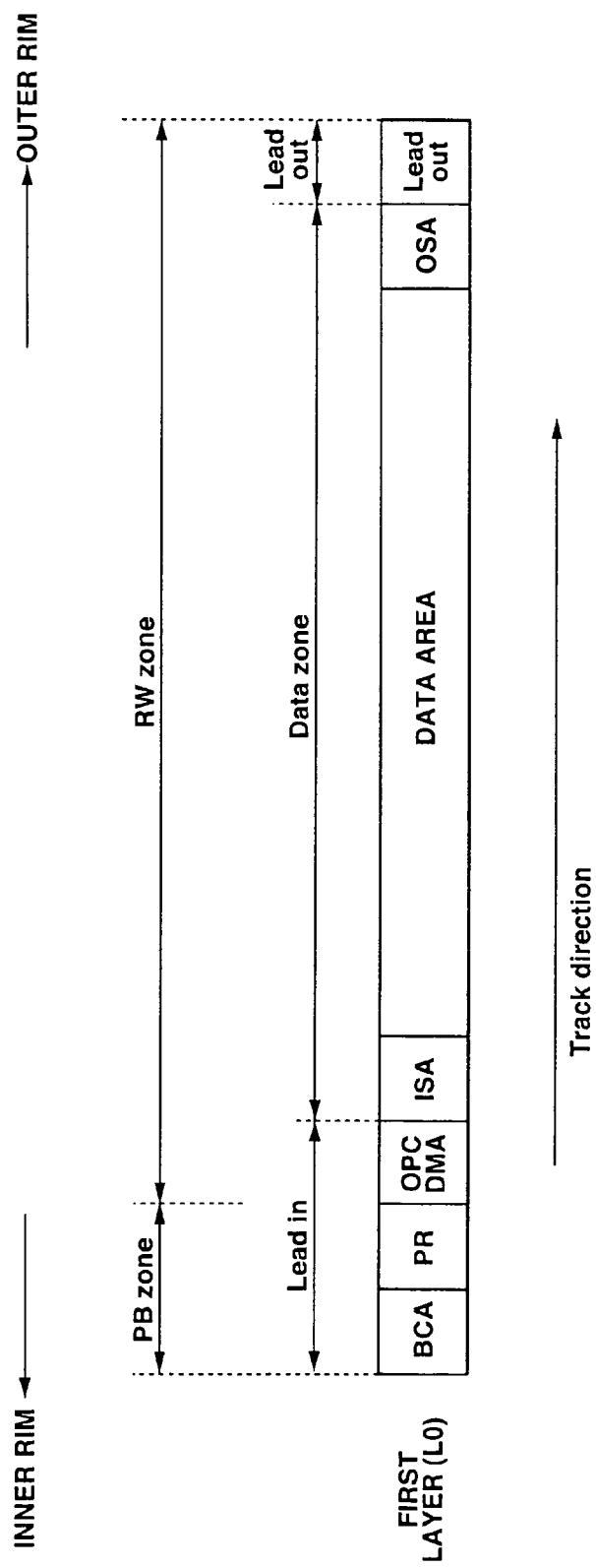
FIG. 36 illustrates an areal structure of a single-layer disc according to the present invention.

FIG. 36 shows an area structure, along the radial direction of the disc, in terms of the disc layout of the single-layer disc. Meanwhile, the arrangement (radial positions) of the lead-in zone, data zone and the lead-out zone and the arrangement (radial positions) of the PB zone and the RW zone are as explained with reference to FIG. 13 (see also FIGS. 37 and 38).

As also shown in FIG. 13, the lead-in zone is made up by a BCA, a pre-recorded zone PR and an OPC/DMA (a test write area and a defect management area), looking from the inner rim side.

In the BCA, signals on a bar code are recorded in the radial direction in accordance with a recording system by phase change marks or with a recording system of burning off a recording layer with a high output laser light. This records a unique ID on each disc. This unique disc ID allows for supervising content copying to the disc 1.

As also described above, the pre-recorded data zone PR has pre-recorded therein the disc information, such as recording and/or reproduction power conditions, or the information used for copying protection, by the wobbled groove.

The OPC of the OPC/DMA (test write area) is used for setting the conditions for recording and/or reproduction for phase change marks, such as the recording and/or reproduction power, or the information used for copying protection.

The DMA (Defect Management Area) records and/or reproduces the information which supervises the defect information.

The data zone is an area used for recording and/or reproducing user data.

In the data zone, an ISA (Inner Spare Area) and an OSA (Outer Spare Area) are set, ahead and in rear of a data area for recording and/or reproducing the user data, as a replacement area for replacing a non-recordable or a non-reproducible area (sectors or clusters), caused by e.g., defects, in case such non-recordable or non-reproducible area is met in e.g., use of a personal computer. It is noted that, in real-time recording at a high transfer rate, such replacement area may occasionally not be set.

Although not shown, there is the DMA for recording and/or reproducing the defect management information, in the lead-out zone, as in the lead-in zone.

The lead-out zone is also used during seek as a buffer area to allow for overrunning.

In such one-layer disc, the addresses are sequentially recorded from the inner rim towards the outer rim, such that recording and/or reproduction by the disc driving apparatus is performed in a direction from the inner rim towards the outer rim.

Figure 37:
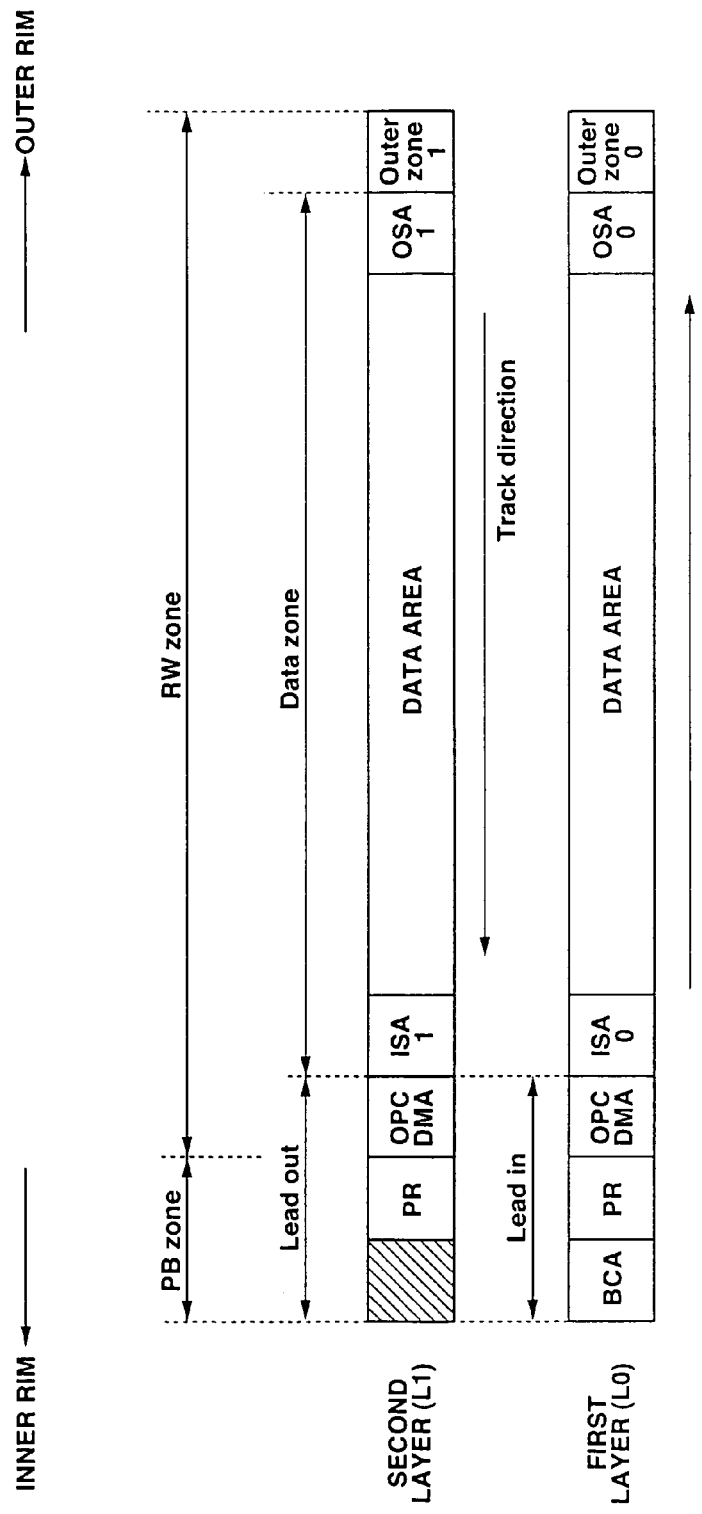
FIG. 37 illustrates an areal structure of a double-layer disc according to the present invention.

FIG. 37 shows an embodiment of the double-layer disc.

In the double-layer disc, the first recording layer L0 is of the disc layout similar to that of the single-layer disc shown in FIG. 36. Meanwhile, the disc portion corresponding to the lead-out does not prove the lead-out in the meaning of the terminal portion of the recording and/or reproduction and hence is an outer zone 0.

In the double-layer disc, the second layer L1 is sequentially formed by an outer zone 1, a data zone and a lead-out zone, looking from the outer rim towards the inner rim.

In this case, the lead-out is positioned inwardly of the position of the radius of 24 mm. In an area of the radius of 21 mm to 22.2 mm, 22.2 mm to 23.1 mm, an area of 23.1 to 24 mm, there are provided a BCA (shaded portion), a pre-recorded data zone and an OPC/DMA, respectively. In an area of the radius of 24 to 58 mm and in an area of 58 mm to 58.5 mm, there are provided a data zone and an outer zone 1, respectively.

In this case, there is provided an area corresponding to the BCA on the second layer L1, however, there is recorded no unique ID.

The reason is that, when a signal on a bar code is recorded on the first recording layer L0 in the radial direction in accordance with a recording system of burning off the recording layer with high output laser light, the BCA on the second layer L1 (shaded portion) lying in register with the BCA of the first recording layer L0 along the thickness is damaged, so that, if the BCA information, such as unique ID, is newly recorded in the second layer L1, reliably recording can possibly not be achieved. Stated conversely, the BCA of the first recording layer L0 can be improved in reliability by not performing BCA recording on the second layer L1.

On the other hand, the same information is recorded in both the first layer L0 and the second layer L1 for the pre-recorded data zone PR, in order to improve the reliability of the management information and accessibility from layer to layer.

In the data zone, ISA0 and ISA1 on the inner rim and OSA0, OSA1 on the outer rim are set in both the first layer L0 and the second layer L1 for the data zone, as in the case of the single-layer disc, as replacement areas (sectors or clusters) as substitution for areas (sectors or clusters) that cannot be recorded nor reproduced due to e.g., defects. In realtime recording at a high transfer rate, as in video recording and/or reproduction, such replacement areas may occasionally not be set.

In the outer zone 1, there is the defect management area for recording and/or reproducing the defect management information.

The defect management information, recorded in the DMA on the inner and outer rim sides, records the management information for the totality of layers.

The outer zone is also used during seek as a buffer area to allow for overrunning.

In a double-layer disc, the addresses of the first recording layer L0 are sequentially recorded from the inner rim towards the outer rim, such that the recording and/or reproduction is carried out in a direction from the inner rim towards the outer rim.

In the second recording layer L1, the addresses of the second recording layer L1 are sequentially recorded from the outer rim towards the inner rim, such that the recording and/or reproduction is carried out in a direction from the outer rim towards the inner rim.

In the first recording layer L0, recording and/or reproduction is carried out from the inner rim towards the outer rim, whereas, in the second recording layer L1, recording and/or reproduction is carried out from the outer rim towards the inner rim, such that, when the recording and/or reproduction comes to a close at the outer rim of the first recording layer L0, recording and/or reproduction is carried out in succession from the outer rim of the second recording layer L1.

That is, full seek from the outer rim towards the inner rim is not required, such that recording and/or reproduction can be carried out in succession from the recording layer L0 to the second recording layer L1 and hence the real-time recording at a high transfer rate, such as video recording and/or reproduction, can be performed for prolonged time.

Figure 38:
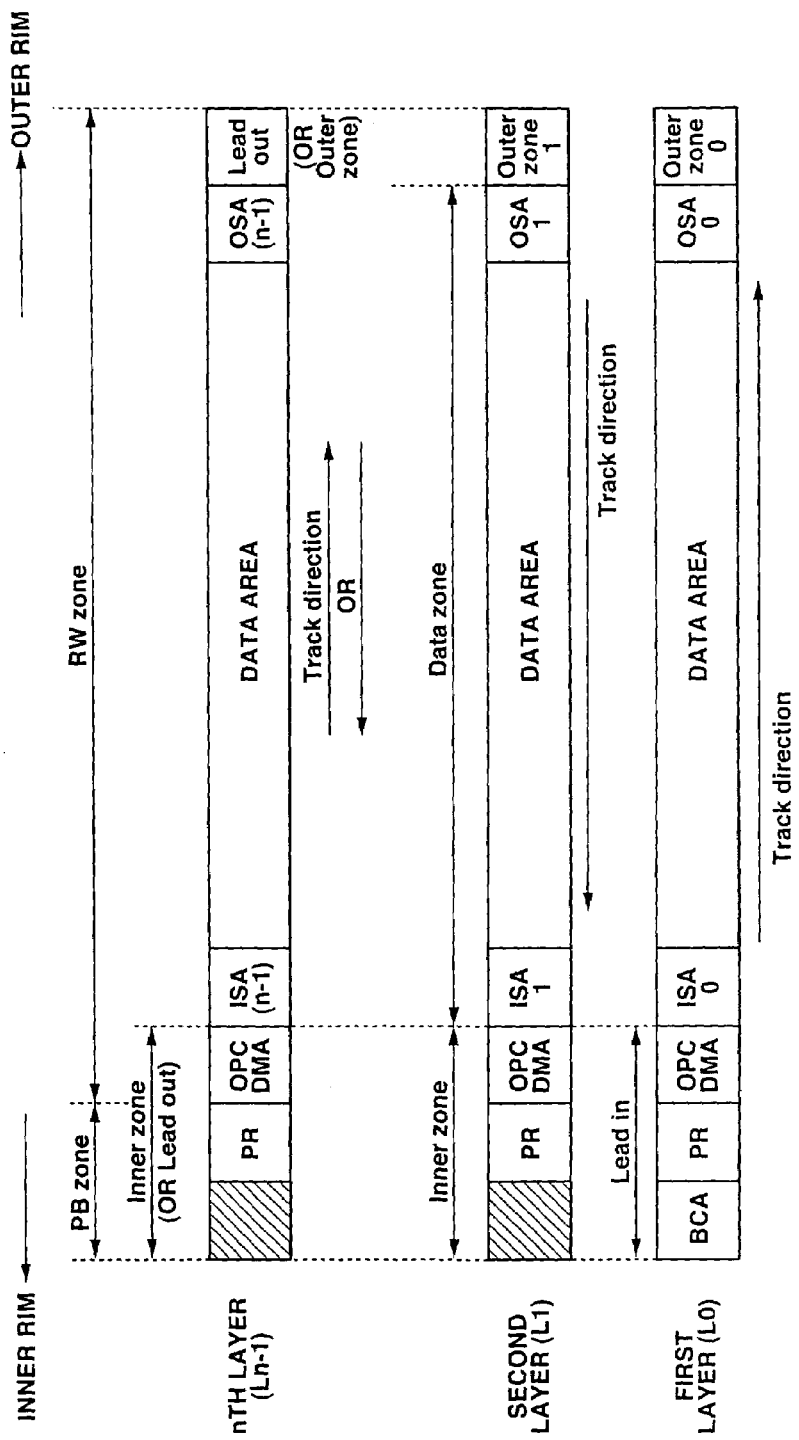
FIG. 38 illustrates an areal structure of an n-layer disc according to the present invention.

FIG. 38 shows an embodiment of the disc layout for an n-layer disc, herein a disc with three or more layers.

In the n-layer disc, the first recording layer L0 is of the same disc layout as that for the single-layer disc or the double-layer disc, provided that a zone corresponding to the lead-out zone for the single-layer disc is the outer zone 0.

The second recording layer L1 is of the disc layout similar to that of the second recording layer L1 of the double-layer disc. It is noted that the lead-out zone which is the inner rim side in the second recording layer L1 of the double-layer disc is not the terminal end of the recording and/or reproduction with the disc with three or more layers and hence is the inner zone 1.

The n-th recording layer Ln−1 is of the disc layout similar to that of the second recording layer L1. For the n-th recording layer Ln−1, no recording for the BCA is made for the same reason as set forth for the second recording layer L1.

As for the pre-recorded data zone PR, the same information is recorded for the first layer L0, second layer L1 . . . the n-th recording layer Ln−1, for improving the reliability of the management information and for raising the accessibility from layer to layer.

In the data zone, ISA0, ISA1 . . . ISA(n−1) on the inner rim and OSA0, OSA1 . . . OSA(n−1) on the outer rim are set in the first layer L0, second layer L1 . . . n-th layer Ln−1 for the data zone, as in the case of the single-layer disc, as replacement areas (sectors or clusters) as substitution for areas (sectors or clusters) that cannot be recorded nor reproduced due to e.g., defects. In real-time recording at a high transfer rate, as in video recording and/or reproduction, such replacement areas may occasionally not be set.

In the lead-out zone in the n-th layer, there is the DMA for recording and/or reproducing the defect management information.

The defect management information, recorded in the DMA on the inner and outer rim sides, the management information for the totality of layers are recorded.

By recording the defect management information of the first to the n-th recording layers in one of the DMAs of the first to the n-th recording layers, the defect management information of the totality of layers can be handled monistically.

Moreover, by performing defect management, with the aid of the DMAs on the inner and outer rims of e.g., the first recording layer, and by transferring to the defect management information of the second recording layer in case of failure in recording and/or reproduction by the first layer DMA, it is possible to achieve disc management with high reliability.

If the number [n] of the n-th layer is odd-numbered, the inner rim side of the n-th layer is an inner zone, with the outer rim side being a lead-out zone.

In this case, the addresses of the n-th layer Ln−1 are sequentially recorded from the inner rim towards the outer rim, such that recording proceeds from the inner rim towards the outer rim.

If the number [n] of the n-th layer is even-numbered, the inner rim side of the n-th layer is an lead-out zone, with the outer rim side being an outer zone.

In this case, the addresses of the n-th layer Ln−1 are sequentially recorded from the outer rim towards the inner rim, such that recording proceeds from the outer rim towards the inner rim.

With the recording and/or reproduction proceeding in this manner, full seek from the outer rim to the inner rim is not required, as in the case of the double layer disc, described above, such that recording and/or reproduction may be carried out sequentially from the inner rim of the first layer L0 to the outer rim thereof, outer rim of the second layer L1 to the inner rim thereof . . . the inner rim of the n-th layer Ln−1 (for n=odd number) or the outer rim of the n-th layer Ln−1 (for n=even number), up to the outer rim (for n=odd number) or the inner rim of the n-th layer Ln−1 (for n=even number), such that the real-time recording at a high transfer rate, such as video recording and/or reproduction, can be performed for prolonged time.

FIG. 39 shows the spiral direction of the groove track in each recording layer of the disc.

Figure 39B:
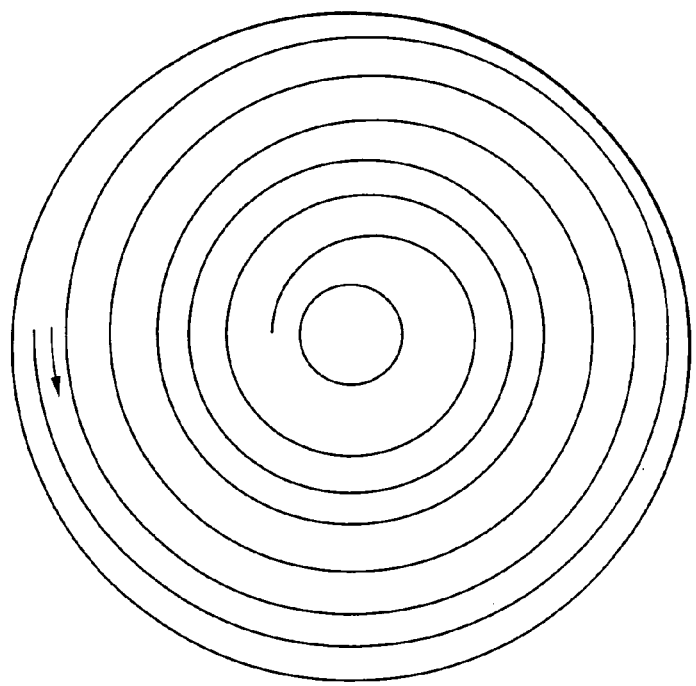
FIGS. 39A and 39B illustrate the spiral state of a disc according to the present invention.
Figure 39A:
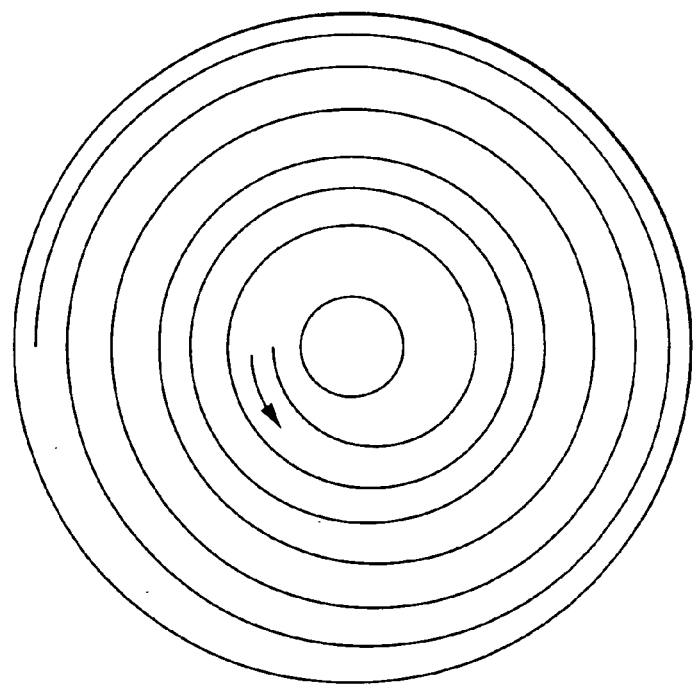

In the case of a single-layer disc, the groove track is formed spirally from the inner rim towards the outer rim, in a counterclockwise direction, as shown in FIG. 39A, looking from the light beam incident side (the side of the cover layer CVL).

In the case of a double-layer disc, the groove track is formed spirally from the inner rim towards the outer rim, in a counterclockwise direction, as shown in FIG. 39A, as in the case of the single-layer disc.

For the second recording layer L1, the groove track is formed spirally from the outer rim towards the inner rim, in a counterclockwise direction, as shown in FIG. 39B, looking from the light beam incident side (the side of the cover layer CVL).

In the case of an n-layer disc, in an odd-numbered recording layer (first layer L0, third layer L2, . . . ), the groove track is formed spirally from the inner rim towards the outer rim, in a counterclockwise direction, as shown in FIG. 39A, looking from the light beam incident side, as in the case of the single-layer disc.

In an even-numbered recording layer (second layer L1, fourth layer L3, . . . ), the groove track is formed spirally from the outer rim towards the inner rim, in a counterclockwise direction, as shown in FIG. 39B, looking from the light beam incident side.

By the above-described groove track structure, the recording layers of the totality of the phase change recording layers of the single-layer disc, double-layer disc and the n-layer disc are recorded spirally in the counterclockwise direction, and are recorded and/or reproduced with the same disc rotating direction.

In the double-layer disc and in the n-layer disc, recording and/or reproduction may be achieved from the inner rim of the first layer L0 to the outer rim thereof, outer rim of the second layer L1 to the inner rim thereof . . . the inner rim of the n-th layer Ln−1 (for n=odd number) or the outer rim of the n-th layer Ln−1 (for n=even number), up to the outer rim (for n=odd number) or the inner rim of the n-th layer Ln−1 (for n=even number), such that the real-time recording at a high transfer rate, such as video recording and/or reproduction, can be performed for prolonged time.

If a sole recording layer is considered, the capacity of the order of 23.3 GB can be recorded and/or reproduced on or from a disc with a diameter of 12 cm, with a track pitch of 0.32 µm, a line density of 0.12 µm/bit, with a data block of 64 kB as a recording and/or reproducing unit, with the formatting efficiency of approximately 82%, as discussed above.

In this case, the data zone has 355603 clusters.

As shown in FIG. 30, the addresses are indicated by three-bit layer addresses and 19-bit in-layer addresses (RUB addresses).

If a two-bit address is placed in one cluster, a 19-bit in-layer address of a number odd-numbered recording layer in a data zone is 020000h and 17b44ch, h denoting the hexadecimal notation, at a radial position of 24 mm and a radial position of 58 mm, respectively.

The 19 bit in-layer address in a number even-numbered recording layer is a complement of the address of the number odd-numbered recording layer.

The 19 bit in-layer address in the data zone is 084bb3h and 1dfffh at a radial position of 58 mm and a radial position of 24 mm, respectively.

That is, the address is counted up from the inner rim towards the outer rim, for an odd-numbered recording layer, while being counted up from the outer rim towards the inner rim, for an even-numbered recording layer. By taking a complement of an address of the odd-numbered recording layer for use as an address of the even-numbered recording layer, the in-layer address can be expressed by the number of bits of the in-layer addresses of one layer. On the other hand, the radial position relationship between the odd-numbered recording layer and the even-numbered recording layer with respect to the address can also be known.

4. Disc Driving Apparatus 4-1 Structure

A disc driving apparatus, capable of recording and/or reproducing a disc 1 as the single-layer disc and the multi-layer disc as described above is hereinafter explained.

Figure 40:
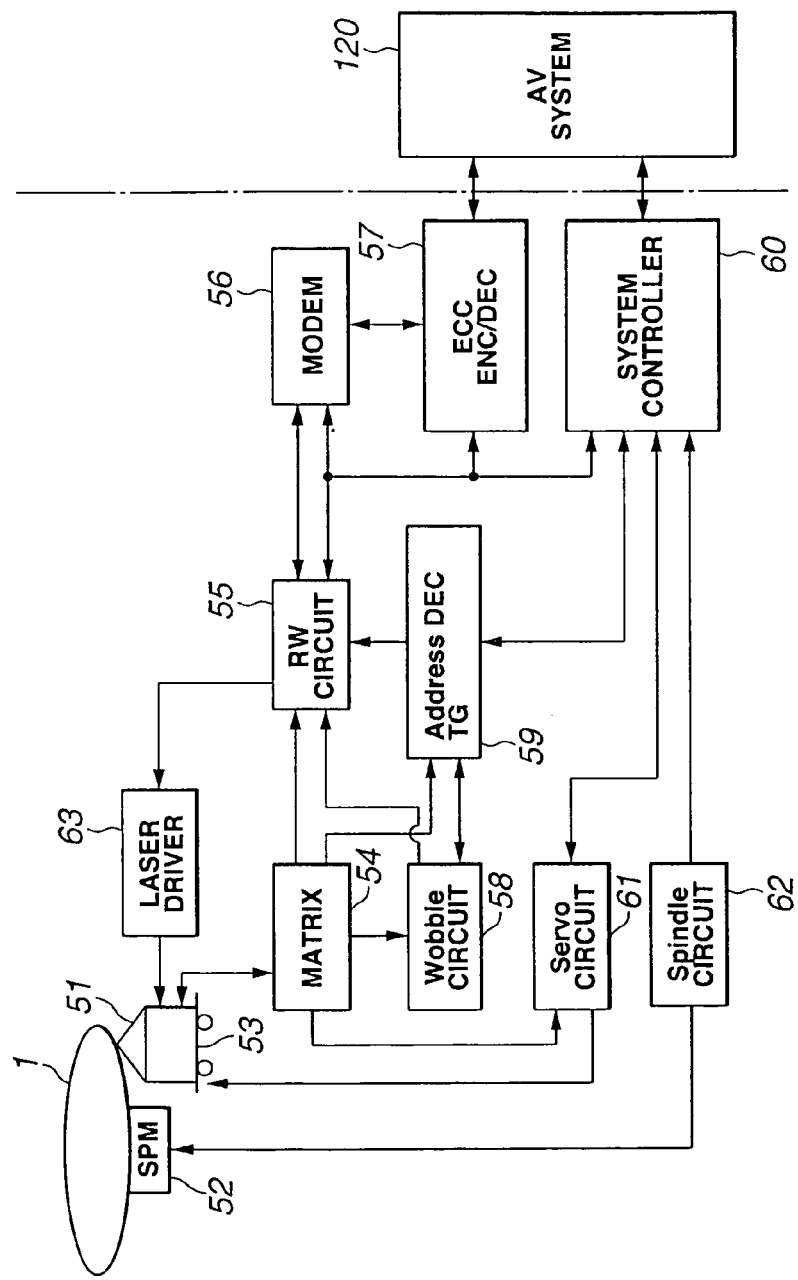
FIG. 40 is a block diagram of a disc driving apparatus according to the present invention.

FIG. 40 shows the structure of disc driving apparatus.

The disc 1 is loaded on a turntable, not shown, and is run in rotation at a constant linear velocity (CLV) by a spindle motor 52 during recording and/or reproduction.

The ADIP information, buried as wobbling of the groove track in a RW zone on the disc 1, is read out by an optical pickup (optical head) 51. The pre-recorded information, buried as wobbling of the groove track in the PB zone, is also read out in similar manner.

In recording, user data is recorded as phase change marks in a track of the RW zone by the optical pickup 51. In replay, the phase change marks recorded by the optical pickup 51 are read out.

In the optical pickup 51, there are formed a laser diode, as a laser light source, a photodetector for detecting the reflected light, an objective lens, as an output end of the laser light, and an optical system, not shown, for illuminating the laser light through the objective lens to a disc recording surface and routing the reflected light to the photodetector.

The laser diode outputs the so-called blue laser light with a wavelength of 405 nm. The NA of the optical system is 0.85.

In the optical pickup 51, the objective lens is held by a biaxial unit for movement in the tracking direction and in the focusing directions.

The entire optical pickup 51 is movable by a sled mechanism 53 along the disc radius direction.

The laser diode in the optical pickup 51 emits laser light by a driving signal (driving current) from a laser driver 63.

Within the optical pickup 51, there is also provided a mechanism, as later explained, for correcting the spherical aberration of the laser light. The spherical aberration is corrected under control by a system controller 60.

The information on the reflected light from the disc 1 is detected by the photodetector and routed to a matrix circuit 54 as electrical signals corresponding to the received light volume.

The matrix circuit 54 includes a current to voltage converter, a matrix operation/amplifier circuit and so forth, for the output currents from plural light receiving elements, operating as the photodetector, and generates necessary signals by matrix operation processing.

For example, high frequency signals, equivalent to replay data (replay data signals), as well as focusing and tracking error signals for servo control, are generated.

Additionally, push-pull signals are generated as signals relevant to groove wobbling, that is signals for detecting the wobbling.

The replay data signals, output from the matrix circuit 54, are sent to a read/write circuit 55, while the focusing and tracking error signals are sent to a servo circuit 61 and the push-pull signals are sent to a wobble circuit 58.

The read/write circuit 55 binary encodes replay data signals and generates replay clocks by PLL. The read/write circuit also reproduces data read out as phase change marks to send the so generated data to a modem 56.

The modem 56 includes a functional subsection as a decoder for replay and a functional subsection as an encoder for recording.

In replay, run length limited codes are demodulated, based on replay clocks, by way of decoding processing.

In recording, an ECC encoder/decoder 57 performs ECC encoding processing for appending error correction codes. In replay, the ECC encoder/decoder performs ECC decoding processing for correcting errors.

In replay, data demodulated by the modem 56 are captured by an internal memory and subjected to error detection/correction processing and deinterleaving to produce replay data.

The data decoded to the replay data by the ECC encoder/decoder 57 is read out under control by the system controller 60 and transferred to an AV (Audio/Visual) system 120.

The push-pull signals, output from the matrix circuit 54 as signals pertinent to groove wobbling, are processed in the wobble circuit 58. The push-pull signals, as the ADIP information, are MSK and HMW demodulated by the wobble circuit 58 and demodulated to a datastream forming an ADIP address which is supplied to an address decoder 59.

The address decoder 59 decodes the supplied data to obtain address values which are supplied to the system controller 60.

The address decoder 59 generates clocks by PLL processing employing wobble signals supplied from the wobble circuit 58 to send the so generated clocks to pertinent components as encoding clocks for recording.

The wobble circuit 58 and the address decoder 59 are configured as shown for example in FIG. 31.

The push-pull signals, as push-pull signals output from the matrix circuit 54 as signals pertinent to groove wobbling, and as the pre-recorded information from the PB zone, are band-pass filtered by the wobble circuit 58 and thence supplied to the read/write circuit 55. The signals are binary-encoded, as are the phase change marks. The binary-encoded signals are ECC encoded and deinterleaved by the ECC encoder/decoder 57 so that data as the pre-recorded information is extracted and supplied to the system controller 60.

The system controller 60 performs various setting and copy protection operations on the so read out pre-recorded information.

During recording, recorded data are supplied from the AV system 120 and sent to and buffered in a memory in the ECC encoder/decoder 57.

In this case, the ECC encoder/decoder 57 appends error correction codes or subcodes, while performing interleaving, by way of encoding processing for the buffered recording data.

The ECC encoded data is modulated by modem 56 in accordance with the RLL (1-7)PP system and thence supplied to the read/write circuit 55.

During recording, clocks generated from the wobble signals are used as encoding clocks used as reference clocks for encoding.

The recording data, generated by the encoding processing, is adjusted in the read/write circuit 55 as to characteristics of the recording layers, spot shape of the laser light, fine adjustment of the optimum recording power as to recording linear velocity or laser driving pulse shape, and sent as laser driving pulse to the laser driver 63.

The laser driving pulse, supplied to the laser driver 63, is supplied to the laser diode in the optical pickup 51 for laser light emission. This forms pits corresponding to the recording data (phase change marks) on the disc 1.

The laser driver 63 includes a so-called APC (Auto Power Control) circuit and manages control so that the laser output will be constant irrespective of temperature, as the laser output power is monitored by an output of the laser power monitor provided in the optical pickup 51. The target value of the laser output during recording and/or reproduction is supplied from the system controller 60, so that, during recording and/or reproduction, control is exercised so that the laser output level will be at a target value.

The servo circuit 61 generates various servo driving signals, such as focus, tracking and sled, from the focusing and tracking error signals from the matrix circuit 54, to permit the servo operation to be executed.

That is, the servo circuit 61 generates the focusing drive signals and tracking drive signals, responsive to the focusing and tracking error signals, for driving the focusing and tracking coils to the biaxial mechanism in the optical pickup 51. This forms a tracking servo loop and a focusing servo loop by the optical pickup 51, matrix circuit 54, servo circuit 61 and by the biaxial mechanism.

The servo circuit 61 is responsive to a track jump command from the system controller 60 to turn the tracking servo loop off and to output a jump drive signal to execute the track jump.

The servo circuit 61 generates a sled drive signal, based on the sled error signal, obtained as low frequency component of the tracking error signals, while generating sled diving signals based on the accessing control from the system controller 60, to drive the sled mechanism 53. The sled mechanism 53 includes a main shaft for holding the optical pickup 51, a sled motor or a transmission gearing system, and drives the sled motor responsive to the sled driving signal to effect the required sliding movement of the optical pickup 51.

A spindle servo circuit 62 manages control to run the spindle circuit 52 at CLV.

The spindle servo circuit 62 produces clocks generated by the PLL processing on the wobble signals as the current rotational speed information for the spindle motor 52 and compares the current rotational speed information to a preset CLV reference speed information to generate spindle error signals.

In data reproduction, since the replay clocks generated by the PLL in the read/write circuit 55 (clocks as reference for decoding processing) serve as the current rotational speed information of the spindle motor 52, it may be compared to the preset CLV reference speed information to generate spindle error signals.

The spindle servo circuit 62 outputs spindle driving signals, generated responsive to the spindle error signals, to cause the rotation of the spindle motor 52 at CLV.

The spindle servo circuit 62 is also responsive to a spindle kick/brake control signal from the system controller 60 to produce the operations such as start, stop, acceleration or deceleration of the spindle motor 52.

The above-described various operations of the servo system and the recording and/or reproducing system are controlled by the system controller 60 formed by a microcomputer.

The system controller 60 executes various processing operations, responsive to a command from the AV system 120.

For example, if a write command is issued from the AV system 120, the system controller 60 moves the optical pickup 51 to an address to be written. The system controller then causes the ECC encoder/decoder 57 and the modem 56 to execute the above-mentioned encoding processing on data transferred from the AV system 120, such as video data of the MPEG2 or the like system or the audio data. The recording is performed by the laser drive pulse from the read/write circuit 55 being supplied to the laser driver 63.

If a read command requesting the transfer of certain data recorded on the disc 1, such as MPEG2 data, is supplied from the AV system 120, the system controller 60 executes seek operation control with the specified address as a target.

That is, the system controller 60 issues a command to the servo circuit 61 to cause an accessing operation of the optical pickup 51 to be performed with the address specified by the seek command as a target.

The system controller 60 then performs the operation control necessary for transferring the data of the specified data domain to the AV system 120. That is, the system controller 60 causes data to be read out from the disc 1 to cause the read/write circuit 55, modem 56 and the ECC encoder/decoder 57 to execute the decoding/buffering to transfer the requested data.

During data recording and/or reproduction by the phase change marks, the system controller 60 controls the accessing and the recording and/or reproduction, using the ADIP address detected by the wobble circuit 58 and by the address decoder 59.

At a preset time point, as when the disc 1 has been loaded, the system controller 60 causes the unique ID recorded in the BCA of the disc 1 or the pre-recorded information, recorded as the wobbled groove in the data zone PR, to be read out.

In this case, the system controller 60 controls the seek operation, with the pre-recorded data zone as the target. That is, the system controller 60 issues a command to the servo circuit 61 to execute an accessing operation of the optical pickup 51 to the innermost rim of the disc.

The system controller 60 then causes the optical pickup 51 to execute replay trace to obtain push-pull signals as reflected light information, while causing the wobbling circuit 58, read/write circuit 55 and the ECC encoder/decoder 57 to execute decoding to obtain replay data as the BCA information or the pre-recorded information.

Based on the so read out BCA information or the pre-recorded information, the system controller 60 sets the laser power or executes copy protection processing. In reproducing the pre-recorded information, the system controller 60 controls the accessing or replay operations, using the address information contained in the BIS cluster as the read-out pre-recorded information.

In the embodiment of FIG. 40, the disc driving apparatus is connected to the AV system 120. Alternatively, the disc driving apparatus of the present invention may also be connected to e.g., a personal computer.

The disc driving apparatus may also remain unconnected to other equipment, in which case the disc driving apparatus may occasionally be provided with an operating part or a display unit or the structure of the data input/output interfacing section may differ from that shown in FIG. 40. That is, it suffices that recording and/or reproduction be carried out responsive to the user operation and there be provided a terminal unit for input/output of variable data.

Of course, there are a number of other variegated possible structures including a record-only device or a replay-only device.

4-2 Disc Accommodating Processing

Figure 41:
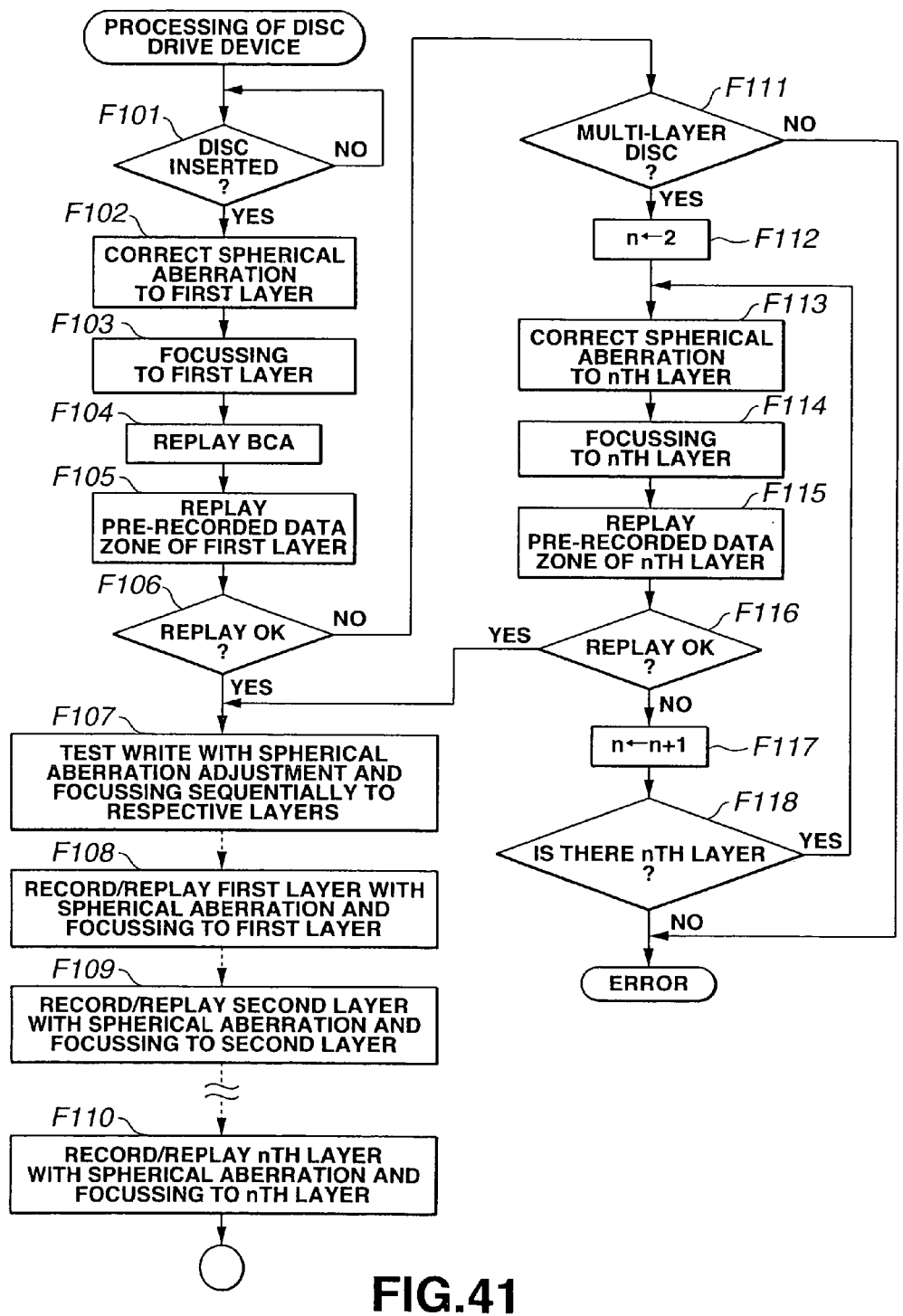
FIG. 41 is a flowchart for illustrating the processing of the disc driving apparatus according to the present invention.

The processing of the above-described disc driving apparatus on loading the disc 1 of the instant embodiment thereon is now explained with reference to FIG. 41 showing the processing centered about control by the system controller 60.

When the disc 1 as a single-layer disc or a multi-layer disc is loaded on the disc driving apparatus, the processing by the system controller 60 proceeds from step F101 to step F102, and commands the optical pickup 51 to correct spherical aberration to the first layer L0 of the disc 1.

Figure 42:
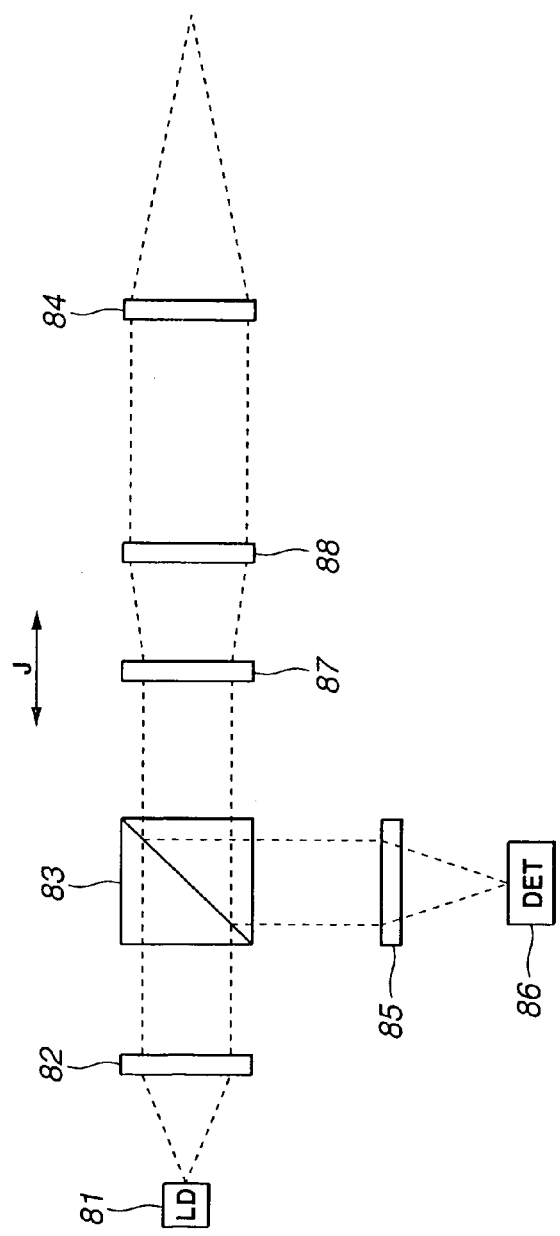
FIG. 42 illustrates a mechanism for correcting the spherical aberration of the disc driving apparatus according to the present invention.
Figure 43:
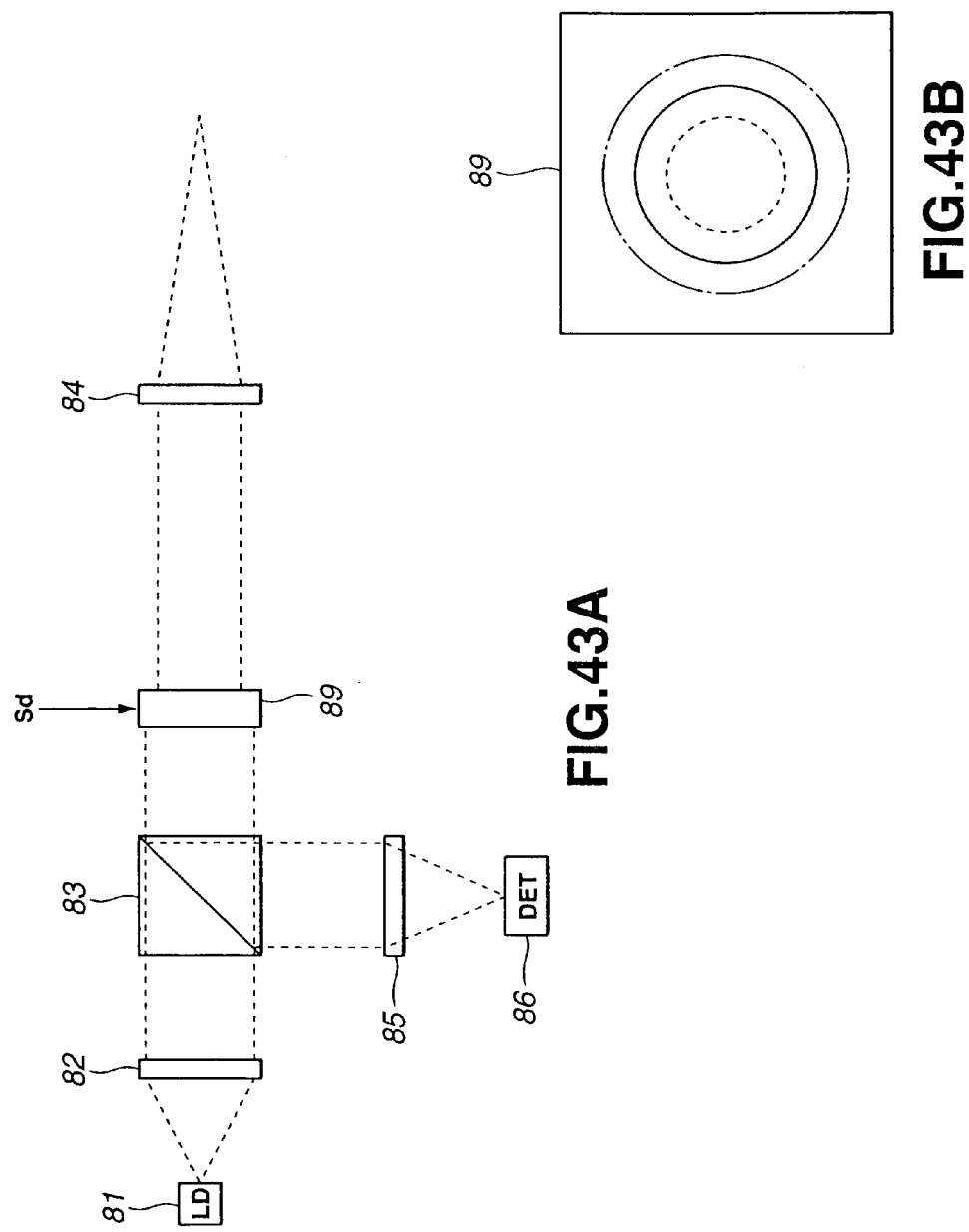
FIGS. 43A and 43B illustrate a mechanism for correcting the spherical aberration of the disc driving apparatus according to the present invention.

The mechanism for correcting the spherical aberration in the optical pickup 51 is arranged and designed as shown in FIGS. 42 and 43, each showing an optical system in the optical pickup 51.

In FIG. 42, the laser light output from the semiconductor laser (laser diode) 81 is collimated by a collimator lens 82 and transmitted through a beam splitter 83 to proceed via collimator lenses 87, 88 as the spherical aberration correcting mechanism so as to be illuminated through an objective lens 84 on the disc 1.

The reflected light from the disc 1 is transmitted through the collimator lenses 87,88 so as to be reflected by the beam splitter 83 to fall on a detector 86 via collimator lens (light condensing lens 85).

In such optical system, the collimator lenses 87, 88 have the function of varying the diameter of laser light. That is, the collimator lense 87 is movable along the J direction, which is the optical axis direction, to adjust the diameter of the laser light illuminated on the disc 1.

That is, at step 102 the system controller 60 exercises control to cause a driving unit, not shown, of the collimator lense 87 to effect movement in the fore-and-aft direction to correct the spherical aberration to the first layer L0.

In an embodiment shown in FIG. 43A, a liquid crystal panel 89 is provided in place of the collimator lenses 87, 88 of FIG. 42.

That is, in a liquid crystal panel 89, the boundary between an area allowing for transmission of laser light and an area interrupting the laser light is variably adjusted as indicated by a solid line, dotted line and by a chain-dotted line in FIG. 43B to vary the diameter of the laser light.

It is sufficient in this case for the system controller 60 to issue a command to a driving circuit driving the liquid crystal panel 89 to vary the area of transmission as described above.

After executing the correction of spherical aberration to the first layer L0 at step F102 of FIG. 41, the system controller 60 causes the servo circuit 61 to focus the laser light on the first layer L0.

At step F104, the BCA is accessed to read out the unique ID recorded in the BCA.

At the next step F105, the pre-recorded zone PR is accessed to read out the management information as the pre-recorded data.

At step F106, it is verified whether or not the management information for the pre-recorded zone PR has been successfully reproduced.

If the management information has been successfully reproduced, the system controller 60 proceeds to step F107 to sequentially test-write in an OPC (test write area) of each layer, depending on the disc type, to calibrate the laser power.

That is, if the disc type is the single-layer disc, test write is effected in the OPC of the first layer L0.

If the disc is the multi-layer disc, test write is effected in the OPC of each of the first layer L0 . . . n-th layer Ln−1 to set an optimum laser power for each layer.

Meanwhile, in executing test write in each recording layer, correction of spherical aberration and focusing control need to be executed for the recording layer for which the test write is to be prosecuted as necessary (when the targeted recording layer is not the same as that previously targeted).

After the end of the test write, the system controller 60 proceeds to stepF108 ff., to execute and control the recording and/or reproducing operations.

Since it is the first layer L0 that is to be recorded and/or reproduced, no matter whether the disc is the single-layer disc or the multi-layer disc, the first layer L0 is subjected to spherical aberration correction and to focusing control for the first layer L0 to record and/or reproduce the first layer L0.

If the disc is the single-layer disc, the system controller 60 ends the processing when recording and/or reproducing the first layer L0 is over.

If the disc is the multi-layer disc, the system controller proceeds to step F109 . . . F110 to effect spherical aberration correction and focusing control sequentially for the respective layers to continue the recording and/or reproduction.

Meanwhile, with the multi-layer disc, such as a double-layer disc, recording and/or reproduction is prosecuted from the outer rim towards the inner rim for even-numbered recording layers, such as second layer L1. Consequently, there is no necessity of executing seek control from the outer rim towards the inner rim, thus enabling recording and/or reproduction to be performed continuously.

With discs with three or more layers, seek control is similarly unnecessary in case the recording and/or reproduction proceeds from the second layer L1 to the third layer L2 or from the third layer L2 to the fourth layer L3, thus enabling continuous recording and/or reproduction.

Meanwhile, in actually recording and/or reproducing data, the management information needs to be read out from the pre-recorded data zone PR. Although there is raised no problem when the management information has successfully been read out at step F105 from the pre-recorded data zone PR of the first layer L0. If the management information has not been successfully read out for some reason, the disc is disabled for recording and/or reproduction.

It is noted that, in the multi-layer disc, the same management information is recorded in the second layer ff., as described above. Thus, in the present embodiment, when the management information has not been read out in the first layer L0, the management information is read out from the other recording layer(s).

That is, if the replay cannot be made at step F106, the system controller 60 proceeds to step F111 to verify whether or not the disc 1 is a multi-layer disc. If the disc is a single-layer disc, the pre-recorded data zone PR is not readable, so that the operation is terminated as error.

If the disc is a multi-layer disc, the system controller proceeds to step F112 to set a variable n to [2]. At step F113, correction of spherical aberration is performed for the n-th layer, that is the second layer L1. At step F114, focusing control is performed for the n-th layer, that is the second layer L1 and, at step F115, the management information is read out from the pre-recorded data zone PR of the n-th layer, that is the second layer L1.

When the replay is found to be possible at step F116, the system controller 60 proceeds to step F107.

If the replay is found to be not possible at step F116, the variable n is incremented at step F117 and, at the next step F118, it is checked whether or not there is the n-th layer in the disc. That is, the presence of, for example, the third layer, is checked.

If the disc is the double-layer disc, there is no third layer, and hence the pre-recorded data zone PR is not readable. Thus, the operation is terminated as error.

If the disc is a disc with three or more layers, the n-th layer is verified to be present at step F118, so that the system controller 60 reverts to step F113 to execute the correction of the spherical aberration, focusing control and readout of the pre-recorded data zone PR for the n-th layer, that is for the third layer.

That is, it suffices that the pre-recorded data zone PR is readable for one of the totality of the recording layers.

If the pre-recorded data zone PR is found to be not readable for any of the recording layers, the operation is terminated as error. However, if readout of the pre-recorded data zone PR is possible in any recording layer, the system controller 60 is able to proceed to the processing of step F107 ff., thus improving the reliability of the disc 1.

In the above-described processing of the disc driving apparatus, both the single-layer disc and the multi-layer disc may be coped with, while the spherical aberration may be optimally corrected for the recording layer being illuminated by the laser light. In addition, recording and/or reproduction can be optimally prosecuted for both the single-layer disc and the multi-layer disc and for each recording layer of the multi-layer disc.

When the disc 1 is loaded, correction of the spherical aberration for the first layer L0 is performed irrespective of whether the disc is the single-layer disc or the multi-layer disc. Since the position of the first layer along the disc thickness is the same for the respective disc types, these respective disc types can be coped with satisfactorily and efficiently. That is, the pre-recorded data zone PR for the first layer can be read out without dependency on whether the loaded disc is the single-layer disc, double-layer disc or the three-layer disc.

The unique ID, recorded in the BCA of the first layer L0, can also be read out conveniently.

When a multi-layer disc is loaded, the management information of the pre-recorded data zone PR is read out from one of the first to the n-th layers, the management information can be read out correctly, with a higher probability, thus improving the operational reliability of the disc and the disc driving apparatus.

For a multi-layer disc, test recording may be carried out for each test area provided in each of the first to the n-th layers to set the recording and/or reproducing conditions for the respective layers to realize optimum recording and/or reproducing operations for the respective recording layers.

If the multi-layer disc is loaded, recording and/or reproduction is carried out sequentially from the first to the n-th layers. In addition, in recording and/or reproducing an odd-numbered recording layer, recording and/or reproduction is carried out from the inner rim towards the outer rim of the disc. In recording and/or reproducing an even-numbered recording layer, recording and/or reproduction is carried out from the outer rim towards the inner rim. Consequently, the recording and/or reproduction can be carried out in succession without the necessity of performing full-seek operations from the outer rim towards the inner rim or from the inner rim towards the outer rim of the disc, such that the real-time recording at a high transfer rate, such as video recording and/or reproduction, can be performed for prolonged time.

5. Disc Producing Method 5-1 Mastering Device

The manufacturing method for the above-described optical disc 1 is now explained. First of all, the mastering device is explained.

The disc manufacturing process may be roughly subdivided into a so-called mastering process and a disc producing process (replication process). The mastering process is up to completion of a metal master disc (stamper) used for the disc producing process, and the disc producing process is the process of producing a large number of optical disc, as replicated products.

Specifically, during the mastering process, a photoresist is coated on a polished glass substrate, and the resulting photosensitive film is exposed to laser light to form a groove.

This processing is carried out by a mastering device.

Figure 44:
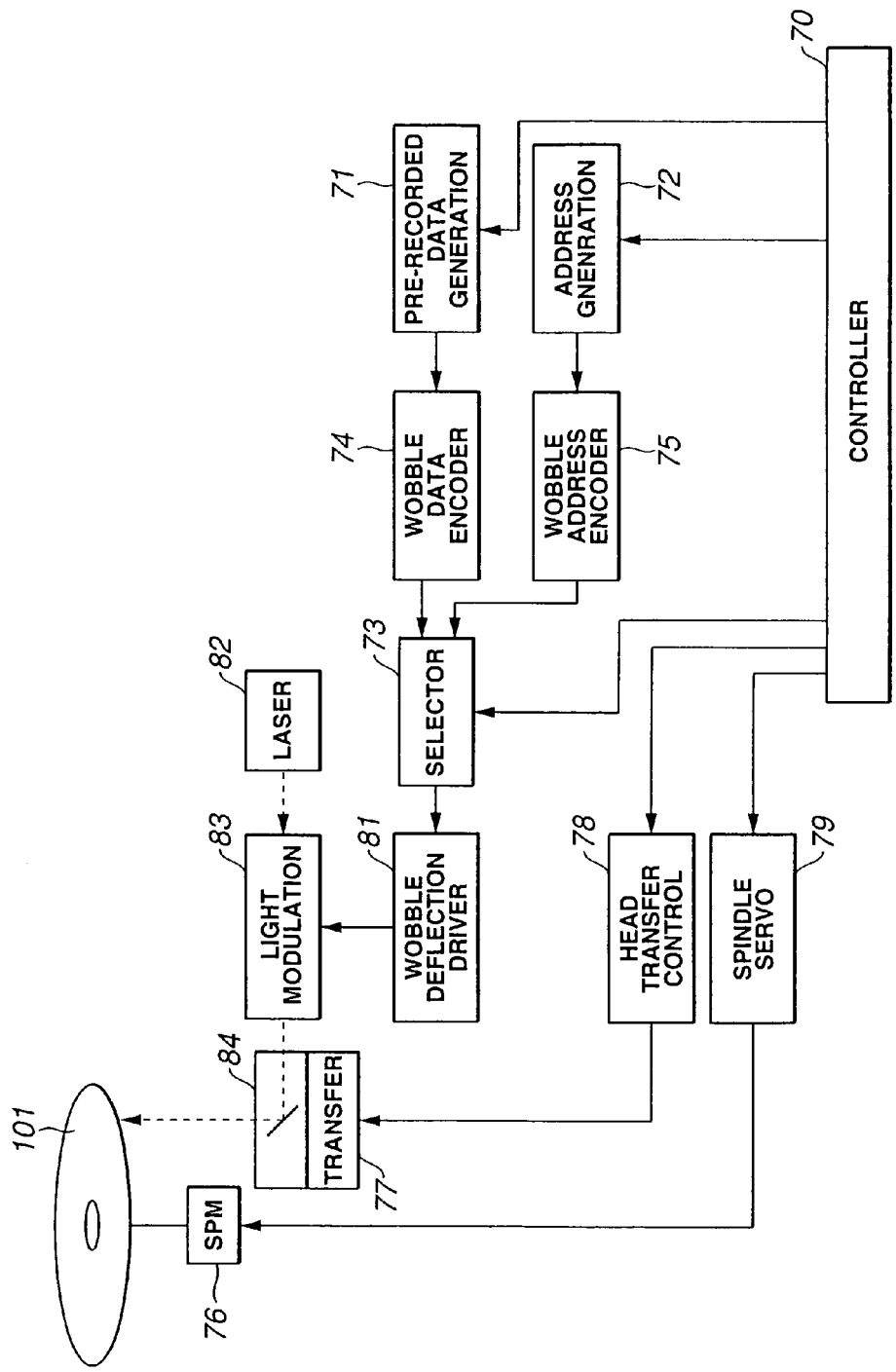
FIG. 44 is a block diagram of a mastering device according to the present invention.

In the present embodiment, groove mastering is performed in an area of the glass substrate in register with the PB zone of the innermost disc rim, by wobbling based on the pre-recorded information, while groove mastering is performed in an area of the glass substrate in register with the RW zone, by wobbling based on the ADIP address. A plural number of stampers, namely a stamper for the first layer L0, a stamper for the second layer L1 ... a stamper for the n-th layer Ln−1, are prepared. The mastering device is shown in FIG. 44.

The mastering device includes a pre-recorded information generator 71, an address generator 72, a selector 73, a wobble data encoder 74, a wobble address encoder 75 and a controller 70.

The mastering device also includes a laser light source 82, a optical modulator 83, a head unit 84, a transfer mechanism 77, a spindle motor 76, a head transfer controller 78 and a spindle servo circuit 79.

The pre-recorded information for recording is produced in a preparation step termed mastering.

The pre-recorded information generator 71 outputs the pre-recorded information produced in the pre-mastering step.

This pre-recorded information is encoded by the wobble data encoder 74 to produce stream data of a wobble waveform modulated with the pre-recorded information. The so produced stream data is sent to the selector 73.

The address generator 72 sequentially outputs values of the absolute addresses.

The groove is subjected to MSK modulation and HMW modulation in the wobble address encoder 75, based on the absolute address values of the output by the address generator 72. This wobble address encoder generates encoded signals, as the address information for MSK modulating the groove and as the address information for HMW modulating the groove, to send the resulting encoded signals to the selector 73.

For MSK modulation, two frequencies, namely $\cos(\omega t)$ and $\cos(1.5\omega t)$, are generated, on the basis of the reference clocks. From the address information, a datastream, containing the data for modulation, synchronized with the reference clocks, at a preset timing position, is generated. The datastream is MSK modulated with for example two frequencies of $\cos(\omega t)$ and $\cos(1.5\omega t)$ to generate MSK modulated signals. In the groove portion where the information is not subjected to the MSK modulation, a signal with the waveform of $\cos(\omega t)$ (monotone wobble) is generated.

As for the HMW modulation, a second harmonics signal ($\pm\sin(2\omega t)$) synchronized with $\cos(\omega t)$ generated in the above-described MSK modulation is generated based on the reference clocks. This second harmonics signal is output at a timing of recording the address information with HMW modulation (a timing of the monotone wobble not subjected to MSK modulation). It is noted that the second harmonics signal is output as switching is made between $+\sin(2\omega t)$ and $-\sin(2\omega t)$ depending on the digital code of the input address information.

The second harmonics signal as the HMW modulated output is summed to the MSK modulated signal. The resulting sum signal is supplied as a wobble address signal stream to the selector 73.

The head unit 84 illuminates a light beam to a glass substrate 101, coated with a photoresist, for light exposure of the groove track.

The spindle motor 76 causes rotation of the glass substrate 101 at CLV. The spindle servo circuit 79 manages rotational servo control.

The transfer mechanism 77 transfers the head unit 84 at a constant velocity from the inner rim towards the outer rim or from the outer rim towards the inner rim, so that the light beam is spirally illuminated from the head unit 84.

The head transfer controller 78 executes the operation of the transfer mechanism 77.

A laser light source 82 is formed e.g., by He—Cd laser. The optical modulator 83 for modulating the outgoing light from the laser light source 82 based on the recording data is an acousto-optical deflector (AOD) adapted for deflecting the outgoing light from the laser light source 82 based on the wobble generating signal.

The selector 73 selects a wobble waveform signal as the pre-recorded information and the wobble waveform stream as the address information to send the signal and datastream thus selected to a wobble deflection driver 81.

The wobble deflection driver 81 drives the light deflector of the optical modulator 83 in dependence upon the pre-recorded information supplied thereto or upon the wobble waveform stream as the address information.

The laser light, output from the laser light source 82, is deflected by the optical modulator 83, responsive to the pre-recorded information and the wobble waveform stream, as the address information, so as to be illuminated by the head unit 84 on the glass substrate 101.

As described above, the glass substrate 101 is run in rotation at CLV by the spindle motor 76, while the head unit 84 is transferred at a preset velocity by the transfer mechanism 77, so that a wobbled groove pattern as indicated in FIGS. 21A, 22A, 23A, 24A, 25A, 27A or 28A is sensitized on the photoresist surface of the glass substrate 101.

The controller 70 prosecutes and controls the mastering operation, while controlling the pre-recorded information generator 71, address generator 72 and the selector 73 as the controller 70 monitors the transfer position of the transfer mechanism 77.

In starting the stamper mastering for forming odd-numbered recording layers, such as the first layer L0 or the third layer L2, the controller 70 sets the innermost portion, in register with the pre-recorded data zone PR, as the initial position of the transfer mechanism 77. The controller 70 then initiates the rotation of the glass substrate 101 at CLV and sliding transfer for forming the groove with a track pitch of 0.35 μm.

In this state, the controller 70 causes the pre-recorded information to be output from the pre-recorded information generator 71 and sent to the wobble deflection driver 81 via selector 73. The controller 70 also initiates the laser outputting from the laser light source 82. The optical modulator 83 modulates the laser light, depending on the driving signal from the wobble deflection driver 81, that is FM code modulating signal of the pre-recorded information, to execute groove mastering on the glass substrate 101.

The groove wobbled in accordance with the pre-recorded information is mastered in this manner in an area of the first layer L0 and the third layer L2 in register with the pre-recorded data zone PR.

Subsequently, on detecting that the transfer mechanism 77 has proceeded to a location in register with the RW zone, the controller 70 commands the selector 73 to be switched to the side of the address generator 72, while also commanding the address generator 72 to sequentially generate address values. For example, if the mastering is for the stamper used for generating the first layer L0, the address values [020000h] to [17644ch] are sequentially generated.

The controller 70 also lowers the slide transfer speed of the transfer mechanism 77 for forming the groove with the track pitch of 0.32 μm.

In this manner, the wobble waveform stream, derived from the address information, is sent from the address generator 72 to the wobble deflection driver 81. The laser light from the laser light source 82 is modulated by the modulator 83 based on the driving signal from the wobble deflection driver 81, that is on the MSK/HMW modulation signal of the address information, such that groove mastering on the glass substrate 101 is achieved by the modulated laser light.

In this manner, the groove wobbled in accordance with the address information is mastered in an area in register with the RW zone.

On detecting that the transfer by the transfer mechanism 77 has reached the terminal end of the lead-out zone or the outer zone, the controller 70 terminates the mastering operation.

In starting the mastering of the stamper used for forming the even-numbered recording layer, such as the second layer L1 or the fourth layer L3, the controller 70 sets the outermost rim, equivalent to the outer zone, as an initial position for the transfer mechanism 77, and initiates the rotation of the glass substrate 101 at CLV and sliding transfer thereof for forming a groove to a track pitch of 0.32 μm.

In this case, the controller 70 commands the selector 73 to be switched to the side of the address generator 72, while commanding the address generator 72 to sequentially generate address values.

If the mastering is for the stamper used for generating the second layer L1, the address values of [084bb3h] to [1dfffh] are sequentially generated.

This supplies the wobble waveform stream, derived form the address information, from the address generator 72 to the wobble deflection driver 81. The laser light from the laser light source 82 is modulated in the modulator 83, in accordance with the driving signals from the wobble deflection driver 81, that is the MSK/HMW modulation signal of the address information. The resulting modulated laser light is then used to achieve the groove mastering on the glass substrate 101.

In this manner, the groove wobbled in accordance with the address information is mastered in an area of the glass substrate in register with the RW zone.

When the controller 70 has detected that the transfer of the transfer mechanism 77 has reached a position in register with the pre-recorded data zone PR, the slide transfer for forming the groove of a track pitch of 0.35 μm is initiated.

Under this condition, the pre-recorded information is output from the pre-recorded information generator 71 and supplied via selector 73 to the wobble deflection driver 81. The controller 70 also initiates the laser outputting from the laser light source 82. The optical modulator 83 modulates the laser light based on the driving signal from the wobble deflection driver 81, that is on the FM code modulation signal of the pre-recorded information, to execute groove mastering on the glass substrate 101.

In this manner, the groove wobbled in accordance with the pre-recorded information is mastered in the area in register with the pre-recorded data zone PR of each of the second layer L1, fourth layer L3 and so forth.

On detecting that the terminal end of the pre-recorded data zone PR is reached, the mastering operation is terminated.

By the above sequence of operations, a light exposed portion is formed on the glass substrate 101 which is in register with the wobbled groove as the PB zone and the RW zone.

The stamper is then completed on developing, electroforming etc.

Specifically, a stamper for the first layer, a stamper for the second layer . . . and a stamper for the n-th layer are produced.

5-2 Producing Sequence

Figure 45:
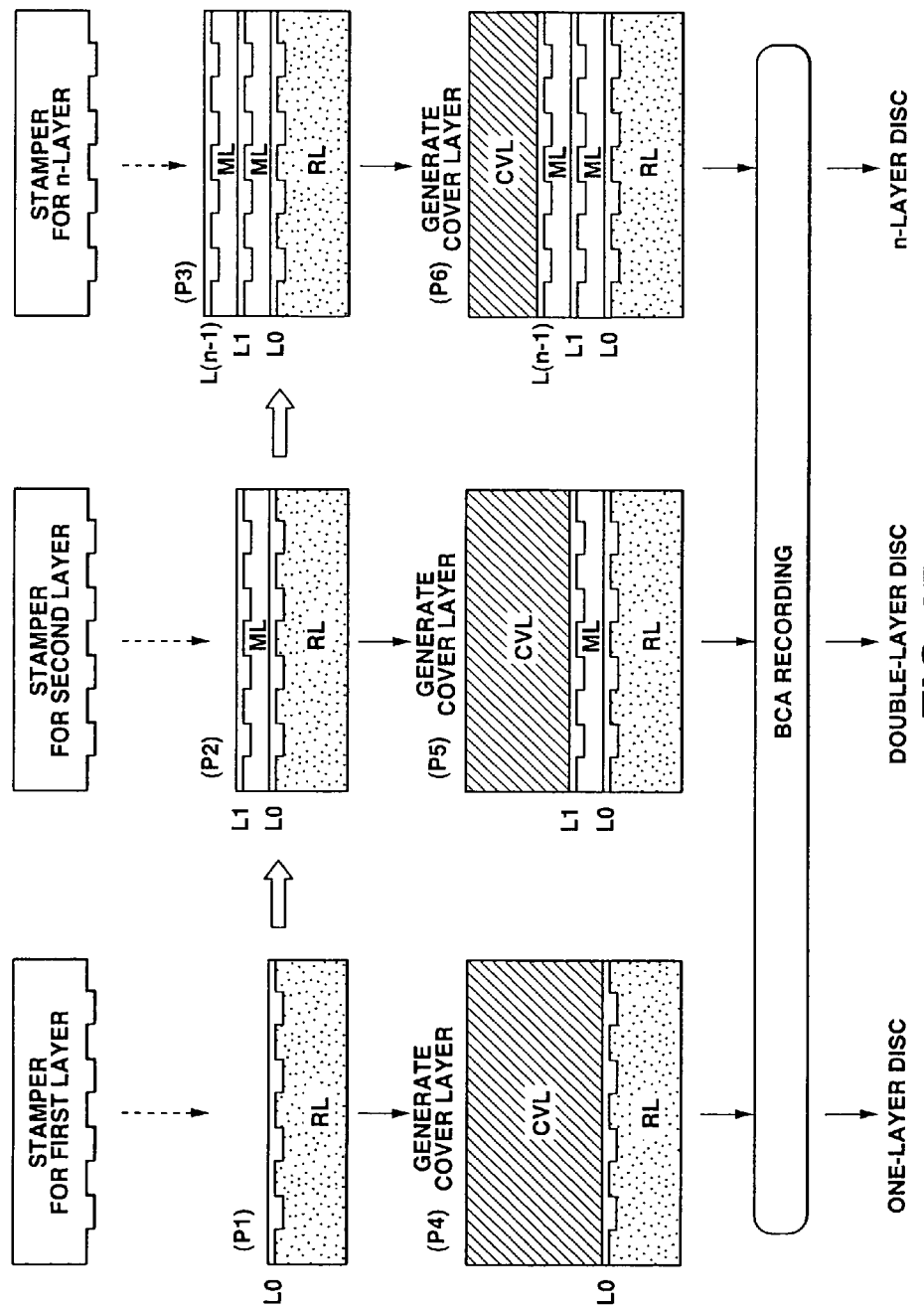
FIG. 45 illustrates the procedure for manufacturing a disc according to the present invention.

FIG. 45 shows the sequence of operations for producing the disc after the manufacture of the stamper for each recording layer as described above.

<procedure P1>

A substrate RL of for example polycarbonate is formed on injection, using a stamper for the first layer, and a groove pattern is transcribed, after which a recording film as the first layer L0 is formed on sputtering.

<procedure P2>

By injection employing a stamper for the second layer, an intermediate layer ML, having a groove pattern transcribed thereto, is formed, and a recording film as the second layer L1 is formed by a sputtering device.

<procedure P3>

By injection employing a stamper for the n-th layer, an intermediate layer ML, having a groove pattern transcribed thereto, is formed, and a recording film as the n-th layer Ln−1 is formed by a sputtering device.

<procedure P4>

In producing a single-layer disc, a cover layer CVL is formed to a thickness of approximately 100 µm on the layer formed at procedure P1.

<procedure P5>

In producing a single-layer disc, a cover layer CVL is formed to a thickness of approximately 75 µm on the layer formed by procedures P1 and P2.

<procedure P6>

In producing an n-th-layer disc, where n is here three or more, a cover layer CVL is formed to a thickness of 100−(n−1)×25 µm on the layer formed by procedures P1, P2 and P3.

In producing a single-layer disc, a BCA is recorded on the disc formed at the procedure P4 above to complete the disc 1.

In producing a double-layer disc, a BCA is recorded on the disc formed at the procedure P5 above to complete the disc 1.

In producing a three-layer disc, a BCA is recorded on the disc formed at the procedure P6 above to complete the disc 1.

As may be seen from the above manufacturing process, the single-layer disc is produced by P1→P4→BCA recording, while the double layer disc is produced by P1→P2→P5→BCA recording and the n-th layer is produced by P1→P2→P3→P6→BCA recording.

The process up to step P1 is common to all discs. Moreover, the procedures P1 and P2 are common to the double-layer disc and the three-layer disc, for example, thus simplifying the process.

5-3 BCA Recording Device

Figure 46:
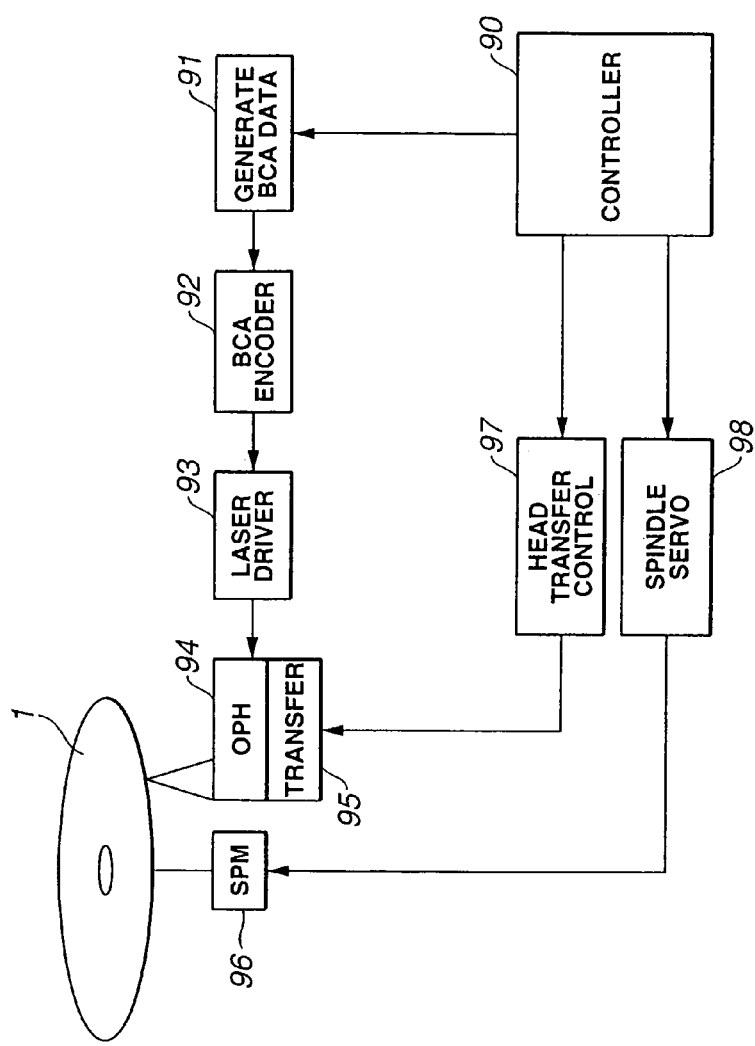
FIG. 46 is a block diagram of a BCA recording device according to the present invention.

FIG. 46 shows a recording device for recording the BCA.

The BCA recording device includes a controller 90, a BCA data generator 91, a BCA encoder 92, a laser driver 93, an optical head 94, a transfer mechanism 95, a spindle motor 96, a head transfer controller 97 and a spindle servo circuit 98.

The disc, prepared as described above, is run in rotation at for example CAV by the spindle motor 96, under rotational control by the spindle servo circuit 98.

The transfer mechanism 95 transfers the optical head 94 within the range of BCA of the disc.

The BCA data generator 91 generates the information as a unique ID proper to each disc. The data as this unique ID is encoded by the BCA encoder.

The laser driver 93 on/off modulation controls the laser output in the optical head 94 based on the encoded data.

The controller 90 controls the execution of the above-described operations.

By this BCA recording device, the high power laser light is output modulated with the unique ID data from the optical head 94. Moreover, since the disc 96 is rotated at CAV, the BCA data is recorded as concentric bar-code information as the BCA of the disc 1.

While the present invention has been with reference to a disc and an associated disc driving apparatus, the present invention is not limited to these particular embodiments and may be variably constructed within the scope of the invention.

While the invention has been described in accordance with certain preferred embodiments thereof illustrated in the accompanying drawings and described in the above description in detail, it should be understood by those ordinarily skilled in the art that the invention is not limited to the embodiments, but various modifications, alternative constructions or equivalents can be implemented without departing from the scope and spirit of the present invention as set forth and defined by the appended claims.

INDUSTRIAL APPLICABILITY

As may be understood from the foregoing explanation, the following favorable effect may be obtained in accordance with the present invention.

With the disc-shaped recording medium, or the disc manufacturing method, according to the present invention, the recording layer, as a first recording layer, a single layer disc or a multi-layer disc, having plural recording layers, the recording layer as a first recording layer is formed at such a position in a direction of thickness of the disc that the distance from the surface of a cover layer on which the light enters for recording and/or reproduction to the first recording layer is the same as the distance in case of the single layer disc. Thus, in the single layer disc, a double layer disc, a three layer disc, or a disc with four or more recording layers, the recording layer as the first layer, such as a recording layer of the phase change recording film, may be formed in similar manner on a polycarbonate substrate, so that the manufacturing process may be partially common, while similar recording and/or reproducing characteristics may be obtained for both the single layer disc and the multi-layer disc.

Moreover, with the multi-layer disc, the second recording layer is formed at such position which is closer to the cover layer surface than synchronous detection first layer, so that the second recording layer is formed at smaller distance from the surface of the cover layer. The second recording layer is formed of a plurality of recording layers. That is, the thickness of the cover layer becomes thinner as seen from the respective layers. This increases the tilt angle allowance between the disc and the light beam. That is, the tilt margin for the second recording layer may be relaxed as compared to that of the recording film of the first layer, thus improving the recording and/or reproducing characteristics and disc productivity, while lowering the production cost.

In the first to the n-th recording layers, the odd-numbered recording layers and the even-numbered recording layers are recorded and/or reproduced from the inner rim towards the outer rim and from the outer rim towards the inner rim of the disc, respectively. Thus, at a time point when for example the first recording layer has been recorded or reproduced at the outer rim, the second recording layer may be recorded or reproduced as from the outer rim. That is, full seek from the outer rim towards the inner rim or from the inner rim towards the outer rim is not required, in prosecuting the recording and/or reproducing operations from a given recording layer to the next, such that the real-time recording at a high transfer rate, such as video recording and/or reproduction, can be performed for prolonged time.

The addresses of odd-numbered recording layers of the first to the n-th recording layers are sequentially recorded from the inner rim towards the outer rim of the disc, while the addresses of even-numbered recording layers are obtained on complementing the addresses of the odd-numbered recording layers at the positions radially corresponding to synchronous detection addresses of the even-numbered recording layers, and are recorded from the outer rim towards the inner rim of the disc. That is, the addresses are counted up from the inner rim towards the outer rim in the odd-numbered recording layers, such as the first and third recording layers, while being counted from the outer rim towards the inner rim for the even-numbered recording layers, such as the second and fourth recording layers. By complementing the addresses of the odd-numbered recording layers as the addresses of the even-numbered recording layers, the addresses in one layer can be expressed by the number of bits of the addresses in the one layer. This addressing system is convenient as the addressing system when it is desired to increase the recording capacity by employing plural recording layers. The position relationships along the radial direction with respect to the addresses of the odd- and even-numbered recording layers can also be known.

Moreover, a unique ID proper to the disc-shaped recording medium is recorded only in the first recording layer by a recording system of burning off the recording layer, as stated as BCA. When the bar code signals are recorded along the radial direction by the recording system of burning off the first recording layer, there is a risk of damaging other recording layers lying at the same position along the direction of disc thickness, such that the unique ID cannot be reliably recorded in these other layers. The unique ID may be improved in recording and/or reproducing reliability by recording only in the first recording layer.

The management information for recording and/or reproduction is recorded in each of the first to the n-th recording layers, as the replay-only information, by wobbling a groove which is formed spirally on the disc. The management information can be recorded to high reliability, and may be read in each layer, by recording the management information, such as the disk information, including the conditions for recording and/or reproducing power, or the copy protection information, as the pre-recorded information by track wobbling, thus improving the accessibility.

The recording test area is provided in each of the first to the n-th recording layers to enable the recording test to be conducted in each layer in a manner suited to the layer in question to find out optimum recording and/or reproducing conditions.

The defect management information for the first to the n-th recording layers is recorded in each of the first to the n-th recording layers, so that the defect management information for the totality of the recording layers can be handled monistically.

If the defect management information cannot be recorded in for example the first recording layer, the recording position of the defect management information can be switched to the second layer, third layer etc., to assure defect management to high reliability.

The first to the n-th recording layers are provided with replacement areas to provide the replacement areas of the same recording capacity in these recording layers to exploit the defect management efficiency in the respective recording layers effectively with high accessibility.

The disc driving apparatus of the present invention is able to cope with both a single layer disc and a multi-layer disc and in particular is able to correct spherical aberration in dependence upon the recording layer to be illuminated with the laser light, thus allowing to record and/or reproduce the single layer disc and the multi-layer disc and the respective recording layers of the multi-layer disc with high adaptability.

When the disc-shaped recording medium is loaded, the spherical aberration correction is carried out for the first layer without regard to whether the disc is a single layer disc or a multi-layer disc. Since the position of the first layer along the direction of disc thickness is the same without regard to whether the disc is a single layer disc or a multi-layer disc, the respective disc types can be coped with satisfactorily and efficiently.

When the disc-shaped recording medium is loaded, the unique ID proper to the disc-shaped recording medium, recorded by burning off the first recording layer, may be read out to enable the unique ID to be read out in dependency upon the disc type.

If the disc loaded is the multi-layer disc, the management information for recording and/or reproduction, recorded as the replay-only information by wobbling the spirally formed groove, may be read out from any of the first to the n-th layer. That is, if the management information cannot be read in the first layer, the recording and/or reproducing operation can be prosecuted by reading out the management information from another recording layer, thus improving the operational reliability.

Moreover, in a multi-layer disc, test recording may be carried out in the test area provided in each of the first to n-th layer to set the recording and/or reproducing conditions to realize optimum recording and/or reproducing conditions.

Additionally, in a multi-layer disc, the defect management information for the first to the n-th layer may be recorded in any of the defect management areas provided in the respective recording layers, whereby the defect management information of the totality of the recording layers can be handled monistically.

On the other hand, if the defect management information cannot be recorded and/or reproduced in the first recording layer, the recording position for the defect management information can be switched to the second or third layer, thus achieving defect management to high reliability.

If the disc loaded is the multi-layer disc, recording and/or reproduction may be prosecuted sequentially from the first layer to the n-th layer. During recording and/or reproduction for the odd-numbered recording layer, recording and/or reproduction may be prosecuted from the inner rim towards the outer rim of the disc, whereas, during recording and/or reproduction for the even-numbered recording layer, recording and/or reproduction may be prosecuted from the outer rim towards the inner rim of the disc, so that recording and/or reproduction can be continuously prosecuted without full seek from the outer rim towards the inner rim of the disc. As a result, the real-time recording at a high transfer rate, such as video recording and/or reproduction, can be performed for prolonged time.

From the foregoing, the present invention gives such a favorable effect that the present invention is suitable for a large-capacity disc-shaped recording medium and that the recording and/or reproducing performance of the disc driving apparatus is improved.

The invention claimed is:

1. In a disc-shaped recording medium which may be a single-layer disc, having a single recording layer, or a multi-layer disc having a plurality of recording layers, a disc-shaped recording medium which is said multi-layer recording medium wherein
the recording layer as a first recording layer is formed at such a position in a direction of thickness of the disc that the distance from the surface of a cover layer on which the light enters for recording and/or reproduction to the first recording layer is the same as the distance in case of said single layer disc; and wherein
the second recording layer is formed at such position which is closer to said cover layer surface than said first layer.

2. The disc-shaped multi-layer recording medium according to claim 1, wherein the second recording layer is formed of a plurality of recording layers.

3. The disc-shaped multi-layer recording medium according to claim 1 wherein, of the first to the n-th recording layers, odd-numbered recording layers are recorded and/or reproduced from the inner rim towards the outer rim of the disc, and even-numbered recording layers are recorded and/or reproduced from the outer rim towards the inner rim of the disc.

4. The disc-shaped multi-layer recording medium according to claim 1 wherein the addresses of odd-numbered recording layers of the first to the n-th recording layers are sequentially recorded from the inner rim towards the outer rim of the disc, and wherein the addresses of even-numbered recording layers are obtained on complementing the addresses of the odd-numbered recording layers at the positions radially corresponding to said addresses of the even-numbered recording layers, are recorded from the outer rim towards the inner rim of the disc.

5. The disc-shaped multi-layer recording medium according to claim 1 wherein a unique ID proper to the disc-shaped recording medium is recorded only in the first recording layer by a recording system of burning off the recording layer.

6. The disc-shaped multi-layer recording medium according to claim 1 wherein the management information for recording and/or reproduction is recorded as replay-only information in each of the first to the n-th recording layers by wobbling a groove formed for spirally extending in said disc.

7. The disc-shaped multi-layer recording medium according to claim 1 wherein a test area for conducting a recording test is provided in each of said first to n-th recording layers.

8. The disc-shaped multi-layer recording medium according to claim 1 wherein an area for recording the defect management information for each of said first to n-th recording layers is provided in each of said first to n-th recording layers.

9. The disc-shaped multi-layer recording medium according to claim 1 wherein a replacement area is provided in each of said first to n-th recording layers.

10. A disc driving apparatus for recording and/or reproducing a disc-shaped recording medium which may be a single-layer disc, having a single recording layer, or a multi-layer disc having a plurality of recording layers, wherein
the recording layer as a first recording layer of said multi-layer disc is formed at such a position in a direction of thickness of the disc that the distance from the surface of a cover layer on which the light enters for recording and/or reproduction to the first recording layer is the same as the distance in case of said single layer disc; and wherein
the second recording layer is formed at such position which is closer to said cover layer surface than said first layer; said apparatus comprising:
head means for illuminating the laser light for recording and/or reproducing data for a track of each of said recording layers;
correction means for correcting the spherical aberration of said laser light; and
correction controlling means for controlling said correction means, in dependence upon the recording layer to be illuminated by said laser light to correct spherical aberration in dependence upon the recording layer.

11. The disc driving apparatus according to claim 10, wherein the second recording layer is formed of a plurality of recording layers.

12. The disc driving apparatus according to claim 10 wherein said correction controlling means causes said correction means to execute spherical aberration correction for said first layer, on loading of said disc-shaped recording medium, without regard to the disc type.

13. The disc driving apparatus according to claim 10 wherein a unique ID proper to the disc-shaped recording medium, recorded in said first layer by a recording system of burning off the layer, is read out on loading the disc-shaped recording medium.

14. The disc driving apparatus according to claim 10 wherein, when the multi-layer disc having n recording layers is loaded, the management information for recording and/or reproduction, recorded as the replay-only information by wobbling a spirally formed groove, is read out from one or more of the first to the n-th recording layers of the disc.

15. The disc driving apparatus according to claim 10 wherein, when the multi-layer disc having n recording layers is loaded, test recording is carried out in a test area provided in each of said first to n-th recording layers.

16. The disc driving apparatus according to claim 10 wherein, when the multi-layer disc having n recording layers is loaded, the defect management information for the first to the n-th recording layers is recorded in a defect management area provided in each of said first to n-th recording layers.

17. The disc driving apparatus according to claim 10 wherein, when the multi-layer disc having n recording layers is loaded, recording and/or reproduction is sequentially prosecuted from the first to the n-th recording layers.

18. The disc driving apparatus according to claim 10 wherein, in recording and/or reproducing odd-numbered recording layers of said disc-shaped recording medium, recording and/or reproduction is executed from the inner rim towards the outer rim of the disc, and wherein, in recording and/or reproducing even-numbered recording layers of said disc-shaped recording medium, recording and/or reproduction is executed from the outer rim towards the inner rim of the disc.

19. A method for producing, of a single-layer disc, having a single recording layer, and a multi-layer disc, having a plurality of recording layers, a disc-shaped recording medium which is said multi-layer recording medium, said method comprising:

forming the recording layer as a first recording layer at such a position in a direction of thickness of the disc that the distance from the surface of a cover layer on which the light enters for recording and/or reproduction to the first recording layer is the same as the distance in case of said single layer disc; and forming the second layer at such position which is closer to said cover layer surface than said first layer.

20. The method for producing a disc-shaped multi-layer recording medium according to claim 19 wherein, the second recording layer is formed of a plurality of recording layers.

21. The method for producing a disc-shaped multi-layer recording medium according to claim 19 wherein, of the first to the n-th recording layers, odd-numbered recording layers are recorded and/or reproduced from the inner rim towards the outer rim of the disc, and even-numbered recording layers are recorded and/or reproduced from the outer rim towards the inner rim of the disc.

22. The method for producing a disc-shaped multi-layer recording medium according to claim 19 wherein the addresses of odd-numbered recording layers of the first to the n-th recording layers are sequentially recorded from the inner rim towards the outer rim of the disc, and wherein the addresses of even-numbered recording layers are obtained on complementing the addresses of the odd-numbered recording layers at the positions radially corresponding to said addresses of the even-numbered recording layers, and are recorded from the outer rim towards the inner rim of the disc.

23. The method for producing a disc-shaped multi-layer recording medium according to claim 19 wherein a unique ID proper to the disc-shaped recording medium is recorded only in the first recording layer by a recording system of burning off the recording layer.

24. The method for producing a disc-shaped multi-layer recording medium according to claim 19 wherein the management information for recording and/or reproduction is recorded as replay-only information in each of the first to the n-th recording layers by wobbling a groove formed for spirally extending in said disc.

25. The method for producing a disc-shaped multi-layer recording medium according to claim 19 wherein a test area for conducting a recording test is provided in each of said first to n-th recording layers.

26. The method for producing a disc-shaped multi-layer recording medium according to claim 19 wherein an area for recording the defect management information for each of said first to n-th recording layers is provided in each of said first to n-th recording layers.

27. The method for producing a disc-shaped multi-layer recording medium according to claim 19 wherein a replacement area is provided in each of said first to n-th recording layers.

* * * * *